(12) United States Patent
Eder

(10) Patent No.: US 7,401,057 B2
(45) Date of Patent: Jul. 15, 2008

(54) ENTITY CENTRIC COMPUTER SYSTEM

(75) Inventor: Jeff Scott Eder, Mill Creek, WA (US)

(73) Assignee: Asset Trust, Inc., Bothell, WA (US)

( * ) Notice: Subject to any disclaimer, the term of this patent is extended or adjusted under 35 U.S.C. 154(b) by 535 days.

(21) Appl. No.: 10/717,026

(22) Filed: Nov. 19, 2003

(65) Prior Publication Data

US 2004/0225629 A1 Nov. 11, 2004

Related U.S. Application Data

(60) Provisional application No. 60/464,837, filed on Apr. 23, 2003, provisional application No. 60/432,283, filed on Dec. 10, 2002.

(51) Int. Cl.
G06E 1/00 (2006.01)
G06E 3/00 (2006.01)
G06F 15/18 (2006.01)
G06G 7/00 (2006.01)

(52) U.S. Cl. ...................................................... 706/20
(58) Field of Classification Search ............. 706/45–47; 705/32, 1
See application file for complete search history.

(56) References Cited

U.S. PATENT DOCUMENTS

| | | | |
|---|---|---|---|
| 3,749,892 A | 7/1973 | Stenning | |
| 3,933,305 A | 1/1976 | Murphy | |
| 4,626,992 A | 12/1986 | Greaves et al. | |
| 4,656,592 A | 4/1987 | Spaanenburg et al. | |
| 4,821,220 A | 4/1989 | Duisberg | |
| 4,839,804 A | 6/1989 | Roberts et al. | |
| 4,943,932 A * | 7/1990 | Lark et al. | 706/60 |
| 4,989,141 A | 1/1991 | Lyons | |
| 5,086,479 A * | 2/1992 | Takenaga et al. | 382/157 |
| 5,128,861 A | 7/1992 | Kagami | |
| 5,191,522 A | 3/1993 | Bosco et al. | |
| 5,193,055 A | 3/1993 | Brown | |
| 5,214,743 A * | 5/1993 | Asai et al. | 706/31 |
| 5,220,559 A * | 6/1993 | Tsuzuki et al. | 700/4 |
| 5,224,034 A | 6/1993 | Katz | |
| 5,228,117 A * | 7/1993 | Fukui et al. | 706/53 |
| 5,237,495 A | 8/1993 | Morii | |
| 5,237,496 A | 8/1993 | Kagami | |
| 5,295,197 A * | 3/1994 | Takenaga et al. | 382/158 |
| 5,317,504 A | 5/1994 | Nakayama | |

(Continued)

FOREIGN PATENT DOCUMENTS

EP 0 587 290 A2 3/1994

(Continued)

OTHER PUBLICATIONS

Semantic Labeling of Data by Using the Web Rigutini, L.; Di Iorio, E.; Ernandes, M.; Maggini, M.; Web Intelligence and International Agent Technology Workshops, 2006. WI-IAT 2006 Workshops. 2006 IEEE/WIC/ACM International Conference on Dec. 18-22, 2006 pp. 638-641 Digital Object Identifier 10.1109/WI-IATW.2006.118.*

(Continued)

*Primary Examiner*—Michael B Holmes

(57) ABSTRACT

A system (100), method and media for an entity centric computer that develops, entity knowledge before analyzing, applying, distributing, maintaining, replicating and/or synchronizing said knowledge as required and/or requested.

43 Claims, 28 Drawing Sheets

U.S. PATENT DOCUMENTS

| | | | |
|---|---|---|---|
| 5,359,701 A * | 10/1994 | Fukui et al. ............... 706/53 |
| 5,361,201 A | 11/1994 | Jost et al. |
| 5,377,122 A | 12/1994 | Werner et al. |
| 5,406,477 A | 4/1995 | Harhen |
| 5,408,411 A | 4/1995 | Nakamura et al. |
| 5,414,621 A | 5/1995 | Hough |
| 5,459,659 A | 10/1995 | Takenaka |
| 5,471,611 A | 11/1995 | McGregor |
| 5,485,600 A | 1/1996 | Joseph et al. |
| 5,506,938 A * | 4/1996 | Fukui et al. ............... 706/53 |
| 5,524,175 A * | 6/1996 | Sato et al. ............... 706/41 |
| 5,563,988 A | 10/1996 | Maes et al. |
| 5,576,965 A * | 11/1996 | Akasaka et al. ............ 700/97 |
| 5,604,840 A * | 2/1997 | Asai et al. ............... 706/10 |
| 5,621,790 A | 4/1997 | Grossman et al. |
| 5,638,492 A * | 6/1997 | Maeda et al. ............ 706/45 |
| 5,644,727 A | 7/1997 | Atkins |
| 5,649,181 A | 7/1997 | French et al. |
| 5,666,288 A | 9/1997 | Jones et al. |
| 5,668,591 A | 9/1997 | Shintani |
| 5,677,997 A | 10/1997 | Talatik |
| 5,680,305 A | 10/1997 | Apgar |
| 5,694,539 A | 12/1997 | Haley et al. |
| 5,704,045 A | 12/1997 | King et al. |
| 5,704,055 A | 12/1997 | George et al. |
| 5,706,495 A | 1/1998 | Chadha et al. |
| 5,715,371 A * | 2/1998 | Ahamed et al. ............ 706/10 |
| 5,737,581 A | 4/1998 | Keane |
| 5,742,775 A | 4/1998 | King |
| 5,765,154 A | 6/1998 | Horikiri et al. |
| 5,774,873 A | 6/1998 | Berent |
| 5,783,909 A | 7/1998 | Hochstein |
| 5,790,778 A | 8/1998 | Bush et al. |
| 5,794,219 A | 8/1998 | Brown |
| 5,802,501 A | 9/1998 | Graff |
| 5,809,282 A | 9/1998 | Cooper |
| 5,812,987 A | 9/1998 | Luskin et al. |
| 5,812,988 A | 9/1998 | Sandretto |
| 5,819,237 A | 10/1998 | Garman |
| 5,831,853 A | 11/1998 | Bobrow et al. |
| 5,875,431 A | 2/1999 | Heckman et al. |
| 5,887,120 A * | 3/1999 | Wical ............ 706/46 |
| 5,905,789 A | 5/1999 | Will |
| 5,917,891 A | 6/1999 | Will |
| 5,995,945 A | 11/1999 | Notani et al. |
| 5,997,167 A | 12/1999 | Crater et al. |
| 6,043,867 A | 3/2000 | Saban |
| 6,064,971 A | 5/2000 | Hartnett |
| 6,064,972 A | 5/2000 | Jankowitz et al. |
| 6,065,003 A | 5/2000 | Sedluk |
| 6,073,115 A | 6/2000 | Marshall |
| 6,078,901 A | 6/2000 | Ching |
| 6,092,056 A | 7/2000 | Tull, Jr. et al. |
| 6,112,188 A | 8/2000 | Hartnett |
| 6,125,355 A | 9/2000 | Bekaert et al. |
| 6,134,536 A | 10/2000 | Shepherd |
| 6,148,293 A | 11/2000 | King |
| 6,167,117 A | 12/2000 | Will |
| 6,173,276 B1 | 1/2001 | Kant |
| 6,189,011 B1 | 2/2001 | Lim et al. |
| 6,209,124 B1 | 3/2001 | Vermeire et al. |
| 6,230,486 B1 | 5/2001 | Yasui et al. |
| 6,249,784 B1 | 6/2001 | Macke et al. |
| 6,263,314 B1 | 7/2001 | Donner |
| 6,266,605 B1 | 7/2001 | Yasui et al. |
| 6,272,449 B1 | 8/2001 | Passera |
| 6,278,981 B1 | 8/2001 | Dembo et al. |
| 6,282,531 B1 | 8/2001 | Haughton et al. |
| 6,301,584 B1 | 10/2001 | Ranger |
| 6,317,787 B1 | 11/2001 | Boyd et al. |
| 6,324,533 B1 * | 11/2001 | Agrawal et al. ............ 707/3 |
| 6,327,590 B1 | 12/2001 | Chidlovskii et al. |
| 6,330,564 B1 * | 12/2001 | Hellerstein et al. .......... 707/101 |
| 6,332,130 B1 | 12/2001 | Notani et al. |
| 6,332,163 B1 | 12/2001 | Bowman-Amuah |
| 6,337,552 B1 | 1/2002 | Inoue et al. |
| 6,347,306 B1 * | 2/2002 | Swart ............ 705/32 |
| 6,362,589 B1 | 3/2002 | Inoue et al. |
| 6,366,934 B1 | 4/2002 | Cheng et al. |
| 6,377,263 B1 | 4/2002 | Falacara et al. |
| 6,418,448 B1 | 7/2002 | Sarkar |
| 6,490,560 B1 | 12/2002 | Ramaswamy et al. |
| 6,490,579 B1 | 12/2002 | Gao et al. |
| 6,507,353 B1 | 1/2003 | Huard et al. |
| 6,520,861 B2 | 2/2003 | Shoji et al. |
| 6,564,213 B1 | 5/2003 | Ortega et al. |
| 6,584,507 B1 | 6/2003 | Bradley et al. |
| 6,633,863 B1 | 10/2003 | Gert et al. |
| 6,639,591 B2 | 10/2003 | Shoji et al. |
| 6,654,389 B1 | 11/2003 | Brunheroto et al. |
| 6,654,730 B1 * | 11/2003 | Kato et al. ............ 706/22 |
| 6,667,593 B2 | 12/2003 | Inoue et al. |
| 6,671,673 B1 | 12/2003 | Baseman et al. |
| 6,684,204 B1 | 1/2004 | Lal |
| 6,704,032 B1 | 3/2004 | Falcon et al. |
| 6,732,095 B1 | 5/2004 | Warshavsky et al. |
| 6,738,753 B1 | 5/2004 | Hogan |
| 6,741,973 B1 | 5/2004 | Dove et al. |
| 6,785,651 B1 | 8/2004 | Wang |
| 6,795,811 B1 | 9/2004 | Epstein |
| 6,816,753 B2 | 11/2004 | Sakamoto et al. |
| 6,836,719 B2 | 12/2004 | Andersson et al. |
| 6,836,773 B2 | 12/2004 | Tamayo et al. |
| 6,876,992 B1 | 4/2005 | Sullivan |
| 6,909,708 B1 | 6/2005 | Krishnaswamy et al. |
| 6,910,135 B1 | 6/2005 | Grainger |
| 6,941,499 B1 | 9/2005 | Sung et al. |
| 6,947,870 B2 | 9/2005 | Zhu et al. |
| 6,947,988 B1 | 9/2005 | Saleh |
| 6,961,731 B2 | 11/2005 | Holbrook |
| 7,006,992 B1 | 2/2006 | Packwood |
| 7,024,589 B2 | 4/2006 | Hartman et al. |
| 7,047,227 B2 | 5/2006 | Batachia et al. |
| 7,069,204 B1 | 6/2006 | Solden et al. |
| 7,076,713 B1 | 7/2006 | Hess |
| 7,085,683 B2 * | 8/2006 | Anderson et al. .......... 702/186 |
| 7,089,237 B2 | 8/2006 | Turnbull et al. |
| 7,089,518 B2 | 8/2006 | Bair et al. |
| 7,096,299 B2 | 8/2006 | Meynard |
| 7,162,379 B2 | 1/2007 | Jang et al. |
| 7,170,510 B2 | 1/2007 | Kawahara et al. |
| 7,181,438 B1 | 2/2007 | Szabo |
| 7,194,070 B2 | 3/2007 | Starbuck et al. |
| 7,216,121 B2 | 5/2007 | Bachman et al. |
| 7,219,073 B1 | 5/2007 | Taylor et al. |
| 7,219,105 B2 | 5/2007 | Kummamuru et al. |
| 7,246,080 B2 | 7/2007 | Feldman et al. |
| 7,249,342 B2 | 7/2007 | Pack et al. |
| 7,250,944 B2 * | 7/2007 | Anderson et al. .......... 345/419 |
| 7,260,498 B2 | 8/2007 | Battenfelder et al. |
| 2001/0034268 A1 | 10/2001 | Eder |
| 2001/0034686 A1 | 10/2001 | Eder |
| 2001/0041995 A1 | 11/2001 | Eder |
| 2001/0041996 A1 | 11/2001 | Eder |
| 2002/0002520 A1 | 1/2002 | Gatto |
| 2002/0016758 A1 | 2/2002 | Grigsby |
| 2002/0023034 A1 | 2/2002 | Brown et al. |
| 2002/0046143 A1 | 4/2002 | Eder |
| 2002/0052820 A1 | 5/2002 | Gatto |
| 2002/0087532 A1 | 7/2002 | Barritz |
| 2002/0087535 A1 | 7/2002 | Kotcheff |
| 2002/0147880 A1 | 10/2002 | Wang et al. |
| 2002/0152222 A1 | 10/2002 | Holbrook |
| 2002/0169759 A1 | 11/2002 | Kraft |

| | | |
|---|---|---|
| 2003/0018961 A1 | 1/2003 | Ogasawara |
| 2003/0037043 A1 | 2/2003 | Chang et al. |
| 2003/0083973 A1 | 5/2003 | Horsfall |
| 2003/0217097 A1 | 11/2003 | Eitel |
| 2004/0083101 A1 | 4/2004 | Brown et al. |
| 2004/0088239 A1 | 5/2004 | Eder |
| 2004/0100494 A1 | 5/2004 | Ragoler et al. |
| 2004/0107181 A1 | 6/2004 | Rodden |
| 2004/0139106 A1 | 7/2004 | Bachman et al. |
| 2004/0172319 A1 | 9/2004 | Eder |
| 2004/0193503 A1 | 9/2004 | Eder |
| 2004/0193894 A1 | 9/2004 | Chaudhari |
| 2004/0194099 A1 | 9/2004 | Lamping et al. |
| 2004/0199445 A1 | 10/2004 | Eder |
| 2004/0215495 A1 | 10/2004 | Eder |
| 2004/0215522 A1 | 10/2004 | Eder |
| 2004/0225629 A1 | 11/2004 | Eder |
| 2004/0236621 A1 | 11/2004 | Eder |
| 2004/0236673 A1 | 11/2004 | Eder |
| 2004/0254932 A1 | 12/2004 | Gupta et al. |
| 2004/0260695 A1 | 12/2004 | Brill |
| 2005/0027507 A1 | 2/2005 | Patrudu |
| 2005/0060311 A1 | 3/2005 | Tong et al. |
| 2005/0071266 A1 | 3/2005 | Eder |
| 2005/0071328 A1 | 3/2005 | Lawrence |
| 2005/0119900 A1 | 6/2005 | Eder |
| 2005/0119919 A1 | 6/2005 | Eder |
| 2005/0119922 A1 | 6/2005 | Eder |
| 2005/0119959 A1 | 6/2005 | Eder |
| 2005/0149496 A1 | 7/2005 | Mukherjee et al. |
| 2005/0154711 A1 | 7/2005 | McConnell |
| 2005/0165777 A1 | 7/2005 | Hurst-Hiller |
| 2005/0187920 A1 | 8/2005 | Tenembaum |
| 2007/0101566 A1 | 9/2005 | Szabo |
| 2005/0237939 A1 | 10/2005 | Corl et al. |
| 2005/0251468 A1 | 11/2005 | Eder |
| 2006/0143115 A1 | 6/2006 | Eder |
| 2006/0184449 A1 | 8/2006 | Eder |

FOREIGN PATENT DOCUMENTS

GB 2 253 081 A 2/1992

OTHER PUBLICATIONS

Virtual reality: imagery knowledge processing and emergent reasoning Shapiro, D.; Neuroinformatics and Neurocomputers, 1995., Second International Symposium on Sep. 20-23, 1995 pp. 430-437 Digital Object Identifier 10.1109/ISNINC.1995.480893.*
Zipp, Alan S.; Business valuation methods; 1993, AICPA.
Davidow, William; Accounting systems are completely wrong, Jan. 1995,Red Herring.
McTaggert, James, Kontes, Peter and Mankins, Michael, The value imperative, 1994,The Free Press.
Rappaport, Alfred; Creating shareholder value; 1986, The Free Press.
Ritchken, Peter, Options, Theory, Strategy and Applications, 1987, Foresman and Company.
Dixit, Avinash & Pindyck, Robert; Investment under uncertainty; 1994; Princeton University Press.
Garson, David; Interpreting neural network connection weights, Apr. 1, 1991, AI Expert.
Wellstead, Stephen; Neural network and fuzzy logic applications in C/C++; 1994; John Wiley & Sons.
Most, Kenneth; Accounting theory; 1977,Grid, Inc.
Hendriksen, Elden, Accounting theory, 1982, Richard D. Irwin.
Kulkarni, Arun; Artificial neural networks for image understanding; Jan. 1, 1994; Van Norstrand Reinhold.
Ward Systems Group; NeuroWindows User Manual; 1993; Wards Systems Group.
Brealey, Richard & Myers, Stewart; Principles of Corporate Finance; 1991; McGraw Hill.
Faulkner, Terrence; Applying options thinking to R&D valuation; May 1, 1996; Research Technology Manage.
Miller, Merton & Modigliani, Franco, Dividend policy, growth and the valuation of shares, Oct. 1, 1961.
Simensky, Melvin & Bryer, Lanning; The new role of intellectual property in commercial transactions.
Wilson, Albert, Emerging approaches to impaired property valuation, Apr. 1, 1996, Appraisal Journal, v64.
Brown, Gordon T, Free cash flow appraisal, a better way, Apr. 1, 1996, Appraisal Journal, V64, No. 2.
Business Editors & Real Estate Industry Writers, EQK Realty Investors I, Apr. 2, 1992, Press Release.
Swad, Randy, Business valuation, applicable standards for CPA's, Sep. 1, 1995, CPA Journal v65, No. 9.
Reilly, Robert; Valuation of intangibles for bankruptcy and reorganization purposes; Aug. 1, 1994; Ohio.
Liebich, Kim; How to value a bank; Aug. 1, 1995; ABA Banking Journal.
Baumann, Barbara H & Oxaal, Marjorie R; Estimating the value of a group medical practice, a primer.
Maxson, Mark; Will you get your money's worth?, May 1, 1993, Financial Executive.
Friedman, Richard; Business valuation: calculating it right; Oct. 1, 1994; Practical Accountant.
Mullen, Maggie; How to value intangibles; Nov. 1, 1993; Accountancy.
Stewart, Thomas; Trying to grasp the intangible; Oct. 2, 1995 Fortune.
Ourosoff, Alexandra; What the world's top brands are worth; Sep. 1, 1992; Finance World.
Phillips Business Information, Inc.; Five ways to reduce risk with neural networks; Sep. 27, 1993; Credi.
Lippitt, Jeffrey & Mastracchio, Nicholas, Developing capitalization rates for valuing a business 11.
Hirsch, A. Ethan, What's it worth?, Dec. 21, 1992, Accounting Today, v6, No. 24, p. 16.
Myers, Stewart & Howe, Christopher; A life-cycle financial model of Pharmaceutical R&D; Apr. 1, 1997;MIT.
Simon, Carol J. & Sullivan, Mary W.; The Measurement and Determinants of Brand Equity; Oct. 1, 1993; Ma.
Sveiby, Karl Erik & Mellander, Klas; Tango Learning Guide Version 2.1; 1994; Celemi.
Kaufman, J. Jerry; Value Management; 1998; Crisp.
HBS Press; Measuring Corporate Performance; 1998; HBS Press.
Kaplan, Robert & Norton, David; The Balanced Scorecard; 1996; HBS Press.
Morris, Henry; Extending the Business Process, Oct. 6, 1998, IDC Presentation.
Amir, Eli; & Lev, Baruch, "Value-relevance of non-financial information", Journal of Accounting and.
Ernst & Young, Measures that Matter.
Bouquet, Paolo, Searafini, Luciano, et al; Modeling and Using Context—Context 99, Sep. 1999, Springer.
Akman, Varol, Bouquet, Paolo, et al; Modeling and Using Context—Context 2001, Jul. 2001, Springer.
Blackburn, Patrick, Ghidini, Chiara, et al; Modeling and Using Context—Context 2003, Jun. 2003, Springe.
Franke, Jurgen, Hadle, Wolfgang, et al; Measuring Risk in Complex Stochastic Systems; 2000, Springe.
Shimpi, Prakash, Integrating Corporate Risk Management, Oct. 1999, Swiss Re New Markets.
Brewka, Gerhard, Principles of Knowledge Representation, 1996, CSLI Publications.
Reiter, Raymond, Knowledge in Action, 2001, MIT Press.
Tissen, Rene, Andriessen, Daniel, et al; The Knowledge Dividend, 2000, Prentice Hall.
Rumizen, Melissie Clemmons; The Complete Idiot's Guide to Knowledge Management; 2002, CWL Publishing.
Chappell, David & Jewell, Tyler, Java Web Services; 2002, O'Reilly.
Kluge, Jurgen, Stein, Wolfram, Licht, Thomas, Knowledge Unplugged, 2001, Palgrave.
Conway, Susan & Sligar, Char, Unlocking Knowledge Assets, 2002, Microsoft Press.
Marcus, Robert & Watters, Beverley; Collective Knowledge, 2002, Microsoft Press.

Hancock, John, Huber, Peter, Koch, Pablo, The economics of insurance, 2001, Swiss Re Press.
Fahy, Martin, Strategic Enterprise Management Systems, 2001, CIMA.
Shafer, Glenn & Vovk, Vladimir, Probability and Finance, 2001, John Wiley & Sons.
Barabasi, Albert-Laszlo, Linked—the new science of networks, Apr. 2002; Perseus.
Hildenbrand, Carol , "Putting two and two together", Darwin, Jan. 2002, p. 51.
Upton, Wayne, "Special Report: Business and Financial Reporting, Challenges of the New Economy," FAS.
Glass, Graham, Web Services, Prentice Hall, 2002.
CIO Insight, "Special Issue: The Alignment Gap", Ziff Davis Media, No. 15, 2002.
Kuehne, Sven, et al, "SEQL: Category learning as progressive abstraction using structure mapping", 2.
Brown, John Seely, et al, Loosening up: How process networks unlock the power of specialization, 20.
Pfeffer, Avi, "A Bayesian Language for Cumulative Learning", 2000, AAII.
Clark, Peter, et al, "Knowledge entry as graphical assembly of components", 2001, K-Cap 01.
Blythe, Jim, "An Integrated Environment for Knowledge Acquisition", 2001, Intelligent User Interface.
Quinn, James Brian, Intelligent Enterprise, Free Press, 1992.
Fowler, Martin; Analysis Patterns: Reusable Object Models, 1997, Addison Wesley.
Koller, Timothy, "What is value based management", McKinsey Quarterly, 1994, No. 3.
Brown, Carol; Coakley, James; Phillips, Mary Ellen, Neural Networks Enter World of Mgmt Accounting.
Bielinski, Daniel, "How to sort out the premium drivers of post deal value", Mergers & Acquisitions.
Bergstrom, Peter; Kimber Eliot, "Formal data models for SGML and HyTime", SGML, Mar. 1999, electrum.
Harold, Elliotte, XML Bible, IDG Books, 1999.
Knight, James, Value Based Management, McGraw Hill, 1998.
NeuroSolutions, Application Summaries.
Copeland, Tom, Koller, Tim, Murrin, Jack, Valuation, John Wiley and Sons, 1994.
Brown, Carolyn, Phillips, Mary Ellen, Expert Systems for Management Accounting Tasks, IMA Foundation.
Anonymous, "Survey: Too Clever by Half", The Economist, Jan. 24, 2004.
Caouette, John, Altman, Edward & Narayanan, Paul, Managing Credit Risk, John Wiley and Sons, Inc.
Chicago Board of Trade, "SPAN Margin System", Aug. 27, 1991.
Chicago Mercantile Exchange, "SPAN—Frequently Asked Questions", CME web site, Feb. 17, 2006.
Everest, Gordon, Database Management, McGraw Hill, 1986.
Siegel, Jeremy, "The Noisy Market Hypothesis", Wall Street Journal, Jun. 14, 2006.
CSG Computer Support Group, Computer, Telephony and Electronics Industry Glossary, CSG, Aug. 28, 2006.
Caouette, John, Altman, Edward & Narayanan, Paul, Managing Credit Risk, 1998, John Wiley and Sons.
Lohr, Steve, "Gates tries to inspire future techies", International Herald Tribune, Mar. 2, 2004.
Barua, Anitesh; Lee, C.H. Sophie; Whinston, Andrew, "The Calculus of Reengineering", Aug. 1994.
Haesendonckx, Michel, "VBM—Value Driver Tree", Jun. 8, 2005.
Culp, Christopher et al, "Value at Risk for Asset Managers", Derivatives Quarterly, vol. 5, Jan. 8, 1999.
Maier, David, "Database Desiderate for an XML Query Language", W3.org, 1998.
Widom, Jennifer, "Data Management for XML, Research Directions", IEEE, Jul. 1999.
W3C, "Extensible Markup Language (XML)", W3C web site, Apr. 14, 2005.
Goldfarb, Charles; & Prescod, Paul; XML Handbook; Prentice Hall, 1998.
University of Maryland University College, "Intelligent Agents and how they are changing our learning", UMUC website, Aug. 20, 2003.
Roll, Richard, "A Mean/Variance Analysis of Tracking Error", pp. 13-22, V18, Summer 1992, Journal of Portfolio Management, U.S.A.
Green, Paul & Krieger, Anna; "Models and Heuristics for Product Line Selection", Marketing Science, vol. 4, No. 1, pp. 1-9, Winter 1995, U.S.A.
The Encode Project Consortium, "Identification and analysis of functional elements in 1% of the human genome", Nature, Jun. 14, 2007, V 445, p. 799-816, USA.
Hochman, Jonathan, "Search Marketing and Web Page Download Speed", Sep. 5, 2007, searchengineland.com.
Hypknowsys, "Web-Log Preparaton with WUM Prep", Oct. 18, 2005, www.sourceforge.com.
Caruso, Denise, "A challenge to gene theory, a tougher look at biotech", New York Times, Jul. 1, 2007, New York, U.S.A.
Eder, Jeff, "Economics of sustainable design", from Resource Guide for Sustainable Development, pp. 25-43, Vulcan Real Estate, Oct. 4, 2002, Seattle, WA.

\* cited by examiner

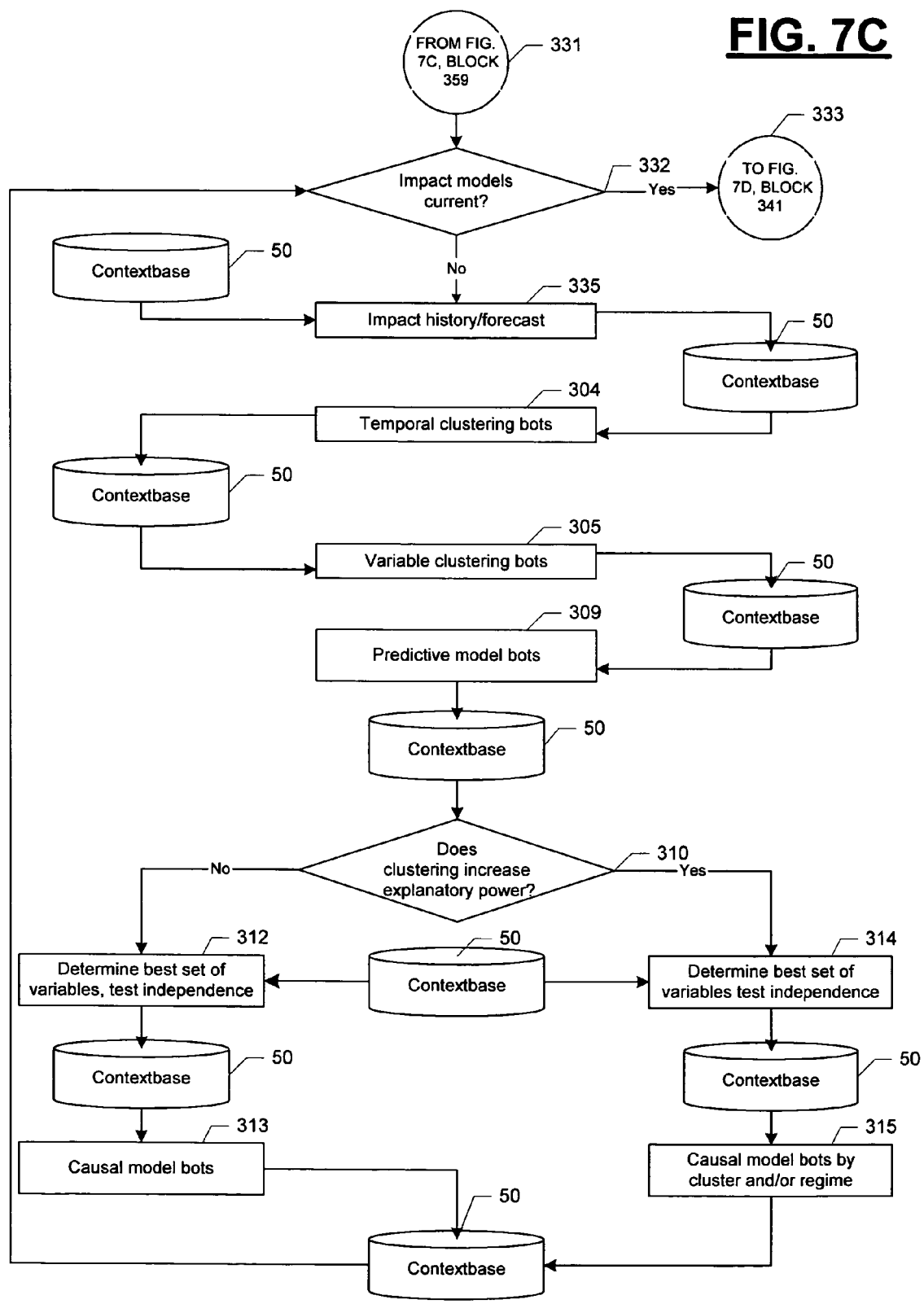

Copyright 2003 Jeff S. Eder All rights reserved

ENTITY CENTRIC COMPUTER SYSTEM

RELATED PROVISIONAL APPLICATIONS AND CROSS REFERENCE TO RELATED APPLICATIONS AND PATENTS

This application claims priority from provisional application No. 60/432,283 filed on Dec. 10, 2002 and provisional application No. 60/464,837 filed on Apr. 23, 2003 the disclosures of which are incorporated herein by reference. The subject matter of this application is related to the subject matter of U.S. patent application Ser. No. 11/262,146 filed Oct. 28, 2005, U.S. patent application Ser. No. 11/268,021 filed Nov. 7, 2005, U.S. patent application Ser. No. 11/094,171 filed Mar. 31, 2005, U.S. patent application Ser. No. 11/279,104 filed Mar. 8, 2006, U.S. patent application Ser. No. 11/358,196 filed Feb. 21, 2006 and U.S. Pat. No. 7,039,654 issued May 2, 2006 the disclosures of which are incorporated herein by reference.

BACKGROUND OF THE INVENTION

This invention relates to methods, systems and media for an entity centric computer system that develops entity knowledge before analyzing, maintaining, distributing, integrating, synchronizing and applying said knowledge as required and/or requested.

SUMMARY OF THE INVENTION

It is a general object of the present invention to provide a novel, useful system that develops and maintains knowledge in a systematic fashion for entities in one or more domains and supports the distribution, synchronization, integration, analysis and application of this knowledge using a Complete Context™ Suite of applications (625), a Complete Context™ Development System (610), a Complete Context™ Bot (650), a narrow system (4) and/or a device (3) as required and/or as requested.

The innovative system of the present invention supports the development and integration of any combination of data, information and knowledge from systems that analyze, monitor and/or support entities in three distinct areas, a social environment area (1000), a natural environment area (2000) and a physical environment area (3000). Each of these three areas can be further subdivided into domains. Each domain can in turn be divided into a hierarchy or group. Each member of a hierarchy or group is a type of entity.

The social environment area (1000) includes a political domain hierarchy (1100), a habitat domain hierarchy (1200), an intangibles domain group (1300), an interpersonal domain hierarchy (1400), a market domain hierarchy (1500) and an organization domain hierarchy (1600). The political domain hierarchy (1100) includes a voter entity type (1101), a precinct entity type (1102), a caucus entity type (1103), a city entity type (1104), a county entity type (1105), a state/province entity type (1106), a regional entity type (1107), a national entity type (1108), a multi-national entity type (1109) and a global entity type (1110). The habitat domain hierarchy includes a household entity type (1202), a neighborhood entity type (1203), a community entity type (1204), a city entity type (1205) and a region entity type (1206). The intangibles domain group (1300) includes a brand entity type (1301), an expectations entity type (1302), an ideas entity type (1303), an ideology entity type (1304), a knowledge entity type (1305), a law entity type (1306), a money entity type (1307), a right entity type (1308), a relationship entity type (1309) and a service entity type (1310). The interpersonal domain hierarchy includes (1400) includes an individual entity type (1401), a nuclear family entity type (1402), an extended family entity type (1403), a clan entity type (1404) and an ethnic group entity type (1405). The market domain hierarchy (1500) includes a multi entity type organization entity type (1502), an industry entity type (1503), a market entity type (1504) and an economy entity type (1505). The organization hierarchy (1600) includes team entity type (1602), a group entity type (1603), a department entity type (1604), a division entity type (1605), a company entity type (1606) and an organization entity type (1607). These relationships are summarized in Table 1.

TABLE 1

| Social Environment Domains | Members (lowest level to highest for hierarchies) |
|---|---|
| Political (1100) | voter (1101), precinct (1102), caucus (1103), city (1104), county (1105), state/province (1106), regional (1107), national (1108), multi-national (1109), global (1110) |
| Habitat (1200) | household (1202), neighborhood (1203), community (1204), city (1205), region (1206) |
| Intangibles Group (1300) | brand (1301), expectations (1302), ideas (1303), ideology (1304), knowledge (1305), law (1306), intangible assets (1307), right (1308), relationship (1309), service (1310) |
| Interpersonal (1400) | individual (1401), nuclear family (1402), extended family (1403), clan (1404), ethnic group (1405) |
| Market (1500) | multi entity organization (1502), industry (1503), market (1504), economy (1505) |
| Organization (1600) | team (1602), group (1603), department (1604), division (1605), company (1606), organization (1607) |

The natural environment area (2000) includes a biology domain hierarchy (2100), a cellular domain hierarchy (2200), an organism domain hierarchy (2300) and a protein domain hierarchy (2400) as shown in Table 2. The biology domain hierarchy (2100) contains a species entity type (2101), a genus entity type (2102), a family entity type (2103), an order entity type (2104), a class entity type (2105), a phylum entity type (2106) and a kingdom entity type (2107). The cellular domain hierarchy (2200) includes a macromolecular complexes entity type (2202), a protein entity type (2203), a rna entity type (2204), a dna entity type (2205), an x-ylation** entity type (2206), an organelles entity type (2207) and cells entity type (2208). The organism domain hierarchy (2300) contains a structures entity type (2301), an organs entity type (2302), a systems entity type (2303) and an organism entity type (2304). The protein domain hierarchy contains a monomer entity type (2400), a dimer entity type (2401), a large oligomer entity type (2402), an aggregate entity type (2403) and a particle entity type (2404). These relationships are summarized in Table 2.

TABLE 2

| Natural Environment Domains | Members (lowest level to highest for hierarchies) |
|---|---|
| Biology (2100) | species (2101), genus (2102), family (2103, order (2104), class (2105), phylum (2106), kingdom (2107) |
| Cellular* (2200) | macromolecular complexes (2102), protein (2103), rna (2104), dna (2105), x-ylation** (2106), organelles (2107), cells (2108) |

TABLE 2-continued

| Natural Environment Domains | Members (lowest level to highest for hierarchies) |
|---|---|
| Organism (2300) | structures (2301), organs (2302), systems (2303), organism (2304) |
| Proteins (2400) | monomer (2400), dimer (2401), large oligomer (2402), aggregate (2403), particle (2404) |

*includes viruses
**x = methyl, phosphor, etc.

The physical environment area (3000) contains a chemistry group (3100), a geology domain hierarchy (3200), a physics domain hierarchy (3300), a space domain hierarchy (3400), a tangible goods domain hierarchy (3500), a water group (3600) and a weather group (3700) as shown in Table 3. The chemistry group (3100) contains a molecules entity type (3101), a compounds entity type (3102), a chemicals entity type (3103) and a catalysts entity type (3104). The geology domain hierarch contains a minerals entity type (3202), a sediment entity type (3203), a rock entity type (3204), a landform entity type (3205), a plate entity type (3206), a continent entity type (3207) and a planet entity type (3208). The physics domain hierarchy (3300) contains a quark entity type (3301), a particle zoo entity type (3302), a protons entity type (3303), a neutrons entity type (3304), an electrons entity type (3305), an atoms entity type (3306), and a molecules entity type (3307). The space domain hierarchy contains a dark matter entity type (3402), an asteroids entity type (3403), a comets entity type (3404), a planets entity type (3405), a stars entity type (3406), a solar system entity type (3407), a galaxy entity type (3408) and universe entity type (3409). The tangible goods hierarchy contains a compounds entity type (3502), a minerals entity type (3503), a components entity type (3504), a subassemblies entity type (3505), an assemblies entity type (3506), a subsystems entity type (3507), a goods entity type (3508) and a systems entity type (3509). The water group (3600) contains a pond entity type (3602), a lake entity type (3603), a bay entity type (3604), a sea entity type (3605), an ocean entity type (3606), a creek entity type (3607), a stream entity type (3608), a river entity type (3609) and a current entity type (3610). The weather group (3700) contains an atmosphere entity type (3701), a clouds entity type (3702), a lightning entity type (3703), a precipitation entity type (3704), a storm entity type (3705) and a wind entity type (3706).

TABLE 3

| Physical Environment Domains | Members (lowest level to highest for hierarchies) |
|---|---|
| Chemistry Group (3100) | molecules (3101), compounds (3102), chemicals (3103), catalysts (3103) |
| Geology (3200) | minerals (3202), sediment (3203), rock (3204), landform (3205), plate (3206), continent (3207), planet (3208) |
| Physics (3300) | quark (3301), particle zoo (3302), protons (3303), neutrons (3304), electrons (3305), atoms (3306), molecules (3307) |
| Space (3400) | dark matter (3402), asteroids (3403), comets (3404), planets (3405), stars (3406), solar system (3407), galaxy (3408), universe (3409) |
| Tangible Goods (3500) | money (3501), compounds (3502), minerals (3503), components (3504), subassemblies (3505), assemblies (3506), subsystems (3507), goods (3508), systems (3509) |
| Water Group (3600) | pond (3602), lake (3603), bay (3604), sea (3605), ocean (3606), creek (3607), stream (3608), river (3609), current (3610) |
| Weather Group (3700) | atmosphere (3701), clouds (3702), lightning (3703), precipitation (3704), storm (3705), wind (3706) |

Individual entities are items of one or more entity type, elements associated with one or more entity type, resources associated with one or more entity type and combinations thereof. Because of this, analyses of entities can be linked together to support an analysis that extends vertically across several domains. Entities can also be linked together horizontally to follow a chain of events that impacts an entity. These vertical and horizontal chains are partially recursive. The domain hierarchies and groups shown in Tables 1, 2 and 3 can be organized into different areas and they can also be expanded, modified, extended or pruned as required to support different analyses.

Data, information and knowledge from these seventeen different domains are integrated and analyzed as required to support the creation of subject entity knowledge. The knowledge developed by this system is comprehensive. However, it focuses on the function performance (note the terms behavior and function performance will be used interchangeably) of a single entity as shown in FIG. 2A, a collaboration or partnership between two or more entities in one or more domains as shown in FIG. 2B and/or a multi entity system in one or more domains as shown in FIG. 3. FIG. 2A shows an entity (900) and the conceptual inter-relationships between a location (901), a project (902), an event (903), a virtual location (904), a factor (905), a resource (906), an element (907), an action/transaction (909), a function measure (910), a process (911), an entity mission (912), constraint (913) and a preference (914). FIG. 2B shows a collaboration (925) between two entities and the conceptual inter-relationships between locations (901), projects (902), events (903), virtual locations (904), factors (905), resources (906), elements (907), action/transactions (909), a joint measure (915), processes (911), a joint entity mission (916), constraints (913) and preferences (914). For simplicity we will hereinafter use the terms entity or subject entity with the understanding that they refer to an entity (900) as shown in FIG. 2A, a collaboration between two or more entities (925) as shown in FIG. 2B or a multi entity system (950) as shown in FIG. 3. The multi entity system (950) is particularly suited for multi-period simulations of the expected interaction between two or more entities such as a military campaign or a sales transaction.

Once the entity knowledge has been developed it is reviewed, analyzed, and applied using one or more of the applications in a Complete Context™ Suite (625). These applications are optionally modified to meet user requirements using a Complete Context™ Development System (610). The Complete Context™ Development System (610) supports the maintenance, distribution, integration and synchronization of the newly developed knowledge with applications in the Complete Context™ Suite (625) as well as the creation of newly defined stand-alone applications, services, software and/or bots that utilize said knowledge.

The system of the present invention systematically develops the knowledge required to support the comprehensive analysis of entity performance, develop a shared context to support entity collaboration, simulate entity performance and/or turn data into knowledge. Processing in the entity centric computer system (100) is completed in three steps:
1. entity definition and measure specification;
2. contextbase development; and
3. valid context space (aka principle) discovery and context frame creation.

The first processing step in the entity centric computer system (100) defines the entity, entity collaboration or multi-domain system that will be analyzed, prepares the data from entity narrow system databases (5), partner narrow system databases (6), external databases (7), the World Wide Web (8) and the Complete Context™ Input System (601) for use in processing and then uses this data to specify entity functions and function measures.

As part of the first stage of processing, the user (20) identifies the subject entity by using existing hierarchies and groups, adding a new hierarchy or group or modifying the existing hierarchies and/or groups as required to fully define the subject entity. As discussed previously, individual entities are defined by being items of one or more entity type, elements associated with one or more entity, entity type event and/or action, resources associated with one or more entity, entity type, event and/or action and combinations thereof. For example, a white blood cell entity is an item with the cell entity type (2108) and an element of the circulatory system and auto-immune system (2303). In a similar fashion, entity Jane Doe could be an item within the organism entity type (2200), an item within the voter entity type (1101), an element of a team entity (1602), an element of a nuclear family entity (1402), an element of an extended family entity (1403) and an element of a household entity (1202). This individual would be expected to have one or more functions and function measures for each entity type he or she is associated with. Separate systems that tried to analyze the six different roles of the individual in each of the six hierarchies would probably save the same data six separate times and use the same data in six different ways. At the same time, all of the work to create these six separate systems might provide very little insight because the complete context for this individuals behavior at any one point in time is a blend of the context associated with each of the different functions he or she is simultaneously performing in the different domains.

After the subject entity definition is completed, structured data and information, transaction data and information, descriptive data and information, unstructured data and information, text data and information, geo-spatial data and information, image data and information, array data and information, web data and information, video data and video information, device data and information, etc. are processed and made available for analysis by converting data formats as required before mapping this data to an entity contextbase (50) in accordance with a common schema, a common ontology or a combination thereof. The automated conversion and mapping of data and information from the existing devices (3) narrow computer-based system databases (5 & 6), external databases (7) and the World Wide Web (8) to a common schema, ontology or combination significantly increases the scale and scope of the analyses that can be completed by users. This innovation also promises to significantly extend the life of the existing narrow systems (4) that would otherwise become obsolete. The uncertainty associated with the data from the different systems is evaluated at the time of integration. Before going further, it should be noted that the entity centric computer system (100) is also capable of operating without completing some or all narrow system database (5 & 6) conversions and integrations as it can accept data that complies with the common schema, common ontology or some combination thereof. The entity centric computer system (100) is also capable of operating without any input from narrow systems. For example, the Complete Context™ Input System (601) (and any other application capable of producing xml documents) is fully capable of providing all required data directly to the entity centric computer system (100).

The entity centric computer system (100) supports the preparation and use of data, information and/or knowledge from the "narrow" systems (4) listed in Tables 4, 5, 6 and 7 and devices (3) listed in Table 8.

TABLE 4

| | |
|---|---|
| Biomedical Systems | affinity chip analyzer, array systems, biochip systems, bioinformatic systems; biological simulation systems, clinical management systems; diagnostic imaging systems, electronic patient record systems, electrophoresis systems, electronic medication management systems, enterprise appointment scheduling, enterprise practice management, fluorescence systems, formulary management systems, functional genomic systems, gene chip analysis systems, gene expression analysis systems, information based medical systems, laboratory information management systems, liquid chromatography, mass spectrometer systems; microarray systems; medical testing systems, molecular diagnostic systems, nano-string systems; nano-wire systems; peptide mapping systems, pharmacoeconomic systems, pharmacogenomic data systems, pharmacy management systems, practice management, protein biochip analysis systems, protein mining systems, protein modeling systems, protein sedimentation systems, protein visualization systems, proteomic data systems; structural biology systems; systems biology applications, x*-ylation analysis systems |

*x = methyl, phosphor,

TABLE 5

| | |
|---|---|
| Personal Systems | appliance management systems, automobile management systems, contact management applications, home management systems, image archiving applications, image management applications, media archiving applications, media applications, media management applications, personal finance applications, personal productivity applications (word processing, spreadsheet, presentation, etc.), personal database applications, personal and group scheduling applications, video applications |

TABLE 6

| | |
|---|---|
| Scientific Systems | atmospheric survey systems, geological survey systems; ocean sensor systems, seismographic systems, sensor grids, sensor networks, smart dust |

TABLE 7

| | |
|---|---|
| Organization Systems | accounting systems**; advanced financial systems, alliance management systems; asset and liability management systems, asset management systems; battlefield systems, behavioral risk management systems; benefits administration systems; brand management systems; budgeting/financial planning systems; business intelligence systems; call management systems; cash management systems; channel management systems; claims management systems; command systems, commodity risk management systems; content management systems; contract management systems; credit-risk |

TABLE 7-continued management systems; customer relationship management systems; data integration systems; data mining systems; demand chain systems; decision support systems; device management systems document management systems; email management systems; employee relationship management systems; energy risk management systems; expense report processing systems; fleet management systems; foreign exchange risk management systems; fraud management systems; freight management systems; geological survey systems; human capital management systems; human resource management systems; incentive management systems; information lifecycle management systems, information technology management systems, innovation management systems; insurance management systems; intellectual property management systems; intelligent storage systems, interest rate risk management systems; investor relationship management systems; knowledge management systems; litigation tracking systems; location management systems; maintenance management systems; manufacturing execution systems; material requirement planning systems; metrics creation system; online analytical processing systems; ontology systems; partner relationship management systems; payroll systems; performance dashboards; performance management systems; price optimization systems; private exchanges; process management systems; product life-cycle management systems; project management systems; project portfolio management systems; revenue management systems; risk management information systems, sales force automation systems; scorecard systems; sensors (includes RFID); sensor grids (includes RFID); service management systems; simulation systems; six-sigma quality management systems; shop floor control systems; strategic planning systems; supply chain systems; supplier relationship management systems; support chain systems; system management applications, taxonomy systems; technology chain systems; treasury management systems; underwriting systems; unstructured data management systems; visitor (web site) relationship management systems; weather risk management systems; workforce management systems; yield management systems and combinations thereof

**these typically include an accounts payable system, accounts receivable system, inventory system, invoicing system, payroll system and purchasing system

TABLE 8

| Devices | personal digital assistants, phones, watches, clocks, lab equipment, personal computers, refrigerators, washers, dryers, hvac system controls, gps devices |
|---|---|

After data conversion is complete the user (20) is asked to specify entity functions. The user can select from pre-defined functions for each entity or define new functions using narrow system data. Examples of predefined entity functions are shown in Table 9.

TABLE 9

| Entity Type: | Example Functions |
|---|---|
| Organism (2300) | reproduction, killing germs, maintaining blood sugar levels |
| Organization (1600) | increasing investment value, destroying terrorist networks, maintaining full production capacity |
| Interpersonal (1400) | income, maintaining standard of living |

TABLE 9-continued

| Entity Type: | Example Functions |
|---|---|
| Water Group (3600) | biomass production, decomposing waste products, maintaining ocean salinity in a defined range |

Pre-defined quantitative measures can be used if pre-defined functions were used in defining the entity. Alternatively, new measures can be created using narrow system data for one or more entities and/or the system (100) can identify the best fit measures for the specified functions. The quantitative measures can take any form. For many entities the measures are simple statistics like percentage achieving a certain score, average time to completion and the ratio of successful applicants versus failures. Other entities use more complicated measures. For example, Table 10 shows three measures for a medical organization entity—patient element health, patient element longevity and organization financial break even. Commercial businesses generally have a shareholder maximization function that can be effectively analyzed using five measures—a current operation measure, a real option measure, an investment measure, a derivatives (aka leveraged investment) measure and a market sentiment measure. These five measures are pre-defined and available for use in the system of the present invention. The total risk associated with these five measures equals the risk associated with publicly traded equity of the commercial business. Using these pre-defined measures, the risk and return from a commercial business can then be compared to the risk and return offered by other investments and the supply of capital available for these alternative investments. The business return can also be compared to the required return for a given level of risk predicted by pre-defined market behavior models including the capital asset pricing model, the game theoretic capital asset pricing model, arbitrage pricing theory and prospect theory. Providing this background is an important part of defining the complete context for individuals and organizations making capital allocation decision. The entity centric computer system (100) incorporates the ability to use other pre-defined measures including each of the different types of risk—alone or in combination, value at risk, cash flow return on investment, accounting profit and economic profit.

After the data integration, entity definition and measure specification are completed, processing advances to the second stage where context layers for each entity are developed and stored in a contextbase (50). The complete context for evaluating an entities performance can be divided into seven types of context layers. The seven types of layers are:

1. Information that defines and describes the element context over time, i.e. we store widgets (a resource) built (an action) using the new design (an element) with the automated lathe (another element) in our warehouse (an element). The lathe (element) was recently refurbished (completed action) and produces 100 widgets per 8 hour shift (element characteristic). We can increase production to 120 widgets per 8 hour shift if we add complete numerical control (a feature). This layer may be subdivided into any number of sub-layers along user specified dimensions such as tangible elements of value, intangible elements of value, processes, agents, assets, lexicon (what elements are called) and combinations thereof;

2. Information that defines and describes the resource context over time, i.e. producing 100 widgets (a resource) requires 8 hours of labor (a resource), 150 amp hours of electricity (another resource) and 5 tons of hardened steel (another resource). This layer may be subdivided into any number of sub-layers along user specified dimensions such as lexicon (what resources are called), resources already delivered, resources with delivery commitments and forecast resource requirements;
3. Information that defines and describes the environment context over time(the entities in the social, natural and/or physical environment that impact function measure performance), i.e. the market for steel is volatile, standard deviation on monthly shipments is 24%. This layer may be subdivided into any number of sub-layers along user specified dimensions;
4. Information that defines and describes the transaction context (also known as tactical/administrative) over time, i.e. we have made a commitment to ship 100 widgets to Acme by Tuesday and need to start production by Friday. This layer may be subdivided into any number of sub-layers along user specified dimensions such as lexicon (what transactions and events are called), historical transactions, committed transactions, forecast transactions, historical events, forecast events and combinations thereof;
5. Information that defines and describes the relationship context over time, i.e. Acme is also a key supplier for the new product line, Widget X, that is expected to double our revenue over the next five years. This layer may be subdivided into any number of sub-layers along user specified dimensions;
6. Information that defines and describes the measurement context over time, i.e. Acme owes us $30,000, the price per widget is $100 and the cost of manufacturing widgets is $80 so we make $20 profit per unit (for most businesses this would be a short term profit measure for the value creation function) also, Acme is one of our most valuable customers and they are a valuable supplier to the international division (value based measures). This layer may be subdivided into any number of sub-layers along user specified dimensions. For example, the instant, five year and lifetime impact of certain medical treatments may be of interest. In this instance, three separate measurement layers could be created to provide the required context. The risks associated with each measure can be integrated within each measurement layer or they can be stored in separate layers. For example, value measures for organizations integrate the risk and the return associated with measure performance. For most analyses, the performance and risk measures are integrated. However, in some instances it is desirable to separate the two;
7. Information that optionally defines the relationship of the first six layers of entity context to one or more coordinate systems over time. Pre-defined spatial reference coordinates available for use in the system of the present invention include the major organs, a human body, each of the continents, the oceans, the earth, the solar system and an organization chart. Virtual coordinate systems can also be used to relate each entity to other entities on a system such as the Internet, network or intranet. This layer may also be subdivided into any number of sub-layers along user specified dimensions and would identify system or application context if appropriate.

Different combinations of context layers and function measures from different entities are relevant to different analyses and decisions. For simplicity, we will generally refer to seven types of context layers or seven context layers while recognizing that the number of context layers can be greater (or less) than seven. It is worth noting at this point that the layers may be combined for ease of use, to facilitate processing and/or as entity requirements dictate. For example, the lexicon layers from each of the seven types of layers described above can be combined into a single lexicon layer. Before moving on to discuss context frames—which are defined by one or more entity function measures and the portion of each of the seven context layers that impacts the one or more entity function measures (and performance)—we need to define each context layer in more detail. Before we can do this we need to define key terms that we will use in the defining the layers and system (100) of the present invention:

1. Entity Type—any member of a hierarchy or group (see Tables 1, 2 and 3);
2. Entity—a particular, discrete unit that has functions defined by being an item of one or more entity type, being an element and/or resource within one or more entities and/or being an element and/or resource within one or more types of entities;
3. Subject entity—entity (900), collaboration/combination of entities (925) or a system (950) as shown in FIG. 2A, FIG. 2B or FIG. 3 respectively with one or more defined functions;
4. Function—production, destruction and/or maintenance of an element, resource and/or entity. Examples: maintaining room temperature at 72 degrees Fahrenheit, destroying cancer cells and producing insulin;
5. Characteristic—numerical or qualitative indication of entity status—examples: temperature, color, shape, distance weight, and cholesterol level (descriptive data is the source of data about characteristics) and the acceptable range for these characteristics (aka constraints);
6. Event—something that takes place in a defined point in space time, the events of interest are generally those that are recorded and change the elements, resources and/or function measure performance of a subject entity and/or change the characteristics of an entity;
7. Project—action that changes a characteristic, produces one or more new resources, produces one or more new elements or some combination thereof that impacts entity function performance—are analyzed using same method, system and media described for event and extreme event analysis;
8. Action—acquisition, consumption, destruction, production or transfer of resources, elements and/or entities in a defined point in space time—examples: blood cells transfer oxygen to muscle cells and an assembly line builds a product. Actions are a subset of events and are generally completed by a process;
9. Data—anything that is recorded—includes transaction data, descriptive data, content, information and knowledge;
10. Information—data with context of unknown completeness;
11. Knowledge—data with complete context—all seven types of layers are defined and complete to the extent possible given uncertainty;
12. Transaction—anything that is recorded that isn't descriptive data. Transactions generally reflect events and/or actions for one or more entities over time (transaction data is source);
13. Function—behavior or performance of the subject entity—the primary types of behavior are actions and maintenance;
14. Measure—quantitative indication of one or more subject entity functions—examples: cash flow, patient survival rate, bacteria destruction percentage, shear strength, torque, cholesterol level, and pH maintained in a range between 6.5 and 7.5;
15. Element—also known as a context element these are tangible and intangible entities that participate in and/or support one or more subject entity actions without normally being consumed by the action—examples: land, heart, Sargasso sea, relationships, wing and knowledge (see FIG. 2A);
16. Element combination—two or more elements that share performance drivers to the extent that they need to be analyzed as a single element;
17. Item—an item is an instance within an element. For example, an individual salesman would be an "item" within the sales department element (or entity). In a similar fashion a gene would be an item within a dna entity. While there are generally a plurality of items within an element, it is possible to have only one item within an element;
18. Item variables are the transaction data and descriptive data associated with an item or related group of items;
19. Indicators (also known as item performance indicators and/or factor performance indicators) are data derived from data related to an item or a factor;
20. Composite variables for a context element or element combination are mathematical combinations of item variables and/or indicators, logical combinations of item variables and/or indicators and combinations thereof;
21. Element variables or element data are the item variables, indicators and composite variables for a specific context element or sub-context element;
22. Sub Element—a subset of all items in an element that share similar characteristics;
23. Asset—subset of elements that support actions and are usually not transferred to other entities and/or consumed—examples: brands, customer relationships, information and equipment;
24. Agent—subset of elements that can participate in an action. Six distinct kinds of agents are recognized—initiator, negotiator, closer, catalyst, regulator, messenger. A single agent may perform several agent functions—examples: customers, suppliers and salespeople;
25. Resource—entities that are routinely transferred to other entities and/or consumed—examples: raw materials, products, information, employee time and risks;
26. Sub Resource—a subset of all resources that share similar characteristics;
27. Process—combination of elements actions and/or events that are required to complete an action or event—examples: sales process, cholesterol regulation and earthquake. Processes are a special class of element;
28. Commitment—an obligation to complete a transaction in the future—example: contract for future sale of products and debt;
29. Competitor—an entity that seeks to complete the same actions as the subject entity, competes for elements, competes for resources or some combination thereof;
30. Priority—relative importance assigned to actions and measures;
31. Requirement—minimum or maximum levels for one or more elements, element characteristics, actions, events, processes or relationships, may be imposed by user (40), laws (1306) or physical laws (i.e. force=mass times acceleration);
32. Surprise—variability or events that improve subject entity performance;
33. Risk—variability or events that reduce subject entity performance;
34. Extreme risk—caused by variability or extreme events that reduce subject entity performance by producing a permanent changes in the relationship of one or more elements or factors to the subject entity;
35. Critical risk—extreme risks that can terminate a subject entity;
36. Competitor risk—risks that are a result of actions by an entity that competes for resources, elements, actions or some combination thereof;
37. Factor—entities external to subject entity that have an impact on entity performance—examples: commodity markets, weather, earnings expectation—as shown in FIG. 2A factors are associated with entities that are outside the box. All higher levels in the hierarchy of an entity are also defined as factors.
38. Composite factors—are numerical indicators of: external entities that influence performance; conditions external to the entity that influence performance, conditions of the entity compared to external expectations of entity conditions or the performance of the entity compared to external expectations of entity performance;
39. Factor variables are the transaction data and descriptive data associated with context factors;
40. Factor performance indicators (also known as indicators) are data derived from factor related data;
41. Composite factors (also known as composite variables) for a context factor or factor combination are mathematical combinations of factor variables and/or factor performance indicators, logical combinations of factor variables and/or factor performance indicators and combinations thereof;
42. A layer is software and/or information that gives an application, system, device or layer the ability to interact with another layer, device, system, application or set of information at a general or abstract level rather than at a detailed level;
43. Context frames include all information relevant to function measure performance for a defined combination of context layers, entities and entity functions. In one embodiment, each context frame is a series of pointers (like a virtual database) that are stored within a separate table;
44. Complete Context is a shorthand way of noting that all seven types of context layers have been defined for a given subject entity function measure it is also a proprietary trade-name designation for applications with a context quotient of 200;
45. Complete Entity Context—Complete Context for all entity function measures;
46. Contextbase is a database that organizes data and information by context for one or more subject entities. The data can be organized by context layer in a relational database, a flat database a virtual database and combinations thereof;
47. Total risk is the sum of all variability risks and event risks for a subject entity. For an entity with publicly traded equity, total risk is defined by the implied volatility associated with options on entity equity;
48. Variability risk is a subset of total risk. It is the risk of reduced or impaired performance caused by variability in factors, resources (including processes) and/or elements. Variability risk is quantified using statistical measures like standard deviation per month, per year or over some other time period. The covariance and dependencies between different variability risks are also determined because simulations require quantified information regarding the inter-relationship between the different risks to perform effectively;

49. Industry market risk is a subset of variability risk for an entity with publicly traded equity. It is defined as the implied variability associated with a portfolio that is in the same SIC code as the entity—industry market risk can be substituted for base market risk in order to get a clearer picture of the market risk specific to stock for an entity;

50. Event risk is a subset of total risk. It is the risk of reduced or impaired performance caused by the occurrence of an event. Event risk is quantified by combining a forecast of event frequency with a forecast of event impact on subject entity resources, elements (including processes) and the entity itself.

51. Contingent liabilities are a subset of event risk where the impact of an event occurrence is defined;

52. Uncertainty measures the amount of subject entity function measure performance that cannot be explained by the elements, factors, resources and risks that have been identified by the system of the present invention. Source of uncertainty include:

53. Real options are defined as tangible options the entity may have to make a change in its behavior/performance at some future date—these can include the introduction of new elements or resources, the ability to move processes to new locations, etc. Real options are generally supported by the elements of an entity;

54. The efficient frontier is the curve defined by the maximum function measure performance an entity can expect for a given level of total risk; and 55. Services are self-contained, self-describing, modular pieces of software that can be published, located, and invoked across a World Wide Web (web services) or a grid (grid services). Bots and agents can be functional equivalents to services. There are two primary types of services: RPC (remote procedure call) oriented services and document-oriented services. RPC-oriented services request the performance of a specific function and wait for a reply before moving on. Document-oriented services allow a client to send a document to a server without having to wait for the service to be completed and as a result are more suited for use in process networks. The system of the present invention can function using: web services, grid services, bots (or agents), client server architecture, and integrated software application architecture or combinations thereof.

We will use the terms defined above and the keywords that were defined as part of complete context definition when detailing one embodiment of the present invention. In some cases key terms may be defined by the Upper Ontology or an industry organization such as the Plant Ontology Consortium, the Gene Ontology Consortium or the ACORD consortium (for insurance). In a similar fashion the Global Spatial Data Infrastructure organization and the Federal Geographic Data Committee are defining a reference model for geographic information that can be used to define the spatial reference standard for geographic information. The element definitions, descriptive data, lexicon and reference frameworks from these sources can supplement or displace the pre-defined metadata included within the contextbase (50) as appropriate. Because the system of the present invention identifies the relationships between different entities, factors, resources, events and elements (including process) as part of its normal processing, the relationships defined by standardized ontologies are generally not utilized. However, they could be used as a starting point for system processing.

In any event, we can now use the key terms to better define the seven type's context layers and identify the typical source for the required information as shown below.

1. The element context layer identifies and describes the entities that impact subject entity function measure performance. The element description includes the identification of any sub-elements and preferences. Preferences are a particularly important characteristic for process elements that have more than option for completion. Elements are initially identified by the chosen subject entity hierarchy (elements associated with lower levels of a hierarchy are automatically included) transaction data identifies others as do analysis and user input. These elements may be identified by item or sub-element. The primary sources of data are devices (3), narrow system databases (5), partner system databases (6), external databases (7), the World Wide Web (8), xml compliant applications, the Complete Context™ Input System (601) and combinations thereof.

2. The resource context layer identifies and describes the resources that impact subject entity function measure performance. The resource description includes the identification of any sub-resources. The primary sources of data are narrow system databases (5), partner system databases (6), external databases (7), the World Wide Web (8), xml compliant applications, the Complete Context™ Input System (601) and combinations thereof.

3. The environment context layer identifies and describes the factors in the social, natural and/or physical environment that impact subject entity function measure performance. The relevant factors are determined via analysis. The factor description includes the identification of any sub-factors. The primary sources of data are external databases (7) and the World Wide Web (8).

4. The transaction context layers identifies and describes the events, actions, action priorities, commitments and requirements of the subject entity and each entity in the element context layer by time period. The description identifies the elements and/or resources that associated with the event, action, action priority, commitment and/or requirement. The primary sources of data are narrow system databases (5), partner system databases (6), external databases (7), the World Wide Web (8), xml compliant applications, the Complete Context™ Input System (601) and combinations thereof.

5. The relationship context layer defines the relationships between the first three layers (elements, resources and/or factors) and the fourth layer (events and/or actions) by time period. These relationships are identified by user input (i.e. process maps and procedures) and analysis.

6. The measure context layer(s) identifies and quantifies the impact of actions, events, elements, factors, resources and processes (combination of elements) on each entity function measure by time period. The impact of risks and surprises can be kept separate or integrated with other element/factor measures. The impacts are determined via analysis, however, the analysis can be supplemented by input from simulation programs, a subject matter expert (42) and/or a collaborator (43).

7. Reference layer (optional)—the relationship of the first six layers to a specified spatial coordinate system. These relationships are identified by user input (i.e. maps) and analysis.

The sum of the information from all the specified context layers defines complete context for entity performance by time period. We can use the more precise definition of context to define knowledge. Our revised definition would state that an individual that is knowledgeable about a subject entity has information from all seven context layers for the one or more functions he or she is considering. The knowledgeable individual would be able to use the information from the seven types of context layers to:

1. identify the range of contexts where previously developed models of entity function performance are applicable; and
2. accurately predict subject entity actions in response to events and/or actions in contexts where the previously developed knowledge is applicable.

The accuracy of the prediction created using the seven types of context layers reflects the level of knowledge. For simplicity we will use the R squared ($R^2$) statistic as the measure of knowledge level. $R^2$ is the fraction of the total squared error that is explained by the model—other statistics can be used to provide indications of the entity model accuracy including entropy measures and root mean squared error. The gap between the fraction of performance explained by the model and 100% is uncertainty. Table 10 illustrates the use of the information from the six of the seven layers in analyzing a sample business context and a sample medical context.

TABLE 10

| Business (shareholder value maximization measure) | Medical (patient health & longevity, financial break even measures) |
|---|---|
| Environment: competitor is trying to form a relationship with Acme | Environment: malpractice insurance is increasingly costly |
| Measure: we will receive $20 profit per widget also Acme is a valuable customer and a key supplier, relationship damage will decrease returns and increase risk | Measure: survival rate is 99% for procedure A and 98% for procedure B; treatment in first week improves 5 year survival 18%, 5 year reoccurrence rate is 7% higher for procedure A |
| Relationship: Acme supports project X in international division | Relationship: Dr. X has a commitment to assist on another procedure Monday |
| Resource: 25 units are in inventory | Resource: operating room A time available for both procedures |
| Transaction: need 100 widgets by Tuesday for Acme, need to start production Friday | Transaction: patient should be treated next week, his insurance will cover operation |
| Element: widgets, warehouse, automated lathe | Element: operating room, operating room equipment, Dr. X |

In addition to defining knowledge, context layers are useful in developing management tools. One use of the layers is establishing budgets and/or alert levels for data within a layer or combinations of layers. Using the sample situation illustrated in Table 10, an alert could be established for inventory levels that fall below 25 units in the element layer, for widget commitments that exceed 50 in the transaction layer, profits that drop below $15 per widget or survival rates that drop below 99% in the measure layer. Control can be defined and applied at the transaction and measure levels by assigning priorities to actions and measures. Using this approach the system of the present invention has the ability to analyze and optimize performance using management priorities, historical measures or some combination of the two.

Many analytical applications are limited to optimizing the instant (short-term) impact given the elements, resources and the transaction situation. Because these systems generally ignore uncertainty and the relationship, environment and long term measure portions of complete context, the recommendations they make are often at odds with common sense decisions made by line managers that have a more complete context for evaluating the same data. This deficiency is one reason some have noted that "there is no intelligence in business intelligence applications". One reason existing systems take this approach is that the information that defines three import parts of complete context—relationship, environment and long term measure impact are not readily available and must be derived as indicated previously. A related shortcoming of some of these systems is that they fail to identify the context or contexts where the results of their analyses are valid.

In one embodiment, the entity centric computer system (100) provides the functionality for integrating data from all narrow systems (4), creating the contextbase (50), developing context frames and supporting Complete Context™ applications as shown in FIG. 12. Over time, the narrow systems (4) can be eliminated and all data can be entered directly into the entity centric computer system (100) as discussed previously. In an alternate mode the system would work in tandem with a Business Process Integration System (99) such as an application server, middleware or extended operating system to integrate data from narrow systems (4), create the contextbase (50), develop context frames and support the Complete Context™ applications as shown in FIG. 13. In either mode, the system of the present invention supports the development and storage of all seven types of context layers as required to create a contextbase (50).

The contextbase (50) also enables the development of new types of analytical reports including a sustainability report and a controllable performance report. The sustainability report combines the element lives, factor lives, risks and an entity performance model to provide an estimate of the time period over which the current entity performance level can be sustained for the specified context frame. There are three paired options for preparing the report—dynamic or static mode, local or indirect mode, risk adjusted or pre-risk mode. In the static mode, the current element and factor mix is "locked-in" and the sustainability report shows the time period over which the current inventory will be depleted. In the dynamic mode the current element and factor inventory is updated using trended replenishment rates to provide a dynamic estimate of sustainability. The local perspective reflects the sustainability of the subject entity in isolation while the indirect perspective reflects the impact of the subject entity on another entity. The indirect perspective is derived by mapping the local impacts to some other entity. The risk adjusted (aka "risk") and pre-risk modes (aka "no risk") are self explanatory as they simply reflect the impact of risks on the expected sustainability of subject entity performance. The different possible combinations of these three options define eight modes for report preparation as shown in Table 11.

TABLE 11

| Mode | Static or Dynamic | Local or Indirect | Risk or No Risk |
|---|---|---|---|
| 1 | Static | Local | Risk |
| 2 | Static | Local | No Risk |
| 3 | Static | Indirect | Risk |
| 4 | Static | Indirect | No Risk |

TABLE 11-continued

| Mode | Static or Dynamic | Local or Indirect | Risk or No Risk |
|---|---|---|---|
| 5 | Dynamic | Local | Risk |
| 6 | Dynamic | Local | No Risk |
| 7 | Dynamic | Indirect | Risk |
| 8 | Dynamic | Indirect | No Risk |

The sustainability report reflects the expected impact of all context elements and factors on subject entity performance over time. Context elements and context factors are influenced to varying degrees by the subject entity. The controllable performance report identifies the relative contribution of the different context element and factors to the current level of entity performance. It then puts the current level of performance in context by comparing the current level of performance with the performance that would be expected some or all of the elements and factors were all at the mid-point of their normal range—the choice of which elements and factors to modify could be a function of the control exercised by the subject entity. Both of these reports are pre-defined for display using complete Context™ Review System (607) described below.

As discussed previously, context frames are created in the third stage of processing. Context frames are defined by the specified entity function measures and the context layers associated with the entity function measures. The context frame provides all the knowledge required to understand entity behavior and the impact of events, actions, element change, resource change, reference position change and factor change on entity performance (page 26, lines). Sub-context frames are context frames that have been limited to information relevant to a subset of one or more layers. For example, a sub-context frame could include the portion of each of the context layer that was related to a process. Because a process can be defined by a combination of elements, events and resources that produce an action, the information from each layer that was associated with the elements, events, resources and actions that define the process would be included in the sub-context frame for that process. This sub-context frame would provide all the information required to understand process performance and the impact of events, actions, element change and factor change on process performance.

Context frames and sub-context frames are created to support the analysis, forecast, review and/or optimization of entity performance using the applications in the Complete Context™ Suite (625). One of the key benefits of the entity centric computer system (100) is that its architecture allows the Complete Context™ Suite (625) to displace many of the hundred plus systems identified in Table 4 with the Complete Context™ Suite (625) of applications (601, 602, 603, 604, 605, 606, 607, 608, 609, 611, 614, 620, 621 and 622) that provide comprehensive analytical and management capabilities. Another key benefit the Complete Context™ Suite (625) is that each application can use the function measure priorities established by management (41), the priorities inferred from an analysis of entity actions, the priorities that will maximize entity mission achievement or some combination thereof.

The ID to frame table (166) identifies the context frame(s) and/or sub-context frame(s) that will be made available to each user (40), manager (41), subject matter expert (42), and/or collaborator (43) via a portal, portlet, pda, electronic display, paper document or other electronic device with the support of applications in the Complete Context Suite (625). It is worth noting that this context awareness by user is also used to provide a true natural language interface (714) to the system (100) and applications (610 and 625) of the present invention. This capability can also be used to filter and/or prioritize e-mail based on relevance to available context. Another novel feature of the Complete Context™ Suite (625) is that the applications in the suite can review entity context frames from prior time periods to generate reports that highlight changes over time and display the range of contexts under which the results they produce are valid. Because there are many dimensions to context we call this range of contexts where results are valid the valid context space. The applications in the Complete Context™ Suite (625) also support the development of customized applications or services. They do this by providing ready access to the internal logic of the application while at the same time protecting this logic from change. This feature allows each user (40) to get the precise information required for his or her specific needs while preserving the ability to upgrade the applications at a later date in an automated fashion. As with the other software (200, 300, 400 and 700) in the system of the present invention, each of these applications can run under several different architectures—agent, bot, applet, web service, grid service, n-tier client server, stand alone application, etc. Finally, it should be noted that each of the applications in the Suite (625) supports the use of a spatial coordinate system for displaying the results of their processing when one is specified for use by the user (40). Other features of the applications in the Complete Context™ Suite (625) are briefly described below:

1. Complete Context™ Analysis System (602)—analyzes the impact of user (40) specified changes on a subject entity for a given context frame or sub-context frame by mapping the proposed change to the appropriate context layer(s) in accordance with the schema or ontology and then evaluating the impact of said change on the function measures. Software to complete these analyses can reside on a server with user access through a browser (800) or through a natural language interface (714) provided by the system (100). This software can also reside in an applet or service or it can reside on a client computer with the context frame being provided by the entity centric computer system (100) as required. Context frame information may be supplemented by simulations and information from subject matter experts (42) as appropriate. This application can also be used to analyze the impact on changes on any "view" of the entity that has been defined and pre-programmed for review. For example, accounting profit using three different standards or capital adequacy can be analyzed using the same rules defined for the Complete Context™ Review application to convert the context frame analysis to the required reporting format.

2. Complete Context™ Capture and Collaboration System (622)—guides one or more subject matter experts (42) and/or collaborators (43) through a series of steps as required to capture information, refine existing knowledge and/or develop plans for the future using existing knowledge. The one or more subject matter experts (42) and/or collaborators (43) will provide information and knowledge by selecting from a template of pre-defined elements, resources, events, factors, actions and entity hierarchy graphics that are developed from the entity schema table (157). The one or more subject matter experts (42) and/or collaborators (43) also have the option of defining new elements, events, factors, actions and hierarchies. The one or more subject matter experts

(42) and/or collaborators (43) are first asked to define what type of information and knowledge will be provided. The choices will include each of the seven types of context layers as well as element definitions, factor definitions, event definitions, action definition, relationships, processes, uncertainty and scenarios. On this same screen, the one or more subject matter experts (42) and/or collaborators (43) will also be asked to decide whether basic structures or probabilistic structures will provided in this session, if this session will require the use of a time-line and if the session will include the lower level subject matter. The selection regarding type of structures will determine what type of samples will be displayed on the next screen. If the use of a time-line is indicated, then the user will be prompted to: select a reference point—examples would include today, event occurrence, when I started, etc.; define the scale being used to separate different times—examples would include seconds, minutes, days, years, light years, etc.; and specify the number of time slices being specified in this session. The selection regarding which type of information and knowledge will be provided determines the display for the last selection made on this screen. There is a natural hierarchy to the different types of information and knowledge that can be provided by a one or more subject matter experts (42) and/or collaborators (43). For example, measure level knowledge would be expected in include input from the relationship, element, transaction and resource context layers. If the one or more subject matter experts (42) and/or collaborators (43) agrees, the system will guide the one or more subject matter experts (42) and/or collaborators (43) to provide knowledge for each of the "lower level" knowledge areas by following the natural hierarchies. Summarizing the preceding discussion, the one or more subject matter experts (42) and/or collaborators (43) has used the first screen to select the type of information and knowledge to be provided (measure layer, relationship layer, transaction layer, resource layer, environment layer, element layer, reference layer, event risk or scenario). The one or more subject matter experts (42) and/or collaborators (43) has also chosen to provide this information in one of four formats: basic structure without timeline, basic structure with timeline, relational structure without timeline or relational structure with timeline. Finally, the one or more subject matter experts (42) and/or collaborators (43) has indicated whether or not the session will include an extension to capture "lower level" knowledge. Each selection made by the one or more subject matter experts (42) and/or collaborators (43) will be used to identify the combination of elements, events, actions, factors and entity hierarchy chosen for display and possible selection. This information will be displayed in a manner that is somewhat similar to the manner in which stencils are made available to Visio® users for use in the workspace. The next screen displayed by the system will depend on which combination of information, knowledge, structure and timeline selections made by the one or more subject matter experts (42) and/or collaborators (43). In addition to displaying the sample graphics to the one or more subject matter experts (42) and/or collaborators (43), this screen will also provide the one or more subject matter experts (42) and/or collaborators (43) with the option to use graphical operations to change relationships, define new relationships, define new elements, define new factors and/or define new events. The thesaurus table (164) in the contextbase (50) provides graphical operators for: adding an element or factor, acquiring an element, consuming an element, changing an element, factor or event risk values, adding a relationship, changing the strength of a relationship, identifying an event cycle, identifying a random relationship, identifying commitments, identifying constraints and indicating preferences. The one or more subject matter experts (42) and/or collaborators (43) would be expected to select the structure that most closely resembles the knowledge that is being communicated or refined and add it to the workspace displayed by the system (622). After adding it to the workspace, the one or more subject matter experts (42) and/or collaborators (43) will then edit elements, factors, resources and events and add elements, factors, resources events and descriptive information as required to fully describe the information or knowledge being captured from the context frame represented on the screen. If relational information is being specified, then the system (622) will give the one or more subject matter experts (42) and/or collaborators (43) the option of using graphs, numbers or letter grades to communicate the information regarding probabilities. If a timeline is being used, then the next screen displayed by the system (622) will be the screen for the same perspective from the next time period in the time line. The starting point for the next period knowledge capture will be the final version of the knowledge captured in the prior time period. After completing the knowledge capture for each time period for a given level, the system (622) will guide the one or more subject matter experts (42) and/or collaborators (43) to the "lower level" areas where the process will be repeated using samples that are appropriate to the context layer or area being reviewed. At all steps in the process, the information in the contextbase (50) and the knowledge collected during the session will be used to predict elements, resources, actions, events and relationships that are likely to be added or modified in the workspace. These "predictions" are displayed using flashing symbols in the workspace. The one or more subject matter experts (42) and/or collaborators (43) is given with the option of turning the predictive prompting feature off. After the information and knowledge has been captured, the graphical results are converted to data base entries and stored in the appropriate tables (141, 142, 143, 144, 145, 149, 154, 156, 157, 158, 162 or 168) in the contextbase (50) before processing advances to a software block 389. Data from simulation programs can also be added to the contextbase (50) to provide similar information or knowledge. This system (622) can also be used to verify the veracity of some new assertion by mapping the new assertion to the subject entity model and quantifying any reduction in explanatory power and/or increase in certainty of the entity performance model.

3. Complete Context™ Customization System (621)—system for analyzing and optimizing the impact of data, information, products, projects or services by customizing the features included in or expressed by an offering for a subject entity based for a given context frame or sub-context frame. Some of the products and services that can be customized with this system include medicine, financial products, software, technical support, equipment, computer hardware, bandwidth, devices, telecommunication equipment, space, buildings, advertising, data, information and knowledge. This application may be particularly suited for firms that support other entities by providing any combination of data, information and knowledge in a database or contextbase (50) for use by a subject entity in evaluating the impact of different domains from the different areas (10, 20 and 30). For example, a firm may provide a database with geology data and information. The customization system (621) would automatically tailor the information included in the database to match the specific requirements (as defined by the ontology) of the subject entity contextbase (50). Software to complete this customization can reside on a server with user access through a browser (800) or through a natural language interface (714) provided by the system (100). This software can reside in an applet or service that is activated as required or it can reside on a client computer with the context frame being provided by the entity centric computer system (100) as required. Context frame information may be supplemented by simulations and information from subject matter experts as appropriate.

4. Complete Context™ Display System (614)—manages the availability and display of data, information, and knowledge related to one or more context frames and/or sub context frames to a user (40), manager (41), subject matter expert (42), and/or collaborator (43) on a continuous basis using a portal, portlet, pda or other display as mentioned previously. To support this effort the Complete Context™ Display System (614) supports RSS feeds, manages one or more caches (119, 129 and/or 139) that support projections and display(s) utilizing the RSS feeds and/or caches. The priority assigned to the data and information made available is determined via a randomized algorithm that blends frequency of use, recency of use, cost to retrieve and time to retrieve measures with a relevance measure for each of the one or more context frames and/or sub context frames being supported. As the user (40), manager (41), subject matter expert (42), and/or collaborator (43) context changes (for example when location changes or the World Trade Center collapses), the composite variable will change which will in turn drive this system (614) to change the mix in the cache, RSS feed or projection as required to ensure that data and/or information that is most relevant to the new context is readily available. This application (614) can be combined with the optimization system (604) to ensure that network traffic, computer resources and related devices are providing the optimal support for a given context. In a similar fashion it can be combined with the Complete Context™ Capture and Collaboration System (622) to ensure that the one or more subject matter experts (42) and/or collaborators (43) have the data, information and knowledge they need to complete their input to the system of the present invention. Finally, the system can be used to purge data, information and knowledge that is no longer relevant.

5. Complete Context™ Exchange System (608)—system identifying desirable exchanges of resources, elements, commitments, data and information with other entities in an automated fashion. This application calls on Complete Context™ Analysis system as required to review proposed prices. In a similar manner the application calls on the Complete Context™ Optimization system to determine the optimal parameters for an exchange before completing a transaction. For partners or customers that provide access to their data that is sufficient to define a shared context, the exchange system can use the other Complete Context™ applications to analyze and optimize the exchange for the combined parties. The actual transactions are completed by the Complete Context™ Input System (601)

6. Complete Context™ Forecast System (603)—forecasts the value of specified variable(s) using data from all relevant context layers. Completes a tournament of forecasts for specified variables and defaults to a multivalent combination of forecasts from the tournament using methods similar to those first described in U.S. Pat. No. 5,615,109. Software to complete these forecasts can reside on a server with user access through a browser (800) or through a natural language interface (714) provided by the system (100). This software can also reside in an applet or service that is activated as required or it can reside on a client computer. In addition to providing the forecast this system will provide the confidence interval associated with the forecast and provide the user (40) with the ability to identify the data that needs to be collected in order improve the confidence associated with a given forecast which will make the process of refining forecasts more efficient.

7. Complete Context™ Input System (601)—system for recording actions and commitments into the contextbase. The interface for this system is a template accessed via a browser (800) or the natural language interface (714) provided by the system (100) that identifies the available element, transaction, resource and measure data for inclusion in a transaction. After the user has recorded a transaction the system saves the information regarding each action or commitment to the contextbase (50). Other applications such as Complete Context™ Analysis, Plan or Optimize can interface with this system to generate actions, commitments and/or transactions in an automated fashion. Complete Context™ bots can also be programmed to provide this functionality.

8. Complete Context™ Metrics and Rules System (611)—tracks and displays the causal performance indicators for context elements, resources and factors for a given context frame as well as the rules used for segmenting context elements resources and factors into smaller groups (sub-elements or sub-factors) for more detailed analysis. Rules (and patterns) can be discovered using a variety of algorithms including the Apriori algorithm, the sliding window algorithm; beam-search, frequent pattern growth and decision trees. Software to complete produce these reports can reside on a server with user access through a browser (800) or through a natural language interface (714) provided by the system (100). This software can reside in an applet or service that is activated as required or it can reside on a client computer.

9. Complete Context™ Optimization System (604)—simulates entity performance and identifies the optimal mix of actions, elements, events and/or resources for operating a specific context frame or sub context frame given the constraints, uncertainty and the defined function measures. Supported optimization algorithms and methods include: genetic algorithms, the calculus of variations, game theory, mixed integer linear programming, multi criteria maximization, linear programming, semi-definite programming, smoothing and highly optimized tolerance. Because most entities have more than one function (and more than one measure), the genetic algorithm and multi criteria maximizations are used most frequently. Software to complete these simulations and optimizations can reside on a server with user access through a browser (800) or through a natural language interface (714) provided by the system (100). This software can also reside in an applet that is activated as required or it can reside on a client computer with the context frame being provided by the entity centric computer system (100) as required. This application can also be used to optimize Complete Context™ Review measures like accounting profit and Basel II using the same rules defined for the Complete Context™ Review application to define context frames in the required format before optimization.

10. Complete Context™ Planning System (605)—system that is used to: establish measure priorities, establish action priorities, and establish expected performance levels (aka budgets) for actions, events, elements resources and measures. These priorities and performance level expectations are saved in the corresponding layer in the contextbase (50). For example, measure priorities are saved in the measure layer table (145). This system also supports collaborative planning when context frames that include one or more partners are created (see FIG. 2B). Software to complete this planning can reside on a server with user access through a browser (800) or through a natural language interface (714) provided by the system (100). This software can reside in an applet or service that is activated as required or it can reside on a client computer with the context frame being provided by the entity centric computer system (100) as required.

11. Complete Context™ Profiling System (615)—system for developing Complete Entity Context from available subject entity data and information.

12. Complete Context™ Project System (606)—system for analyzing and optimizing the impact of a project or a group of projects on a context frame. Software to complete these analyses and optimizations can reside on a server with user access through a browser (800) or through a natural language interface (714) provided by the system (100). This software can reside in an applet or service that is activated as required or it can reside on a client computer with the context frame being provided by the entity centric computer system (100) as required. Context frame information may be supplemented by simulations and information from subject matter experts as appropriate.

13. Complete Context™ Review System (607)—system for reviewing actions, elements, factors, resources, processes and measures alone or in combination with or without the use of a reference layer. This system uses a rules engine to transform contextbase (50) historical information into standardized reports that have been defined by different entities. For example the Financial Accounting Standards Board, International Accounting Standards Board and Standard and Poors have each defined standardized reports for reporting combinations of measures, elements, resources, events and actions for commercial businesses—the income statement, the balance sheet and the cash flow statement. Financial service firms have standard reports that have been defined under the Basel accords that are used to assess the adequacy of their capital. Insurance companies produce similar reserve adequacy reports that have been defined by insurance regulators. Other standardized, non-financial performance reports have been developed for medical entities, military operations and educational institutions. The sustainability and controllable performance reports described previously are also pre-defined for calculation and display. The rules engine produces each of these reports on demand. The software to complete these reports can reside on a server with user access through a browser (800) or through a natural language interface (714) provided by the system (100). This software can reside in an applet or service that is activated as required or it can reside on a client computer with the context frame being provided by the entity centric computer system (100) as required.

14. Complete Context Search Engine (609) locates the most relevant data and/or information for the given context frame or sub context frame. The Complete Context™ Search Engine (609) also identifies the relationship between the requested information and other information by using the relationships and measure impacts identified in the contextbase (50). It uses this information to display the related data and/or information in a graphical format similar to the formats used in FIG. 2A, FIG. 2B and/or FIG. 3. The user (40) has the option of focusing on any block in the graph, for example the user (40) could choose to retrieve information about the resources (906) that support an entity (900);

15. Complete Context™ Underwriting System (620)—analyzes a context frame or sub-context frame for an entity as required to: evaluate entity liquidity, evaluate entity creditworthiness, evaluate entity risks, complete valuations, transfer liquidity to or from said entity, transfer risks to or from said entity, securitize entity risks, underwrite entity securities, package entity securities into funds or portfolios with similar characteristics (i.e. sustainability, risk, uncertainty equivalent, value, etc.) and/or package entity securities into funds or portfolios with dissimilar characteristics (i.e. sustainability, risk, uncertainty equivalent, value, etc.). As part of securitizing entity risks the Complete Context™ Underwriting System identifies an uncertainty equivalent for the risks being securitized. This innovative analysis combines quantified uncertainty by type with the securitized risks to give investors a more complete picture of the risk they are assuming when they buy a risk security. All of these analyses can rely on the measure layer information stored in the contextbase (50), the sustainability reports, the controllable performance reports and any pre-defined review format such as FASB earnings, Basel II capital requirements, etc. Software to complete this processing can reside on a server with user access through a browser (800) or through a natural language interface (714) provided by the system (100). This software can reside in an applet or service that is activated as required or it can reside on a client computer with the context frame being provided by the entity centric computer system (100) as required. Context frame information may be supplemented by simulations and information from subject matter experts as appropriate.

The applications within the Complete Context™ Suite (625) can be bundled together in any combination and/or joined together in any combination as required to complete a specific task. For example, the Complete Context™ Review (607), the Complete Context™ Forecast (603) and the Complete Context™ Planning (605) systems are often joined together to process a series of calculations. The Complete Context™ Analysis (602) and the Complete Context™ Optimization (604) systems are also joined together frequently to support performance improvement activities. In a similar fashion the Complete Context™ Optimization System (604) and the Complete Context™ Capture and Collaboration System (622) can be joined together to support knowledge transfer and simulation based training. The applications in the Complete Context™ Suite (625) will hereinafter be referred to as the standard applications or the applications in the Suite.

The entity centric computer system (100) takes a novel approach to developing the knowledge required to monitor and manage performance. Narrow systems (4) generally try to develop a picture of how part of an entity is performing. The user (40) can then be left with an enormous effort to integrate these different parts—often developed from different perspectives—to form a complete picture of performance. By way of contrast, the entity centric computer system (100) develops complete pictures of entity performance for all defined functions in a common format, saves these pictures in the contextbase (50) before dividing and recombining these pictures with other pictures as required to provide the detailed information regarding any portion of the entity that is being analyzed or reviewed. The detailed information is then packaged in a context frame or sub-context frame that is used by the standard applications in any variety of combinations for analysis processing. The contextbase (50) is continually updated by the software in the entity centric computer system (100). As a result, changes in each and every context layer are automatically discovered and incorporated into the processing and analysis completed by the entity centric computer system (100). Developing the complete picture first, instead of trying to put it together from dozens of different pieces can allow the system of the present invention to reduce IT infrastructure complexity by up to an order of magnitude while dramatically increasing the ability to analyze and manage entity performance. The ability to use the same system to analyze, manage, review and optimize performance of entities at different levels within a domain hierarchy and entities from a wide variety of different domains further magnifies the benefits associated with the simplification enabled by the system of the present invention.

The entity centric computer system (100) provides several other important features, including:
1. the system learns from the data which means that the same applications can be used to manage new aspects of entity performance as they become important without having to develop a new system;
2. the user is free to specify any combination of functions (with measures) for analysis; and
3. support for the automated programming of bots that can be used to, among other things, initiate actions, complete actions, respond to events, seek information from other entities and provide information to other entities in an automated fashion.

To illustrate the use of the entity centric computer system (100) we will describe the use of the applications in the Complete Context™ Suite to support a mental health clinic (an organization entity that becomes an element of the patient entity) in treating a patient (an organism entity that becomes an element of the mental health clinic entity). The mental health clinic has the same measure described in table 10 for a medical facility. The patient is referred to the mental health clinic with an MDD (major depressive disorder) single episode diagnosis. After arriving at the clinic, he fills out a form that details his medical history. His medical history indicates that he has high blood pressure and that he is taking medication. After the form is filled out the patient has his weight and blood pressure checked by an aide before seeing a doctor. The doctor reviews the patient's information, examines the patient and prescribes a treatment before moving on to see the next patient.

In the narrative that follows we will detail the support provided by the entity centric computer system (100) for each step in the patient visit and the subsequent follow up. The narrative assumes that the system was installed some time ago and has completed the processing required to develop a complete ontology and contextbase (50) for the clinic. Data entry can be completed in a number of ways for each step in the visit. The most direct route would be to use the Complete Context™ Input System (601) or any xml compliant application (such as newer Microsoft and Adobe applications) with a pc or personal digital assistant to capture information obtained during the visit using the natural language interface (714) or a pre-defined form. Once the data is captured it is integrated with the contextbase (50) in an automated fashion. A paper form could be used for mental health service facilities that do not have the ability to provide pc or pda access to patients. This paper form can be transcribed or scanned and converted into an xml document where it could be integrated with the contextbase (50) in an automated fashion. If the patient has used an entity centric computer system (100) that stored data related to his or her health, then this information could be communicated to the system (100) in an automated fashion via wireless connectivity, wired connectivity or the transfer of files from the patient's system (100) to a recordable media. Recognizing that there are a number of options for completing data entry we will simply say that "data entry is completed" when describing each step.

Step 1—patient details prior medical history and data entry is completed. Because the patient is new, a new element for the patient will automatically be created within the contextbase (50). The medical history including the referral diagnosis will be associated with the new element for the patient in the element layer. Any information regarding insurance will be tagged and stored in the transaction layer which would determine eligibility. The measure layer will in turn use this information to determine the expected cash flow and margin.

Step 2—weight and blood pressure for the medical history are checked by an aide and data entry is completed. The weight and blood pressure data is associated with the patient element in the element layer. The patient's records are compared to previously generated clusters for patients with similar diagnoses by the analytics that support the measure layer to project the expected instant and long term outcomes for a variety of treatments. Any data that is out of the normal range for the cluster will be flagged for confirmation by the doctor. The analytics in the relationship layer would then identify the possible adverse interactions between a likely medication, setraline, and the blood pressure medication the patient is taking.

If a diagnosis had not been provided at the time of referral, then a list of possible diagnoses would be generated at this point based on the proximity of the patient's characteristics to previously defined disease clusters by the analytics that support the measure layer.

Step 3—the doctor reviews the information for the patient from the contextbase (50) using the Complete Context™ Review application (607) on a pda or personal computer. The doctor will have the ability to define the exact format of the display by choosing the mix of graphical and text information that will be displayed.

Step 4—the doctor examines the patient, confirms or rejects the initial diagnosis and completes data entry. If the diagnosis is confirmed, then the doctor records this information and proceeds to the next step where treatment is prescribed. If the patient had not been referred with a specific diagnosis or if the doctor rejects the diagnosis from the referral, then as the doctor recorded the information gathered during examination, the entity centric computer system (100) would update the list of possible diagnoses to reflect the newly gathered information until the doctor records his or her diagnosis of the patient.

Step 5—the doctor prescribes a treatment. After the diagnosis is entered, the Complete Context™ Plan application (605) activates and displays alternative process maps for the treatment of the diagnosed illness. Process maps define the expected use of resources and elements and the sequence and timing of events, commitments and actions as treatment progresses. If the timing or sequence of events fails to follow the expected path, then the alerts built into the transaction layer can notify designated staff. Process maps also identify the agents, assets and resources that will be used to support the treatment process (as an aside we will note that the Complete Context™ Forecast application (603) combines the diagnosed conditions for patients with their designated process maps to forecast workload and resource utilization over time). Process maps can be established centrally in accordance with guidelines or they can be established by individual clinicians in accordance with entity policy. In all cases they are stored in the element layer (or separate process layer). FIG. 16 shows a portion of a process map for the treatment of depression.

Before selecting a process map, the doctor could activate the Complete Context™ Analysis application (602) to review the expected instant impacts and outcomes from different combinations of procedures and treatments that are available under the current formulary. This information could be used to support the development of a new process map (if entity policy permits this). In any event, after the doctor selects a process map for the treatment of the specified diagnosis, the associated process commitments and alerts are associated with the patient and stored in the transaction layer. The required paperwork is automatically generated by the process map and signed as required by the doctor.

Step 6—follow up. The process map the doctor selected is used to identify the expected sequence of events that the patient will complete. If the patient fails to complete an event within the specified time range or in the specified order, then the alerts built into the transaction layer will generate email messages to the doctor and/or case worker assigned to monitor the patient for follow up and possible corrective action. Agents, bots or services could be used to automate some aspects of routine follow up like sending reminders or requests for status via email or regular mail. This functionality could also be used to collect information about long-term outcomes from patients in an automated fashion. The process map follow up processing continues automatically until the process ends, a clinician changes the process map for the patient or the patient visits the facility again and the process described above is repeated.

In short, the Complete Context™ applications (625) provide knowledgeable support to those trying to analyze, manage and/or optimize actions, processes and outcomes for any entity. The contextbase (50), is the one of keys to the effectiveness of the Complete Context™ applications described above. The contextbase (50) provides six important benefits:

1. By directly supporting entity performance, the system of the present invention guarantees that the contextbase (50) will provide a tangible benefit to the entity.
2. The measure focus allows the system to partition the search space into two areas with different levels of processing. Data and information that is known to be relevant to the defined functions and measures and data that is not thought to be relevant. The system does not ignore data that is not known to be relevant, however, it is processed less intensely.
3. The processing completed in contextbase (50) development defines and maintains the relevant ontology for the entity. This ontology can be flexibly matched with other ontologies as required to interact with other entities that have organized their information using a different ontology. It will also enable the automated extraction and integration of data from the semantic web.
4. Defining the complete context allows every piece of data that is generated to be placed "in context" when it is first created. Traditional systems generally treat every piece of data in an undifferentiated fashion. As a result, separate efforts are often required to find the data, define a context and then place the data in context.
5. The contextbase (50) includes robust models of the factors that drive action and event frequency and levels to vary. This capability is very useful in developing action plans to improve measure performance.
6. The focus on primary entity functions also ensures the longevity of the contextbase (50) as entity primary functions rarely change. For example, the primary function of each cell in the human body has changed very little over the last 1,000 years. The same thing can be said about almost every corporation of any size as almost all of them have a shareholder value maximization function that has not changed from the day they were founded.

The example shown below will illustrate another unique feature of the entity centric computer system (100)—the automated alignment of measures for a subject entity hierarchy. As shown in Table 12, Organization A used the entity centric computer system (100) to determine that Division A made the biggest contribution to their measure performance. Divisions A used the entity centric computer system (100) to determine that it was the training they received at their corporate university that made the biggest contribution to their measure performance. The corporate university then used the entity centric computer system (100) to identify Sally Mack as the biggest contributor to their high level of training measure performance.

TABLE 12

Organization hierarchy of measure performance drivers

Organization finds Division A is biggest contributor to measure performance
    Division A finds Corporate University training is biggest contributor to measure performance
        Corporate University department identifies the Sally Mack as biggest contributor to measure performance Using an overall system for evaluating measure performance, each of the three performance drivers: Division A, the Corporate University and Sally Mack would be identified. However, because their contributions to measure performance are closely inter-related it would be difficult to identify their separate contributions using an overall analysis. A better use of the results from an overall analysis in an environment where there is a hierarchy associated with the entity is to ensure that there is a consistent alignment between the measures used at each level. For example, if the Corporate University system had identified John Black as the strongest contributor, then the Corporate University measures would clearly be out of alignment with the higher level measures that identified Sally Mack as the strongest contributor. The Corporate University measures would need to be adjusted to bring their measures into alignment with the overall measure (unless, of course, John Black is related to the CEO). Because efforts to achieve alignment have previously relied exclusively on management opinion and subjective measures like scorecards, some have concluded that achieving ongoing alignment is "impossible". While it may or may not have been impossible, the innovative system of the present invention provides an automated mechanism for establishing and maintaining alignment between different levels of a hierarchy for any entity with one or more defined functions that have defined measures. This same mechanism can be used for aligning the operation of every level with a hierarchy in accordance with the priorities established by the management team.

Some of the important features of the entity centric approach are summarized in Table 13.

TABLE 13

| Characteristic | Entity Centric System (100) Approach |
| --- | --- |
| Tangible benefit | Built in |
| Computation/ Search Space | Partitioned |
| Ontology Development and Maintenance | Automatic |
| Ability to analyze new element, resource or factor | Automatic - learns from data |
| Measures in alignment | Automatic |
| Data in context | Automatic |
| System Longevity | Equal to longevity of definable measure(s) |

To facilitate its use as a tool for improving performance, the entity centric computer system (100) produces reports in formats that are graphical and highly intuitive. By combining this capability with the previously described capabilities for: developing knowledge, flexibly defining robust performance measures, ensuring alignment, optimizing performance, reducing IT complexity and facilitating collaboration, the entity centric computer system (100) gives individuals, groups and entity managers the tools they need to model, manage and improve the performance of any entity with one or more defined measures. Before going further it is worth noting that the entity centric focus of the system of the present invention (100) could be easily modified to support the development of knowledge for an entity group or population by incorporating the ability to adjust the computation of statistics to account for different sample sizes in an automated fashion.

BRIEF DESCRIPTION OF DRAWINGS

These and other objects, features and advantages of the present invention will be more readily apparent from the following description of one embodiment of the invention in which:

FIG. 4 is a diagram showing the tables in the contextbase (50) of the present invention that are utilized for data storage and retrieval during the processing in the;

FIG. 7A, FIG. 7B, FIG. 7C, FIG. 7D, FIG. 7E, FIG. 7F, FIG. 7G and FIG. 7H are block diagrams showing the sequence of steps in the present invention used for creating a contextbase (50) for a subject entity;

DETAILED DESCRIPTION OF AN EMBODIMENT

Figure 1:
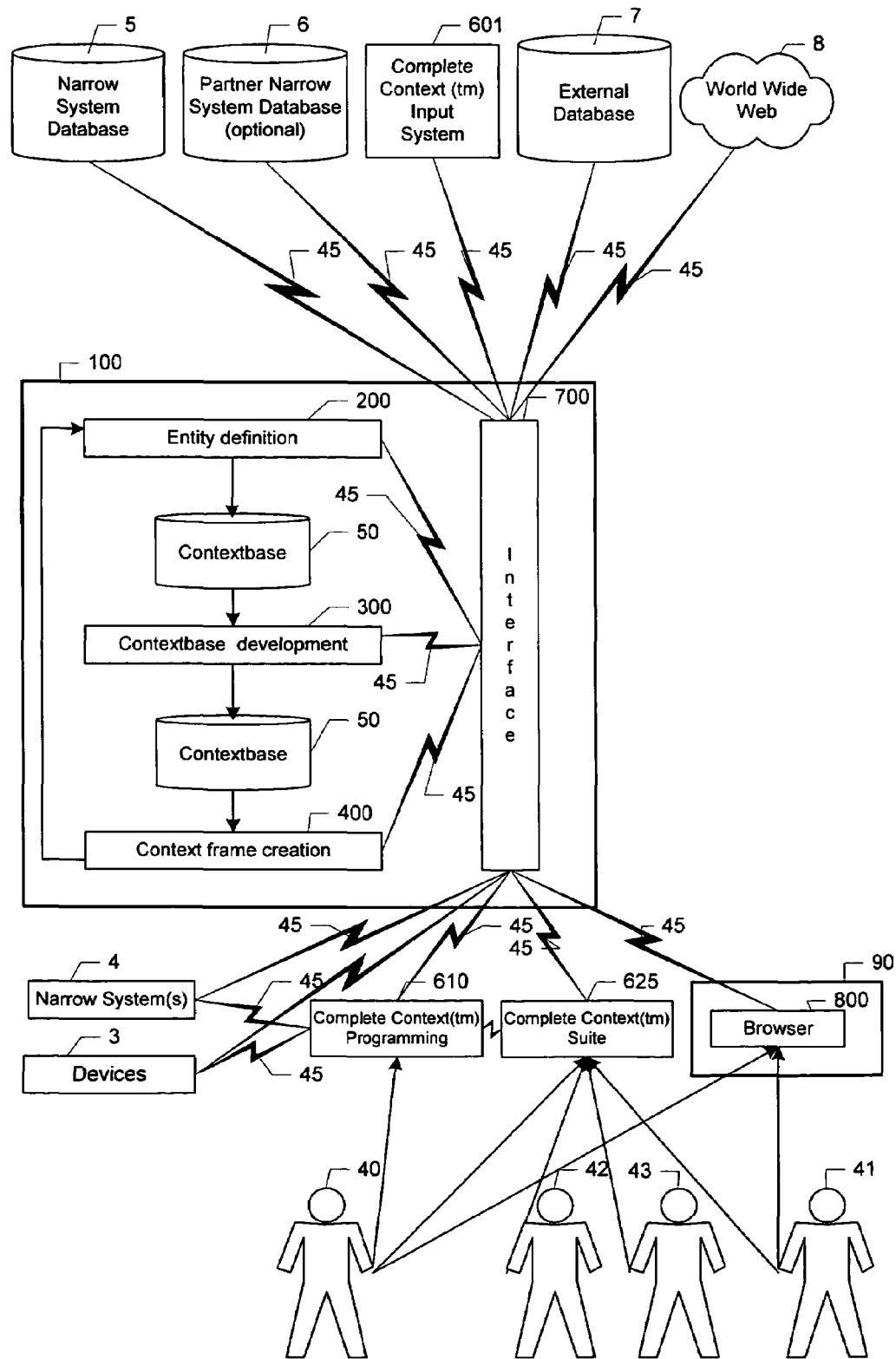
FIG. 1 is a block diagram showing the major processing steps of the present invention.

FIG. 1 provides an overview of the processing completed by the innovative system for entity centric computing. In accordance with the present invention, an automated system (100) and method for developing a contextbase (50) that contains up to seven types of context layers for each entity measure is provided. Processing starts in this system (100) when the data preparation portion of the application software (200) extracts data from a narrow system database (5); an external database (7); a world wide web (8) and optionally, a partner narrow system database (10) via a network (45). The World Wide Web (8) also includes the semantic web that is being developed. Data may also be obtained from a Complete Context™ Input System (601) or any other application that can provide xml output via the network (45) in this stage of processing. For example, newer versions of Microsoft® Office and Adobe® Acrobat® can be used to provide data input to the system (100) of the present invention.

After data is prepared, entity functions are defined and entity measures are identified, the contextbase (50) is developed by the second part of the application software (300). The entity contextbase (50) is then used by the context frame portion of the application software (400) to create context frames for use by the applications in the Complete Context™

Suite (625) and the Complete Context™ programming system (610). The processing completed by the system (100) may be influenced by a user (40) or a manager (41) through interaction with a user-interface portion of the application software (700) that mediates the display, transmission and receipt of all information to and from a browser software (800) such as the Netscape Navigator® or the Microsoft Internet Explorer® in an access device (90) such as a phone, personal digital assistant or personal computer where data are entered by the user (40). The user (40) and/or manager can also use a natural language interface (714) provided by the system (100) to interact with the system.

While only one database of each type (5, 6 and 7) is shown in FIG. 1, it is to be understood that the system (100) can process information from all narrow systems (4) listed in Table 4 for each entity being supported. In one embodiment, all functioning narrow systems (4) within each entity will provide data to the system (100) via the network (45). It should also be understood that it is possible to complete a bulk extraction of data from each database (5, 6 and 7) and the World Wide Web (8) via the network (45) using peer to peer networking and data extraction applications. The data extracted in bulk could be stored in a single datamart, a data warehouse or a storage area network where the analysis bots in later stages of processing could operate on the aggregated data. A virtual database that would leave all data in the original databases where it could be retrieved and optionally converted as required for calculations by the analysis bots over a network (45) can also be used.

Figure 4:
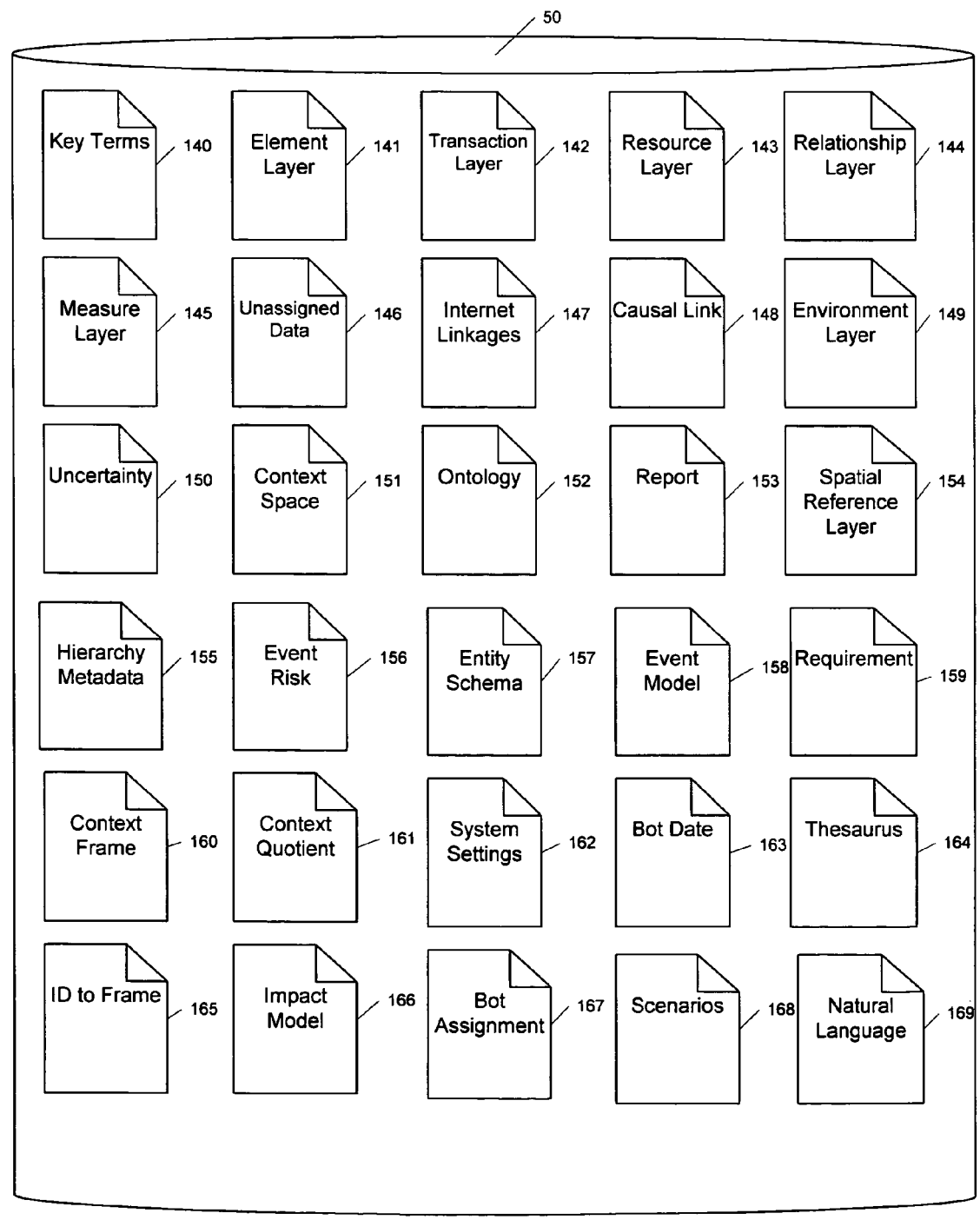

The operation of the system of the present invention is determined by the options the user (40) and manager (41) specify and store in the contextbase (50). As shown in FIG. 4, the contextbase (50) contains tables for storing extracted information by context layer including: a key terms table (140), a element layer table (141), a transaction layer table (142), an resource layer table (143), a relationship layer table (144), a measure layer table (145), a unassigned data table (146), an internet linkage table (147), a causal link table (148), an environment layer table (149), an uncertainty table (150), a context space table (151), an ontology table (152), a report table (153), a spatial reference layer table (154), a hierarchy metadata table (155), an event risk table (156), an entity schema table (157), an event model table (158), a requirement table (159), a context frame table (160), a context quotient table (161), a system settings table (162), a bot date table (163), a Thesaurus table (164), an id to frame table (165), an impact model table (166), a bot assignment table (167), a scenarios table (168) and a natural language table (169). The contextbase (50) can exist as a database, datamart, data warehouse, a virtual repository, a virtual database or storage area network. The system of the present invention has the ability to accept and store supplemental or primary data directly from user input, a data warehouse, a virtual database, a data preparation system or other electronic files in addition to receiving data from the databases described previously. The system of the present invention also has the ability to complete the necessary calculations without receiving data from one or more of the specified databases. However, in one embodiment all required information is obtained from the specified data sources (5, 6, 7, 8 and 601) for the subject entity.

Figure 5:
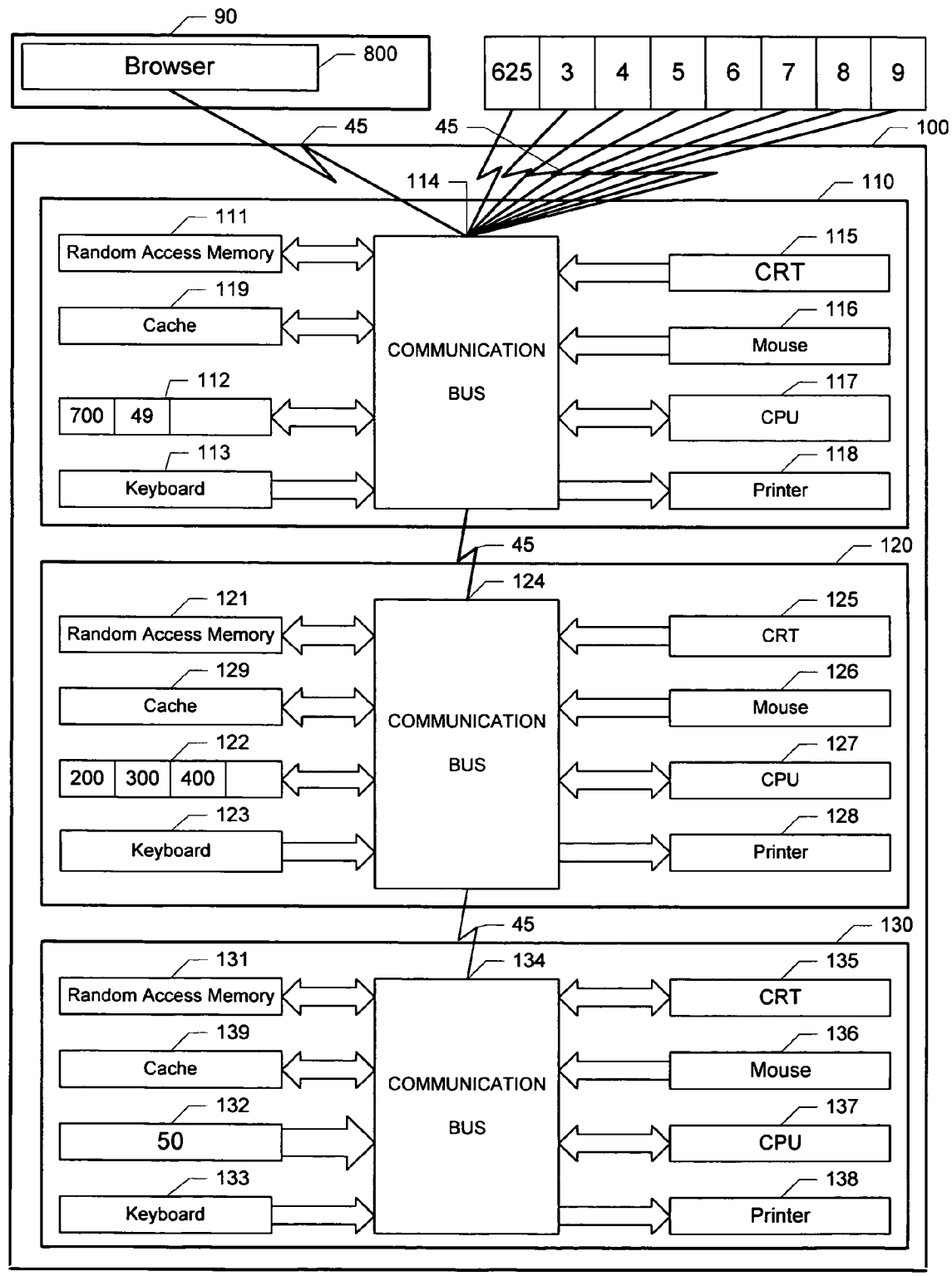
FIG. 5 is a block diagram of an implementation of the present invention.

As shown in FIG. 5, an embodiment of the present invention is a computer system (100) illustratively comprised of a user-interface personal computer (110) connected to an application-server personal computer (120) via a network (45). The application-server personal computer (120) is in turn connected via the network (45) to a database-server personal computer (130). The user interface personal computer (110) is also connected via the network (45) to an Internet browser appliance (90) that contains browser software (800) such as Microsoft Internet Explorer® or Netscape Navigator®.

In this embodiment, the database-server personal computer (130) has a read/write random access memory (131), a hard drive (132) for storage of the contextbase (50), a keyboard (133), a communication bus (134), a display (135), a mouse (136), a CPU (137), a printer (138) and a cache (139). The application-server personal computer (120) has a read/write random access memory (121), a hard drive (122) for storage of the non-user-interface portion of the entity section of the application software (200, 300 and 400) of the present invention, a keyboard (123), a communication bus (124), a display (125), a mouse (126), a CPU (127), a printer (128) and a cache (129). While only one client personal computer is shown in FIG. 5, it is to be understood that the application-server personal computer (120) can be networked to a plurality of client, user-interface personal computers (110) via the network (45). The application-server personal computer (120) can also be networked to a plurality of server, personal computers (130) via the network (45). It is to be understood that the diagram of FIG. 5 is merely illustrative of one embodiment of the present invention as the system of the present invention could operate with the support of a single computer, any number of networked computers, any number of virtual computers, any number of clusters, a computer grid and some combination thereof.

The user-interface personal computer (110) has a read/write random access memory (111), a hard drive (112) for storage of a client data-base (49) and the user-interface portion of the application software (700), a keyboard (113), a communication bus (114), a display (115), a mouse (116), a CPU (117), a printer (118) and a cache (119).

The application software (200, 300 and 400) controls the performance of the central processing unit (127) as it completes the calculations required to support Complete Context™ development. In the embodiment illustrated herein, the application software program (200, 300 and 400) is written in a combination of Java, C# and C++. The application software (200, 300 and 400) can use Structured Query Language (SQL) for extracting data from the databases and the World Wide Web (5, 6, 7 and 8). The user (40) and manager (41) can optionally interact with the user-interface portion of the application software (700) using the browser software (800) in the browser appliance (90) or through a natural language interface (714) provided by the system (100) to provide information to the application software (200, 300 and 400) for use in determining which data will be extracted and transferred to the contextbase (50) by the data bots.

User input is initially saved to the client database (49) before being transmitted to the communication bus (124) and on to the hard drive (122) of the application-server computer via the network (45). Following the program instructions of the application software, the central processing unit (127) accesses the extracted data and user input by retrieving it from the hard drive (122) using the random access memory (121) as computation workspace in a manner that is well known.

The computers (110, 120, 130) shown in FIG. 5 illustratively are personal computers or workstations that are widely available for use with Linux, Unix or Windows operating systems. Typical memory configurations for client personal computers (110) used with the present invention should include at least 1028 megabytes of semiconductor random access memory (111) and at least a 200 gigabyte hard drive (112). Typical memory configurations for the application-server personal computer (120) used with the present invention should include at least 5128 megabytes of semiconductor random access memory (121) and at least a 300 gigabyte hard drive (122). Typical memory configurations for the database-server personal computer (130) used with the present invention should include at least 5128 megabytes of semiconductor random access memory (131) and at least a 750 gigabyte hard drive (132).

Using the system described above, data is extracted from the narrowly focused entity systems (4), external databases (7) and the World Wide Web (8) as required to develop a contextbase (50), develop context frames and manage performance. In this invention, analysis bots are used to determine context element lives and the percentage of measure performance that is attributable to each context element. The resulting values are then added together to determine the contribution of each context element to the measure performance. Context factor contributions and risk impacts are calculated in a similar manner, however, they may not have defined lives.

Figure 6A:
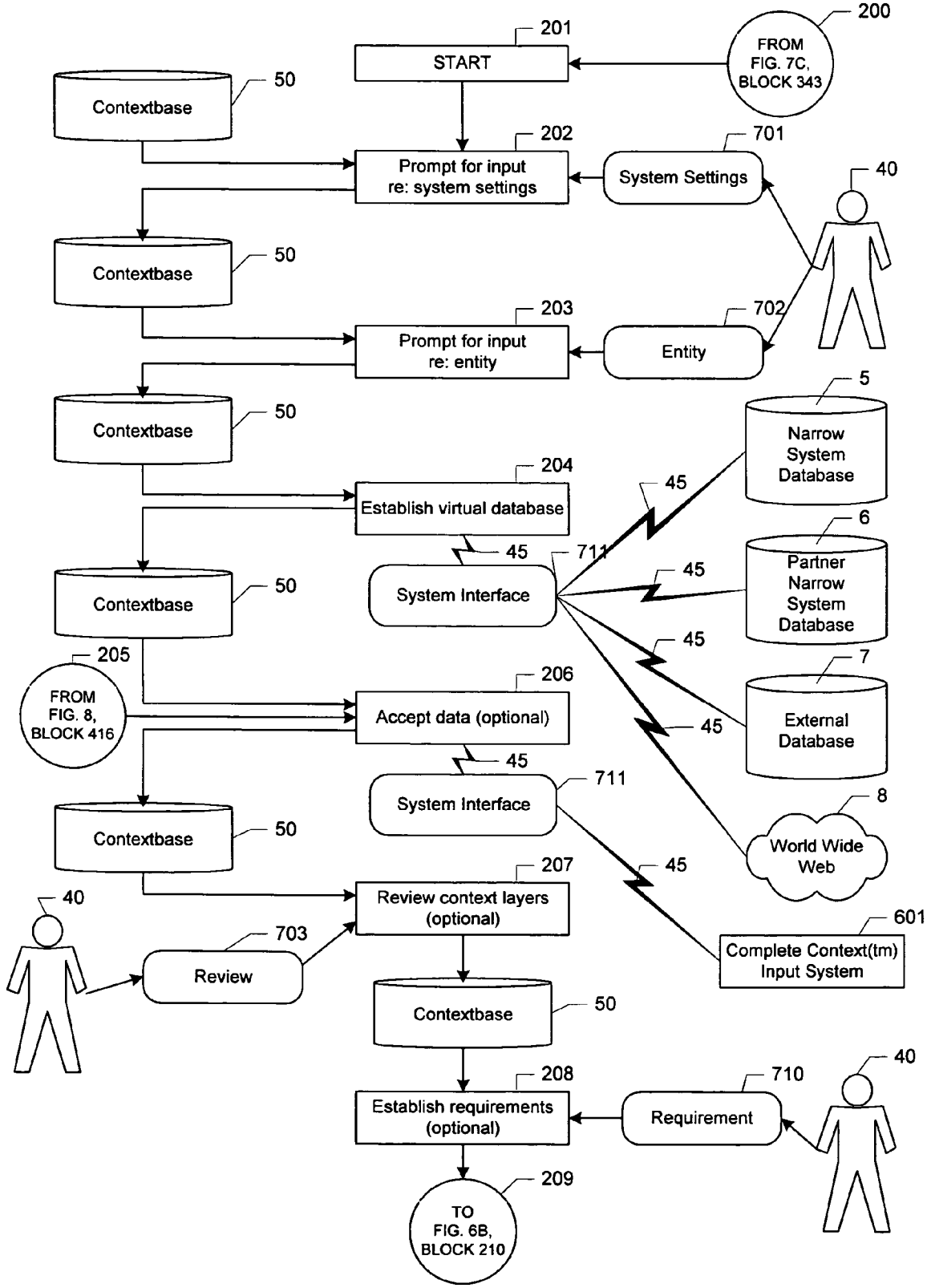
FIG. 6A, FIG. 6B and FIG. 6C are block diagrams showing the sequence of steps in the present invention used for specifying system settings, preparing data for processing and specifying the entity measures.
Figure 6B:
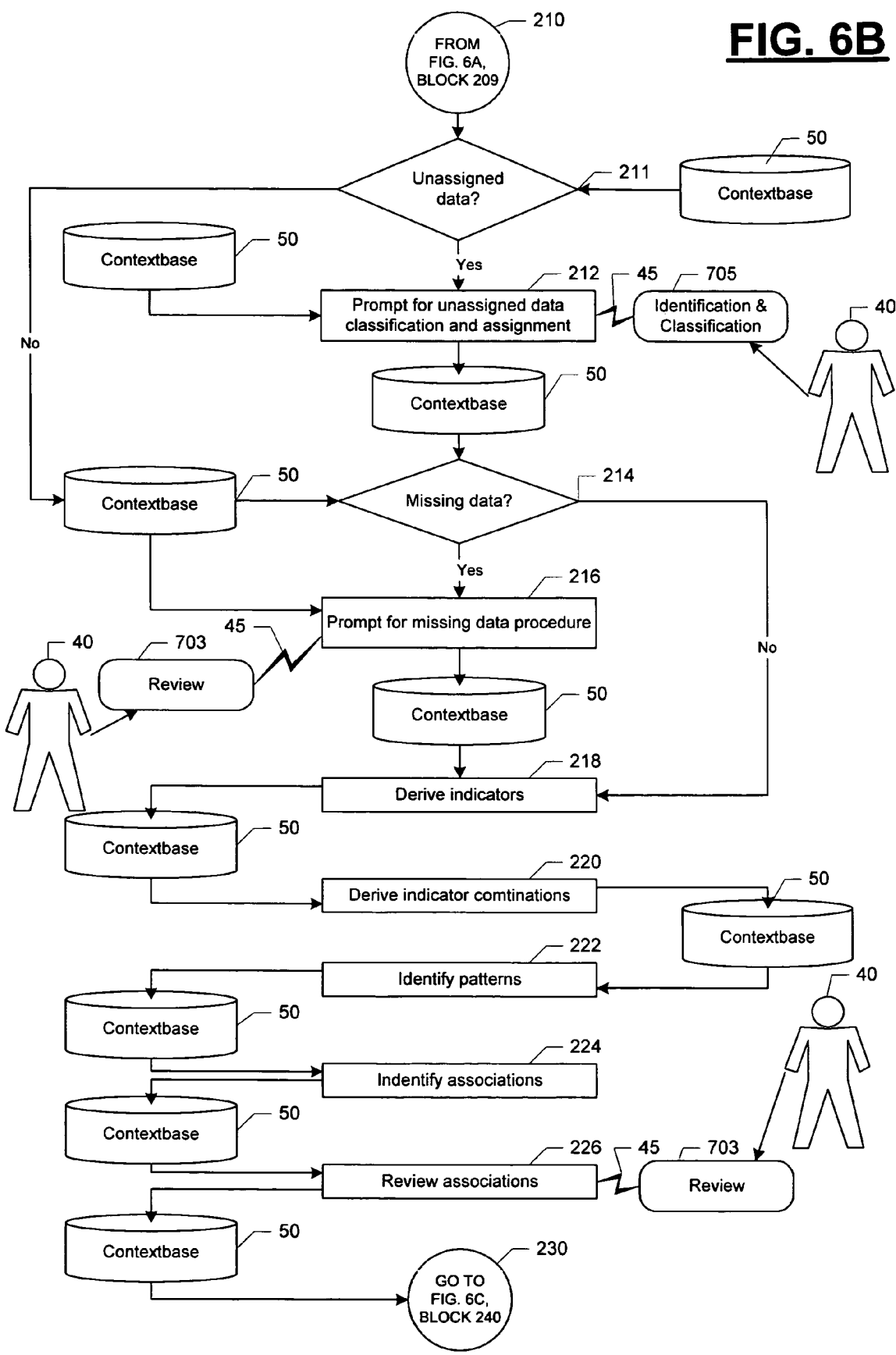
Figure 6C:
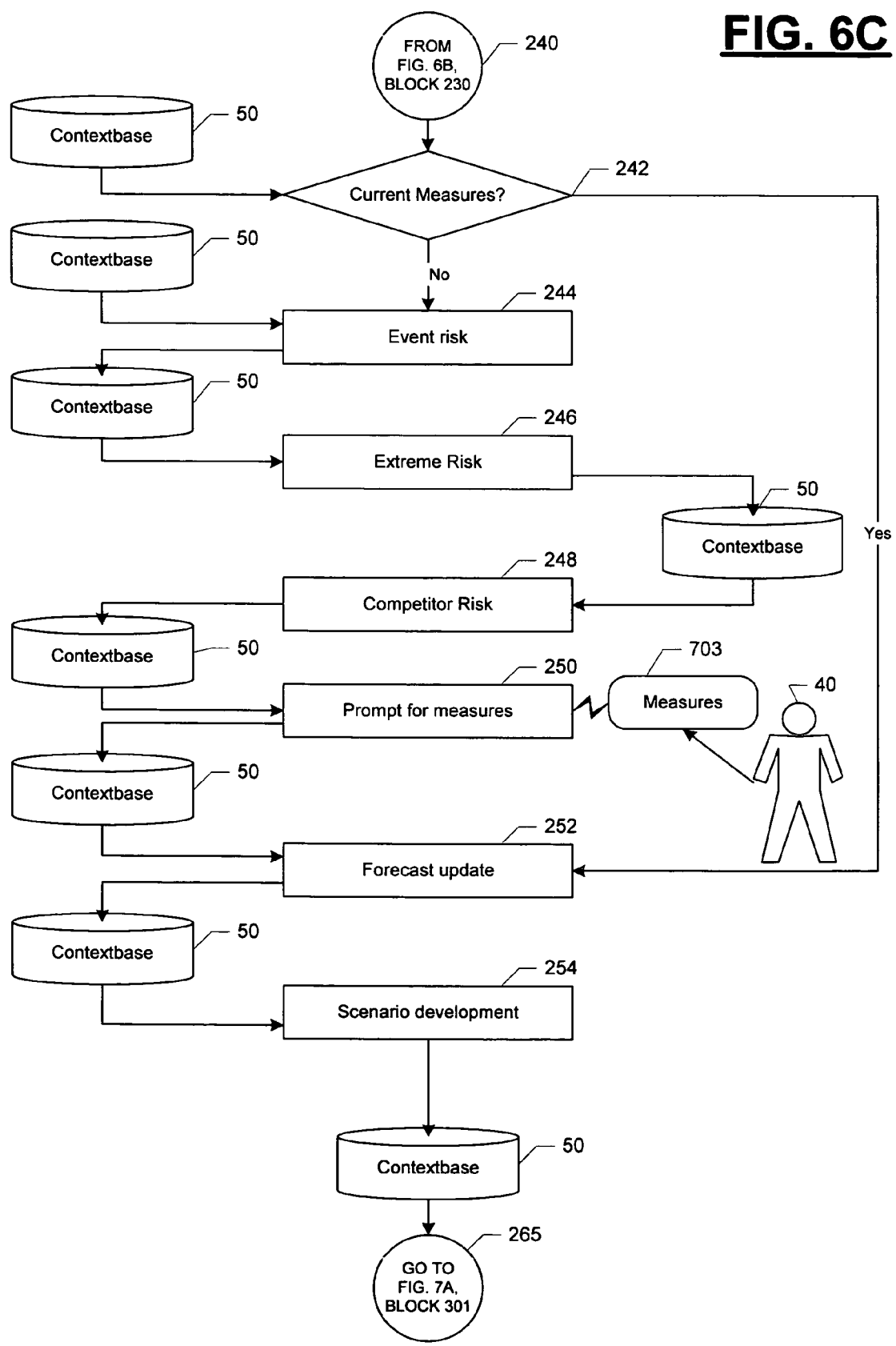
Figure 7A:
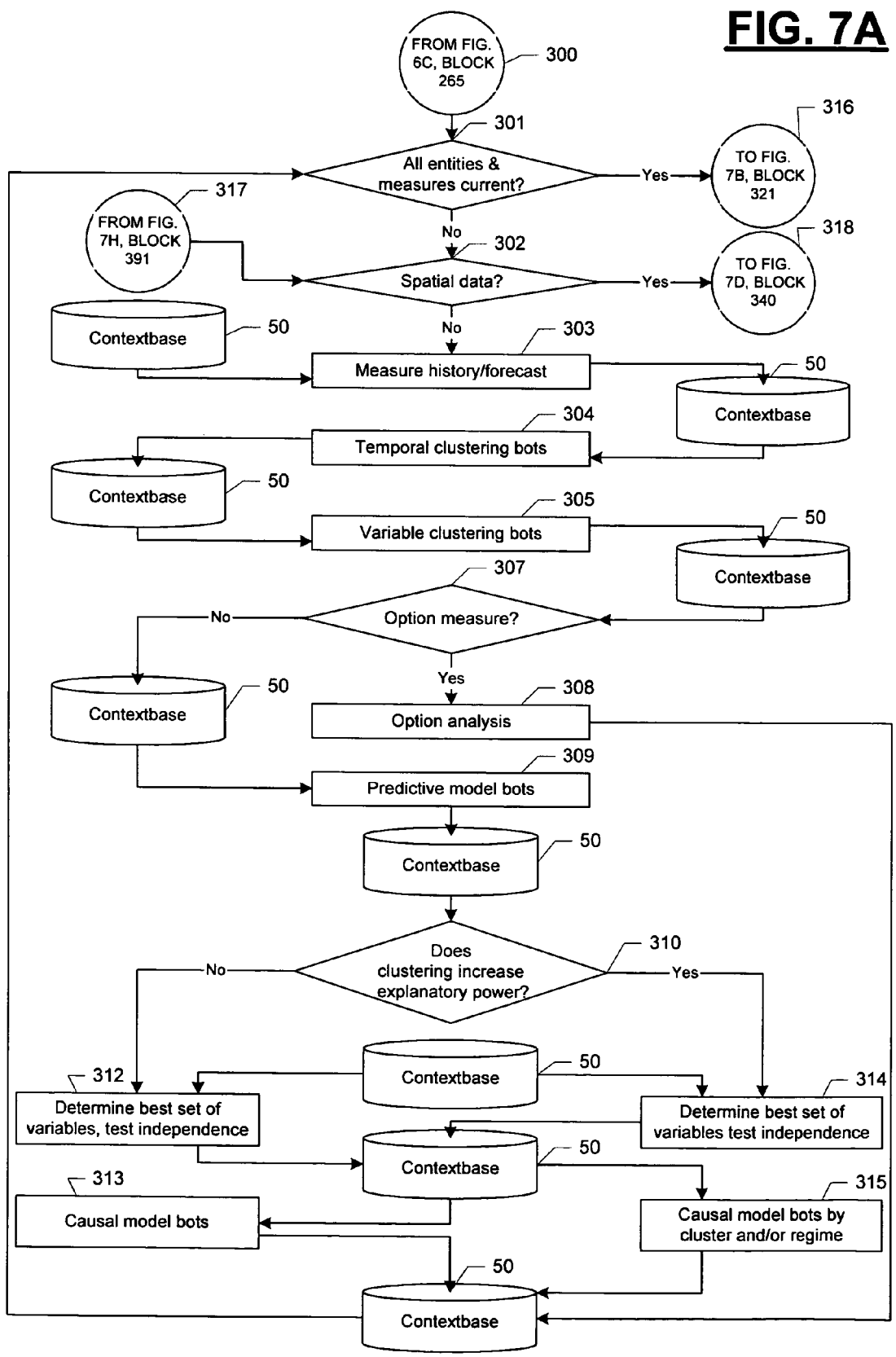
Figure 7B:
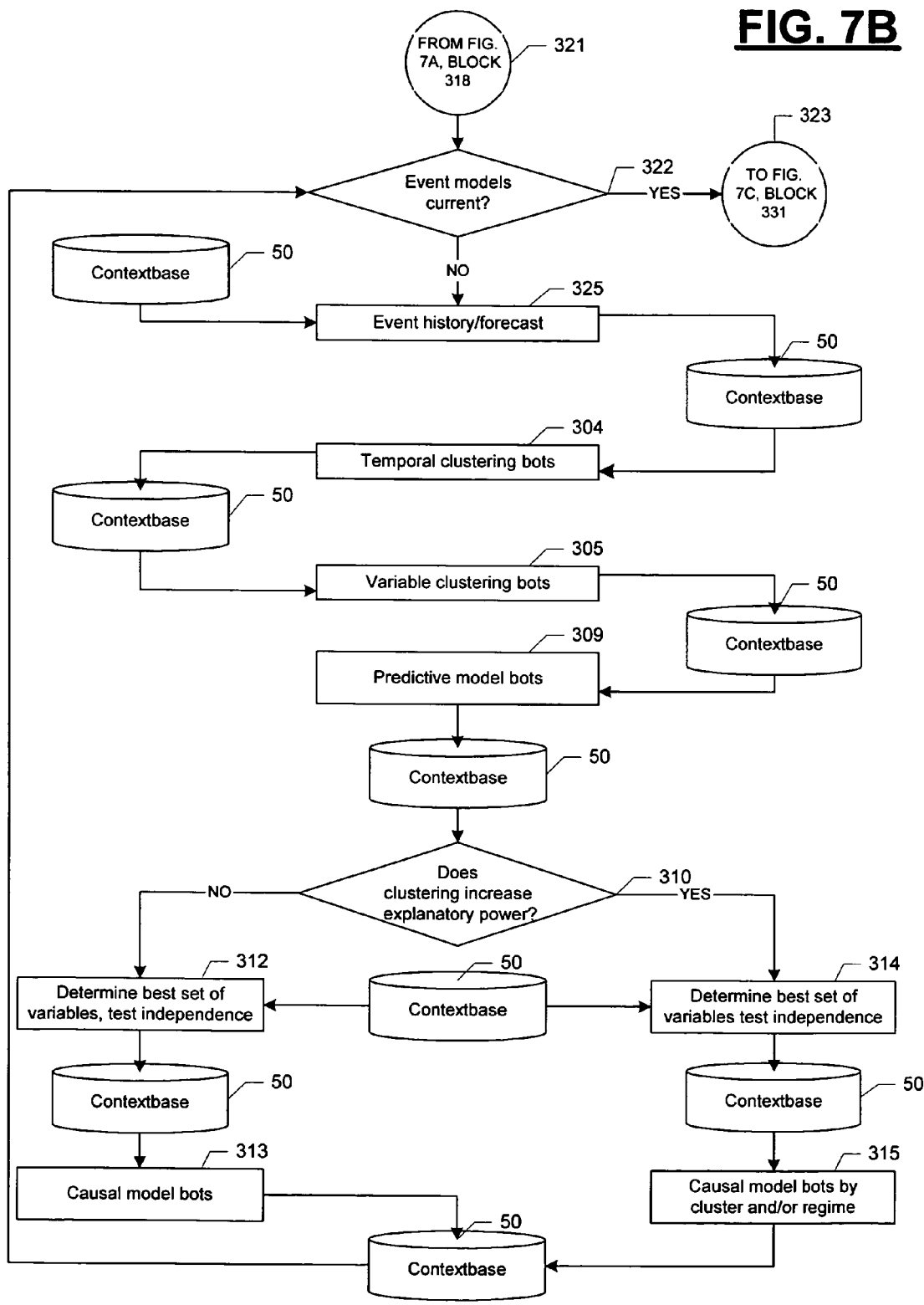
Figure 7D:
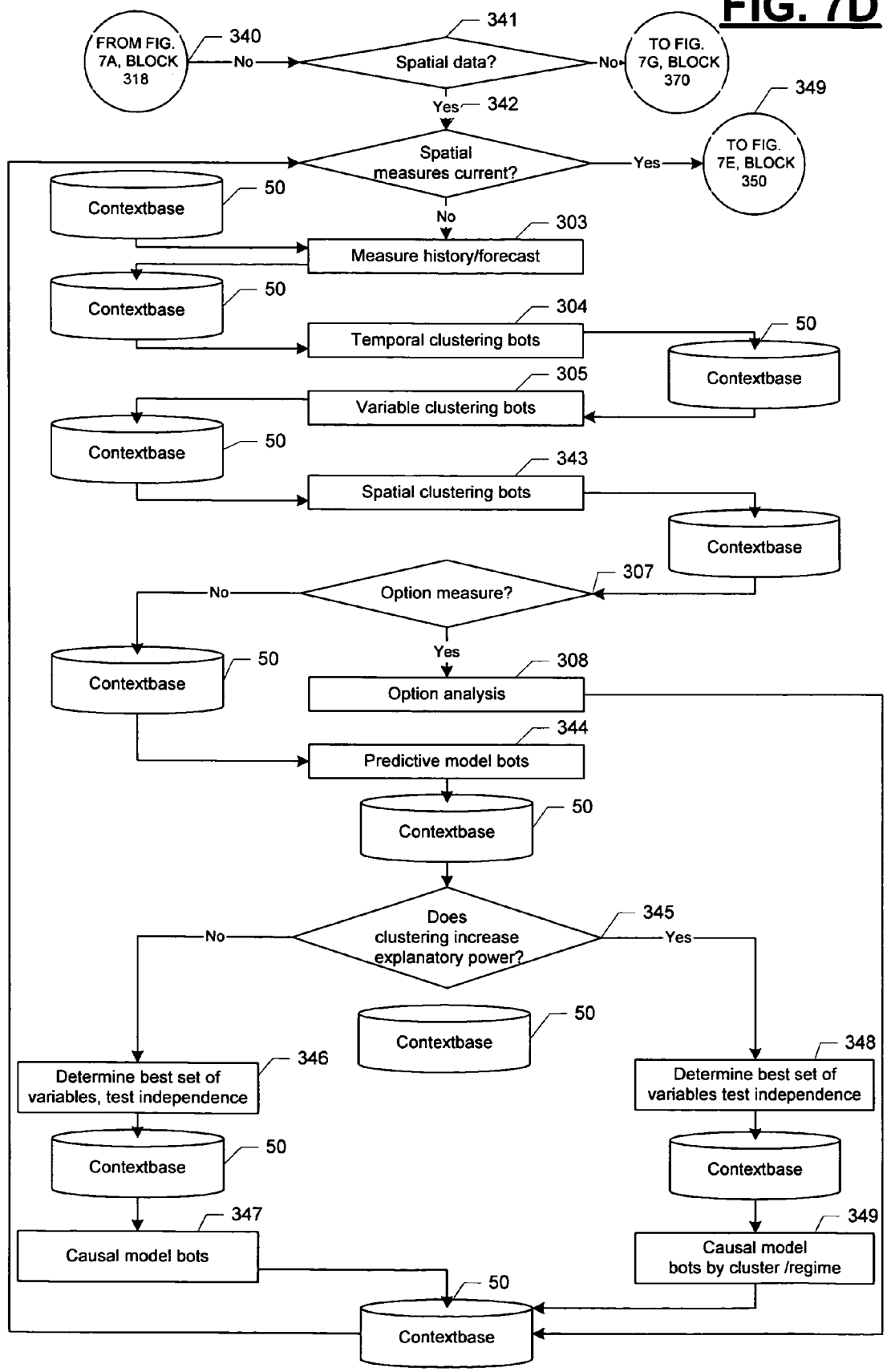
Figure 7E:
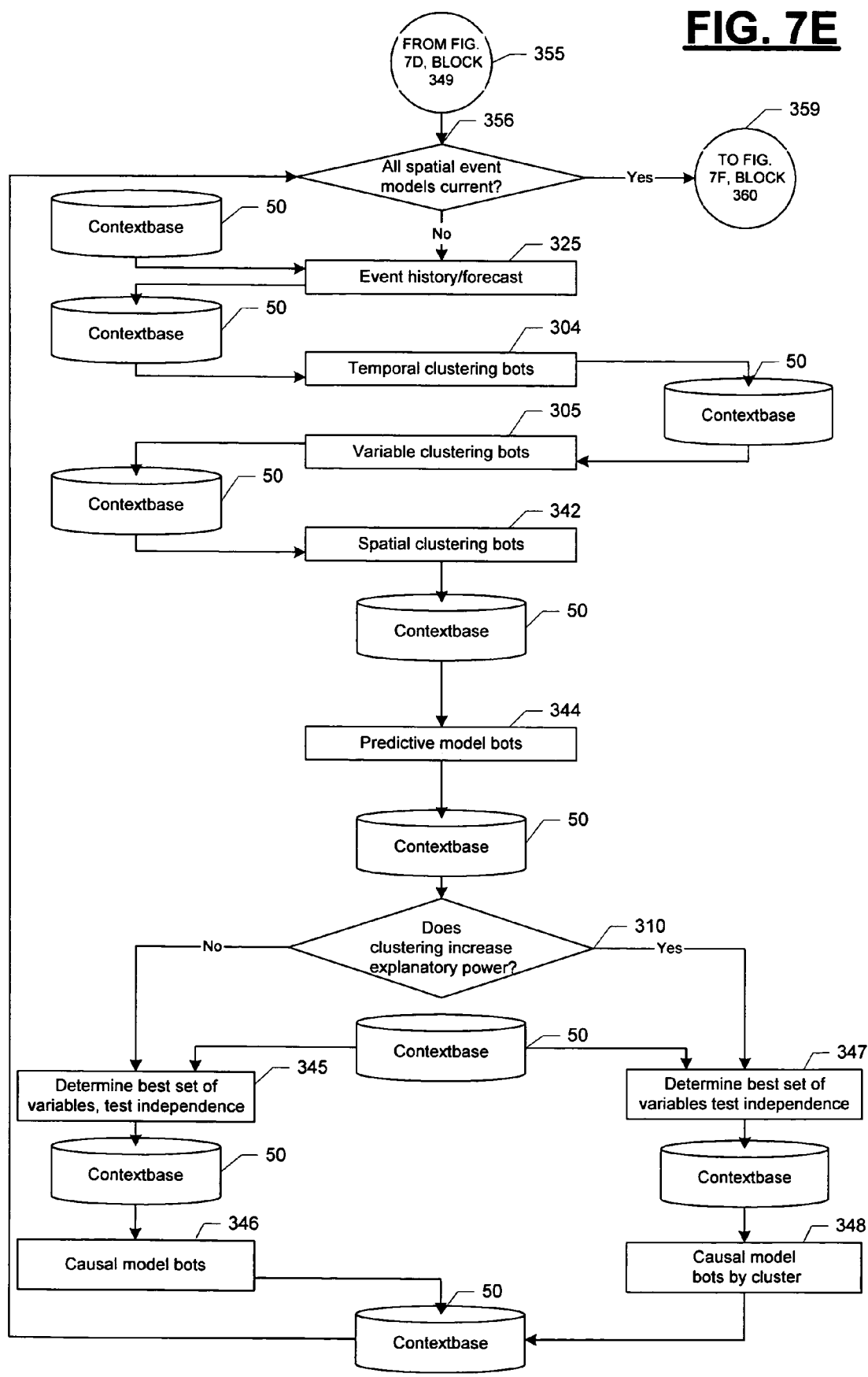
Figure 7F:
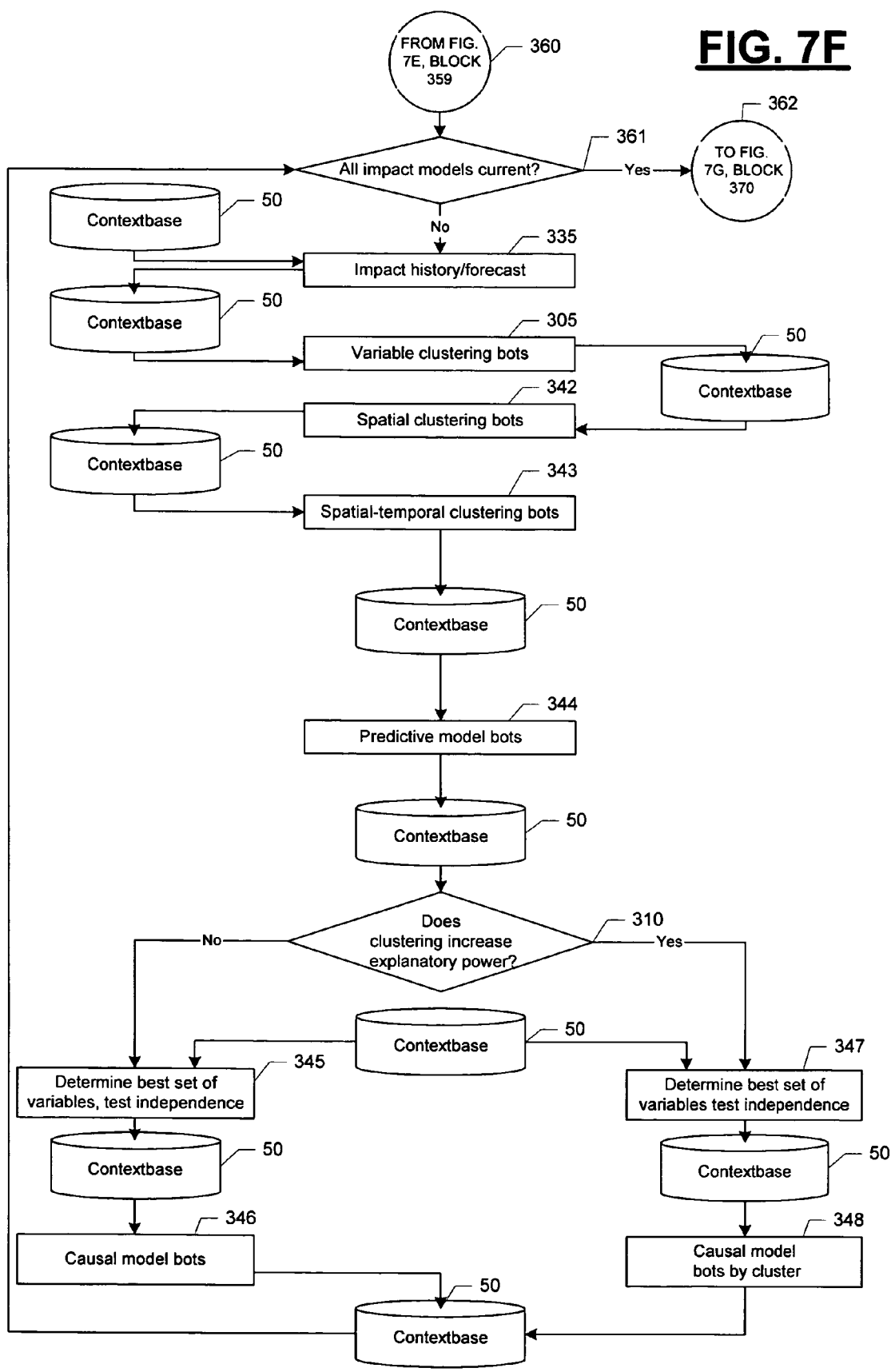
Figure 7G:
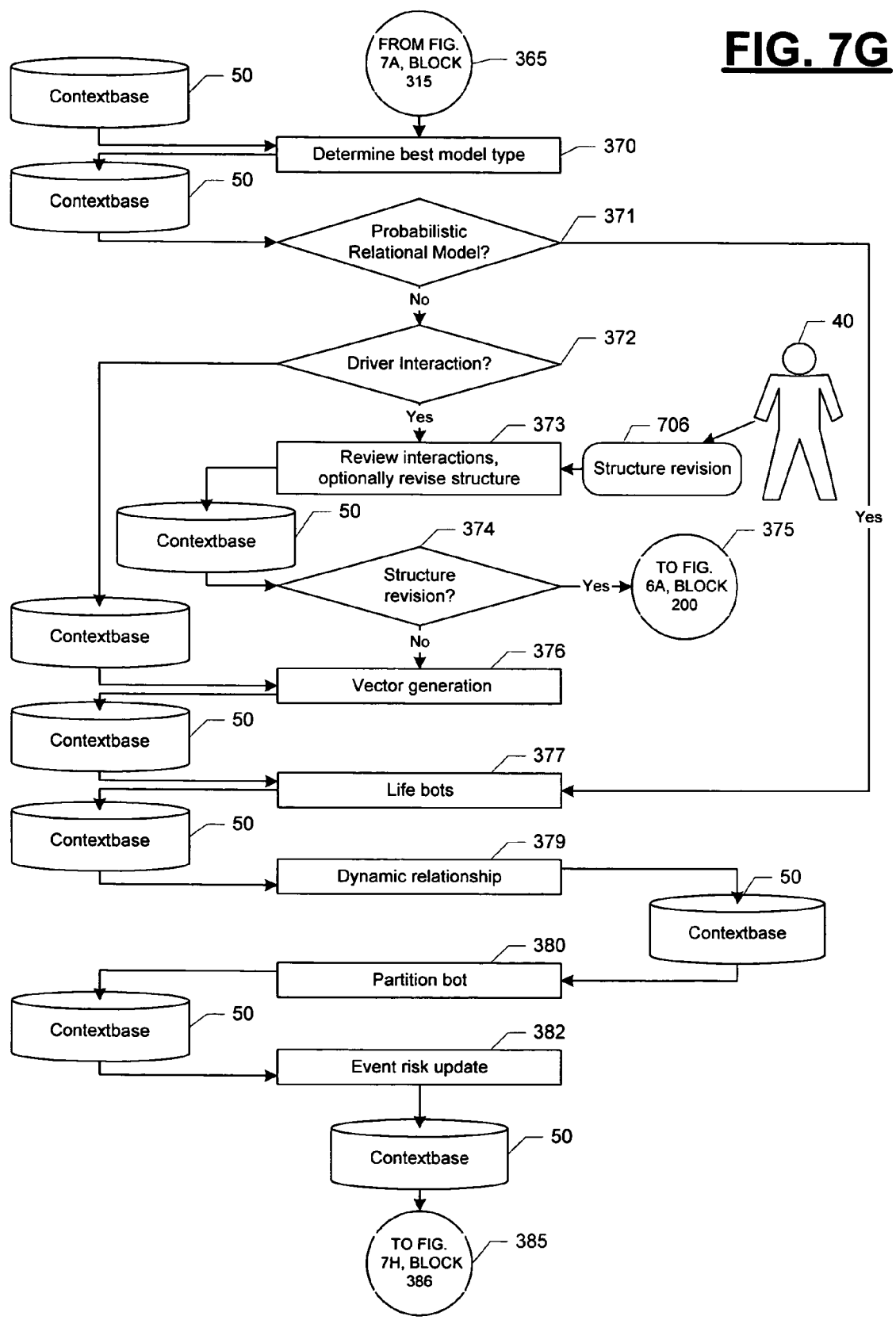
Figure 7H:
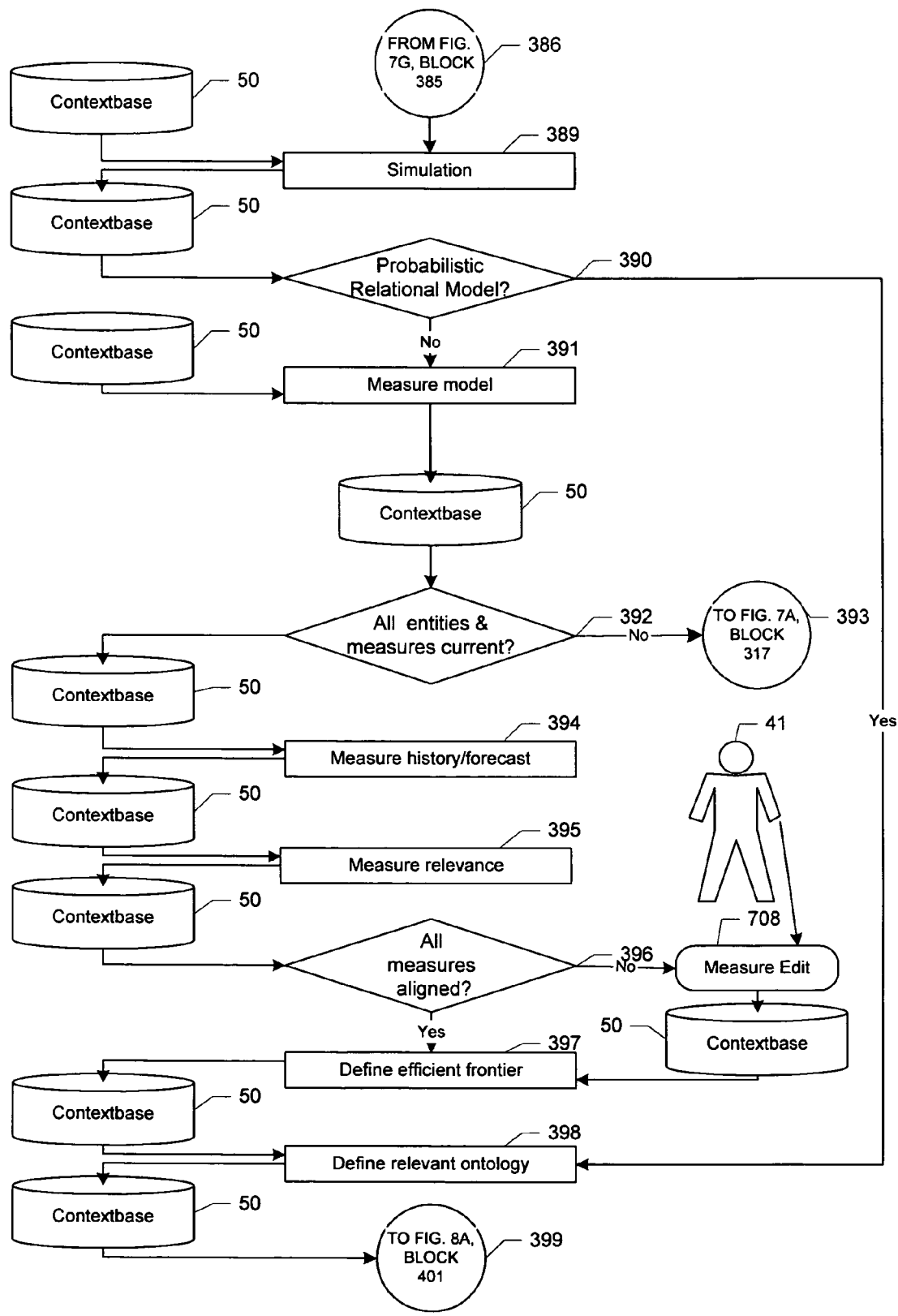
Figure 8A:
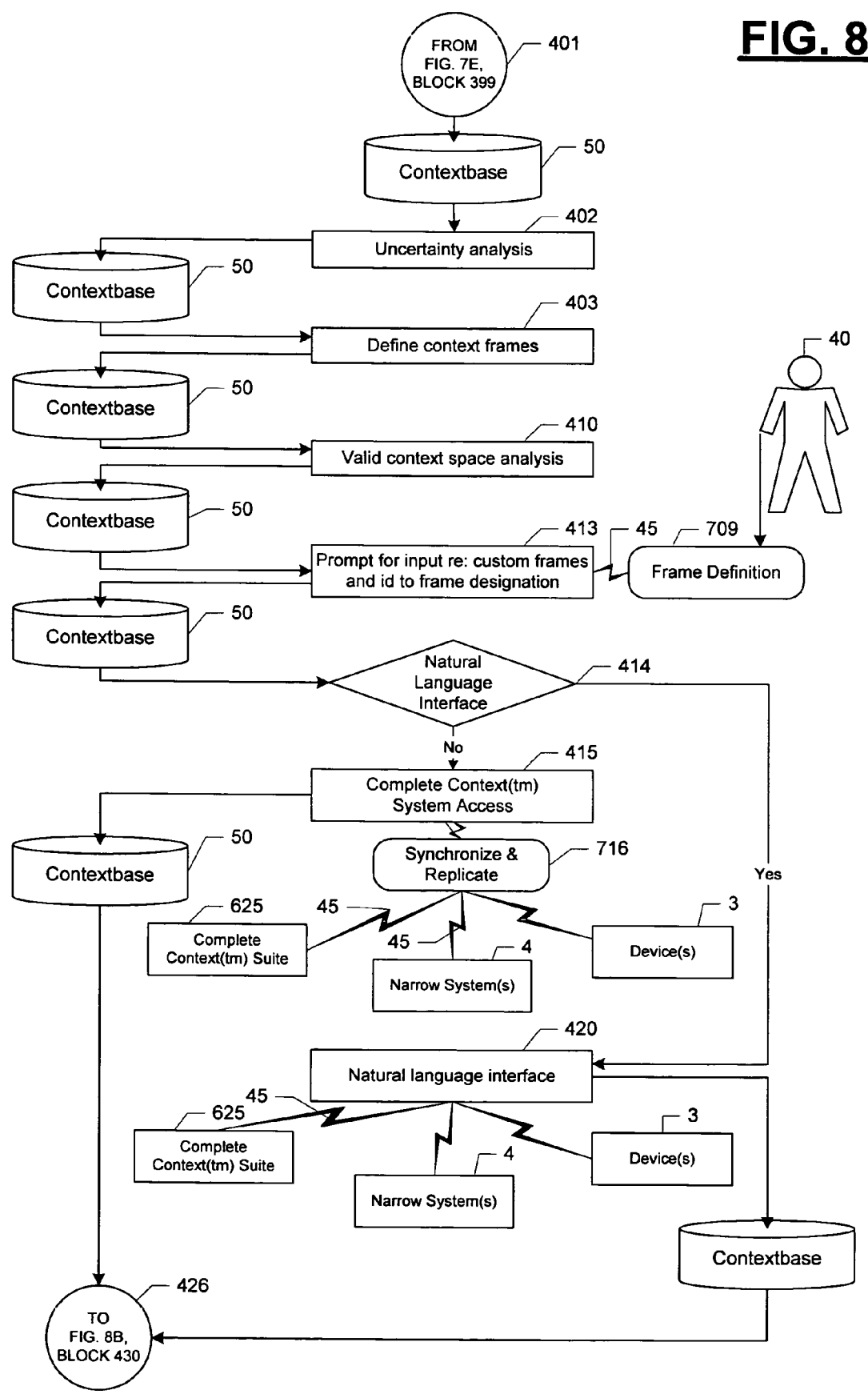
FIG. 8A and FIG. 8B are block diagrams showing the sequence in steps in the present invention used in defining context frames, creating bots, applications and performance reports.
Figure 8B:
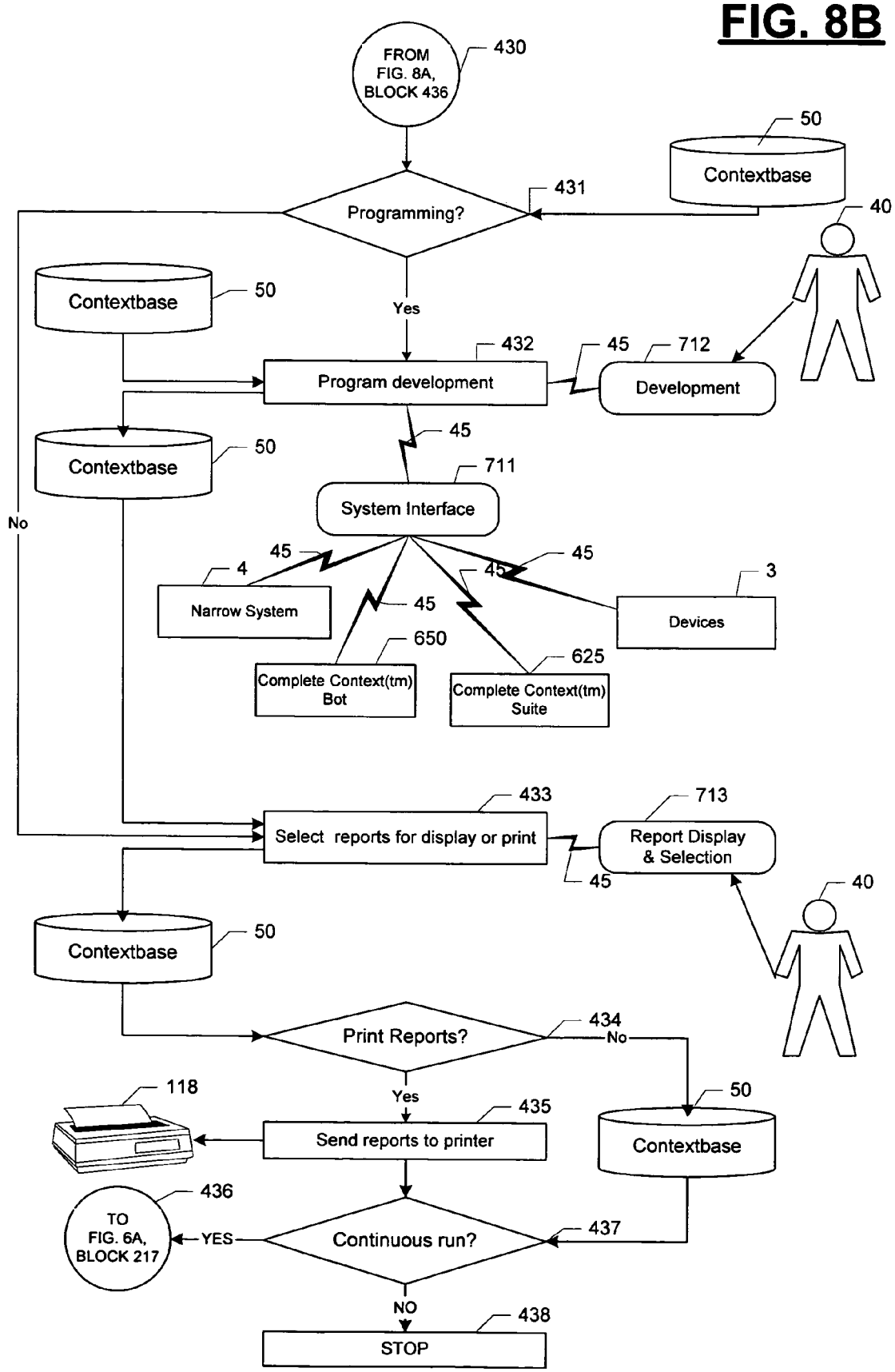
Figure 9:
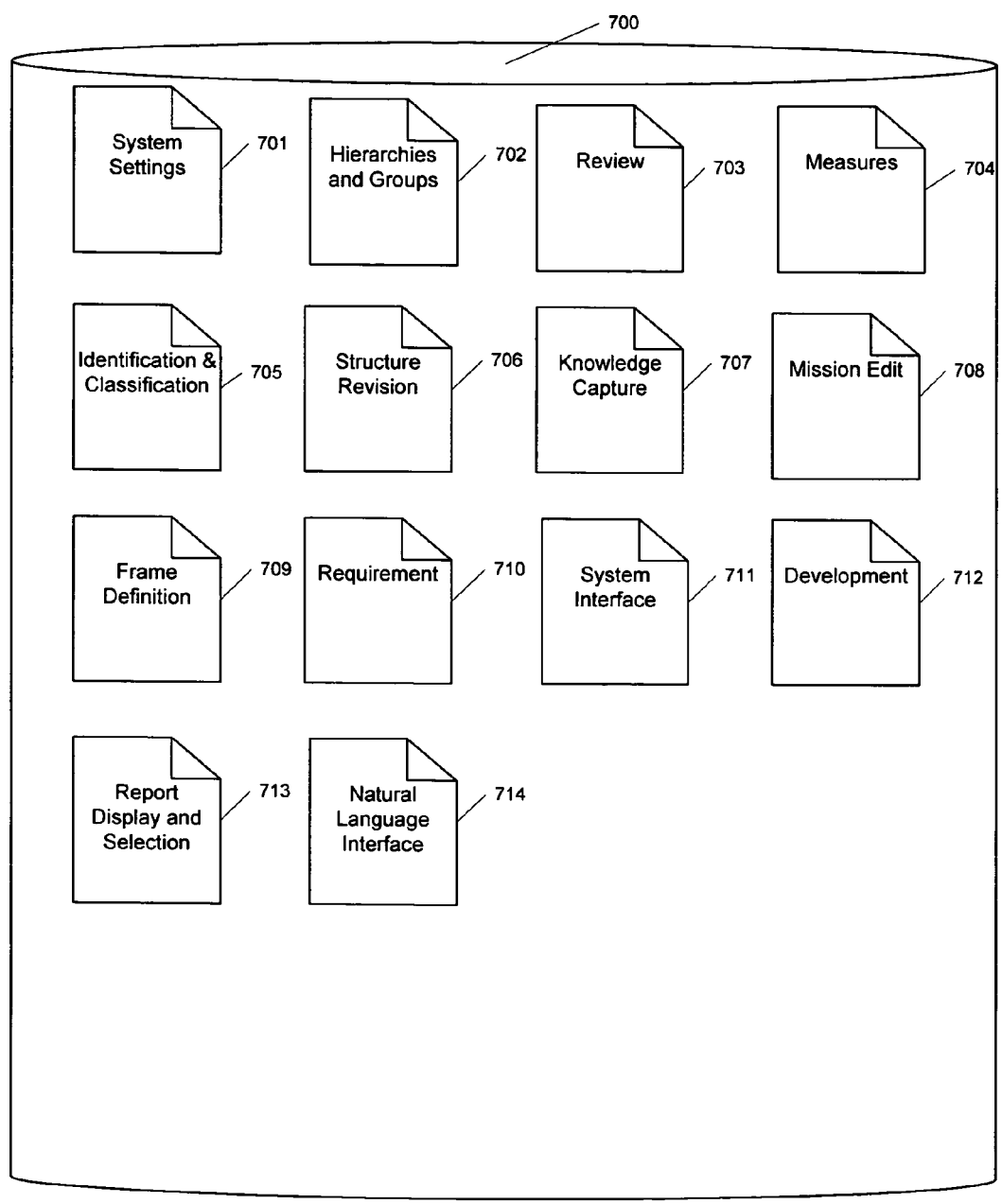
FIG. 9 is a diagram showing the data windows that are used for receiving information from and transmitting information via the interface (700)

As discussed previously, the entity centric computer system (100) completes processing in three distinct stages. As shown in FIG. 6A, FIG. 6B and FIG. 6C the first stage of processing (block 200 from FIG. 1) identifies and prepares data from narrow systems (4) for processing, identifies the entity and entity function measures. As shown in FIG. 7A, FIG. 7B, FIG. 7C, FIG. 7D, FIG. 7E, FIG. 7F, FIG. 7G and FIG. 7H the second stage of processing (block 300 from FIG. 1) develops and then continually updates a contextbase (50) by subject entity measure. As shown in FIG. 8A and FIG. 8B, the third stage of processing (block 400 from FIG. 1) identifies the valid context space, prepares context frames, distributes context frames and sub-context frames using a variety of mechanisms and optionally prepares and print reports. If the operation is continuous, then the processing steps described are repeated continuously. As described below, one embodiment of the software is a bot or agent architecture. Other architectures including a web service architecture, a grid service architecture, an n-tier client server architecture, an integrated application architecture and some combination thereof can be used to the same effect.

Entity Definition

The flow diagrams in FIG. 6A, FIG. 6B and FIG. 6C detail the processing that is completed by the portion of the application software (200) that defines the subject entity, identifies the functions and measures for said entity and establishes a virtual database for data from other systems that is available for processing, prepares unstructured data for processing and accepts user (40) and management (41) input. As discussed previously, the system of the present invention is capable of accepting data from all the narrow systems (4) listed in Tables 4, 5, 6 and 7. Data extraction, processing and storage are normally completed by the entity centric computer system (100). This data extraction, processing and storage can be facilitated by a separate data integration layer as described in cross referenced application Ser. No. 99/999,999. Operation of the system (100) will be illustrated by describing the extraction and use of structured data from a narrow system database (5) for supply chain management and an external database (7). A brief overview of the information typically obtained from these two databases will be presented before reviewing each step of processing completed by this portion (200) of the application software.

Supply chain systems are one of the narrow systems (4) identified in Table 7. Supply chain databases are a type of narrow system database (5) that contain information that may have been in operation management system databases in the past. These systems provide enhanced visibility into the availability of resources and promote improved coordination between subject entities and their supplier entities. All supply chain systems would be expected to track all of the resources ordered by an entity after the first purchase. They typically store information similar to that shown below in Table 14.

TABLE 14

Supply chain system information

| 1. | Stock Keeping Unit (SKU) |
| 2. | Vendor |
| 3. | Total quantity on order |
| 4. | Total quantity in transit |
| 5. | Total quantity on back order |
| 6. | Total quantity in inventory |
| 7. | Quantity available today |
| 8. | Quantity available next 7 days |
| 9. | Quantity available next 30 days |
| 10. | Quantity available next 90 days |
| 11. | Quoted lead time |
| 12. | Actual average lead time |

External databases (7) are used for obtaining information that enables the definition and evaluation of context elements, context factors and event risks. In some cases, information from these databases can be used to supplement information obtained from the other databases and the World Wide Web (5, 6 and 8). In the system of the present invention, the information extracted from external databases (7) includes the data listed in Table 15.

TABLE 15

External database information

| 1. | Text information such as that found in the Lexis Nexis database; |
| 2. | Text information from databases containing past issues of specific publications; |
| 3. | Multimedia information such as video and audio clips; |
| 4. | Idea market prices indicate likelihood of certain events occurring; and |
| 4. | Other event risk data including information about risk probability and magnitude for weather and geological events |

System processing of the information from the different databases (5, 6 and 7) and the World Wide Web (8) described above starts in a block 202, FIG. 6A. The software in block 202 prompts the user (40) via the system settings data window (701) to provide system setting information. The system setting information entered by the user (40) is transmitted via the network (45) back to the application-server (120) where it is stored in the system settings table (162) in the contextbase (50) in a manner that is well known. The specific inputs the user (40) is asked to provide at this point in processing are shown in Table 16.

TABLE 16*

| 1. | Continuous, if yes, calculation frequency? (by minute, hour, day, week, etc.) |
| 2. | Subject Entity (hierarchy or group member, collaboration or multi domain/entity system) |
| 3. | SIC Codes |
| 4. | Names of primary competitors by SIC Code |
| 5. | Base account structure |
| 6. | Base units of measure |
| 7. | Base currency |
| 8. | Risk free interest rate |
| 9. | Program bots or applications? (yes or no) |
| 10. | Process measurements? (yes or no) |
| 11. | Probabilistic relational models? (yes or no) |

TABLE 16*-continued

| | |
|---|---|
| 12. | Knowledge capture and/or collaboration? (yes or no) |
| 13. | Natural language interface? (yes, no or voice activated) |
| 14. | Video data extraction? (yes or no) |
| 15. | Imaging data extraction? (yes or no) |
| 16. | Internet data extraction? (yes or no) |
| 17. | Reference layer (yes or no, if yes specify coordinate system(s)) |
| 18. | Text data analysis? (if yes, then specify maximum number of relevant words) |
| 19. | Geo-coded data? (if yes, then specify standard) |
| 20. | Maximum number of clusters (default is six) |
| 21. | Management report types (text, graphic or both) |
| 22. | Default missing data procedure (chose from selection) |
| 23. | Maximum time to wait for user input |
| 24. | Maximum number of sub elements |
| 25. | Most likely scenario, normal, extreme or mix (default is normal) |
| 26. | System time period (days, month, years, decades, light years, etc.) |
| 27. | Date range for history-forecast time periods (optional) |
| 28. | Uncertainty by narrow system type (optionally, default is zero) |
| 29. | Uncertainty source for systems above zero (i.e. forecast, technology limitation, reliability, etc.) |

The system settings data are used by the software in block 202 to establish context layers. As described previously, there are seven types of context layers for the subject entity. The application of the remaining system settings will be further explained as part of the detailed explanation of the system operation. The software in block 202 also uses the current system date and the system time period saved in the system settings table (162) to determine the time periods (generally in months) where data will be sought to complete the calculations. The user (40) also has the option of specifying the time periods that will be used for system calculations. After the date range is stored in the system settings table (162) in the contextbase (50), processing advances to a software block 203.

The software in block 203 prompts the user (40) via the entity data window (702) to identify the subject entity, identify subject entity functions and identify any extensions to the subject entity hierarchy or hierarchies specified in the system settings table (162). For example if the organism hierarchy (23) was chosen, the user (40) could extend the hierarchy by specifying a join with the cell hierarchy (21). As part of the processing in this block, the user (40) is also given the option to modify the subject entity hierarchy or hierarchies. If the user (40) elects to modify one or more hierarchies, then the software in the block will prompt the user (40) to provide the information required to modify the pre-defined hierarchy metadata in the hierarchy metadata table (155) to incorporate the modifications. The user (40) can also elect to limit the number of separate levels that are analyzed below the subject entity in a given hierarchy. For example, an organization could choose to examine the impact of their divisions on organization performance by limiting the context elements to one level below the subject entity. After the user (40) completes the specification of hierarchy extensions, modifications and limitations, the software in block 203 selects the appropriate metadata from the hierarchy metadata table (155) and establishes the entity schema, ontology and metadata (157). The software in block 203 uses the extensions, modifications and limitations together with three rules for establishing the entity schema:

1. the members of the entity hierarchy that are above the subject entity are factors;
2. hierarchies that could be used to extend the entity hierarchy that are not selected will be excluded; and
3. all other hierarchies and groups will be factors.

After entity schema is developed, the user (40) is asked to define process maps and procedures. The maps and procedures identified by the user (40) are stored in the relationship layer table (144) in the contextbase (50). The information provided by the user (40) will be supplemented with information developed later in the first stage of processing. It is also possible to obtain relationship layer information concerning process maps and procedures in an automated fashion by analyzing transaction patterns or reverse engineering narrow systems (4) as they often codify the relationship between different context elements, factors, events, resources and/or actions. The knowledge capture and collaboration system (622) that is used later in processing could also be used here to supplement the information provided by the user (40). After data storage is complete, processing advances to a software block 204.

The software in block 204 prompts a system interface (711) to communicate via a network (45) with the different databases (5, 6, and 7) and the World Wide Web (8) that are data sources for the entity centric computer system (100). As shown on FIG. 10 the system interface (711) consists of a multiple step operation where the sequence of steps depends on the nature of the interaction and the data being provided to the system (100). In one embodiment, a data input session would be managed by the a software block (720) that identifies the data source (3, 4, 5, 6, 7 or 8) using standard protocols such as UDDI or xml headers, maintains security and establishes a service level agreement with the data source (3, 4, 5, 6, 7 or 8). The data provided at this point would include transaction data, descriptive data, imaging data, video data, text data, sensor data geospatial data, array data and combinations thereof. The session would proceed to a software block (722). If the data provided by the data source (3, 4, 5, 6, 7 or 8) was in xml format that complied with the entity schema, then the data would not require translation and the session would advanced to a software block (724) that would determine that the metadata associated with the data was in alignment with the entity schema stored in the entity schema table (157). The session would proceed to a software block (732) where any conversions to match the base units of measure, currency or time period specified in the system settings table (162) would be identified before the session advanced to a software block (734) where the location of this data would be mapped to the appropriate context layers and stored in the contextbase (50). Establishing a virtual database in this manner eliminates the latency that can cause problems for real time processing. The virtual database information for the element layer for the subject entity and context elements is stored in the element layer table (141) in the contextbase (50). The virtual database information for the resource layer for the subject entity resources is stored in the resource layer table (143) in the contextbase (50). The virtual database information for the environment layer for the subject entity and context factors is stored in the environment layer table (149) in the contextbase (50). The virtual database information for the transaction layer for the subject entity, context elements, actions and events is stored in the transaction layer table (142) in the contextbase (50). The processing path described in this paragraph is just one of many paths for processing data input.

Figure 10:
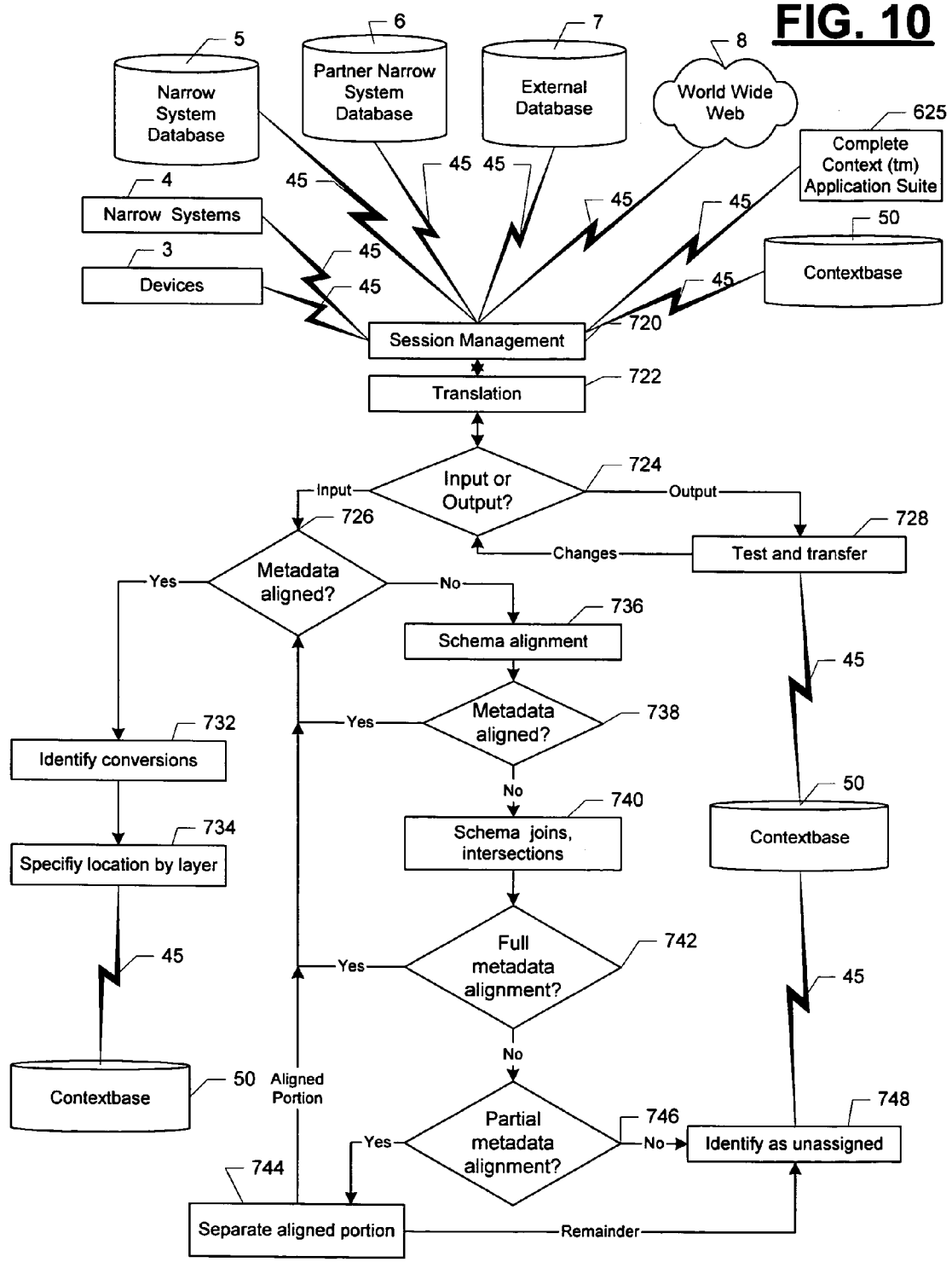
FIG. 10 is a block diagram showing the sequence of processing steps in the present invention used for identifying, receiving and transmitting data with narrow systems (4)

As shown FIG. 10, the system interface (711) has provisions for an alternate data input processing path. This path is used if the data is not in the proper format. In this alternate mode, the data input session would still be managed by the session management software in block (720) that identifies the data source (3, 4, 5, 6, 7 or 8) maintains security and establishes a service level agreement with the data source (3, 4, 5, 6, 7 or 8). The session would proceed to the translation software block (722) where the data from one or more data sources (5, 6, 7 or 8) requires translation and optional analysis before proceeding to the next step. The software in block 722 has provisions for translating and parsing audio, image, micro-array, video and unformatted text data formats to xml. The audio, text and video data are prepared as detailed in cross referenced patent Ser. No. 99/999,999. After translation is complete, the session advances to a software block (724) that would determine that the metadata associated with the data was not in alignment with the schema stored in the entity schema table (157). Processing then advances to the software in block 736 which would use a series of schema matching algorithms including key properties, similarity, global namespace, value pattern and value range algorithms to align the input data schema with the entity schema schema. Processing, then advances to a software block 738 where the metadata associated with the data is compared with the schema stored in the entity schema table (157). If the metadata is aligned, then processing is completed using the path described previously. Alternatively, if the metadata is still not aligned, then processing advances to a software block 740 where joins and intersections between the two schemas are completed. Processing advances then advances to a software block 742 where the results of these operations are compared with the schema stored in the entity schema table (157). If the metadata from one of these operations is aligned, then processing is completed using the path described previously. Alternatively, if the metadata is still not aligned, then processing advances to a software block 742 where the schemas are checked for partial alignment. If there is partial alignment, then processing advances to a software block 744. Alternatively, if there is no alignment, then processing advances to a software block 748 where the data is tagged for manual review and stored in the unassigned data table (146). The software in block 744 cleaves the data as required to separate the portion that is in alignment from the portion that is not in alignment. The portion of the data that is not in alignment is forwarded to software block 748 where it is tagged for manual alignment and stored in the unassigned data table (146). The portion of the data that is in alignment is processed using the path described previously.

After system interface (711) processing is completed for all available data from the sources (3 and 4), databases (5, 6 and 7) and the World Wide Web (8), processing advances to a software block 206 where the software in block 206 optionally prompts the system interface (711) to communicate via a network (45) with the Complete Context™ Input System (601). The system interface uses the path described previously for data input to map the identified data to the appropriate context layers and store the mapping information in the contextbase (50) as described previously. After storage of the Complete Context™ Input System (601) related information is complete, processing advances to a software block 207.

The software in block 207 prompts the user (40) via the review data window (703) to optionally review the context layer data that has been stored in the first few steps of processing. The user (40) has the option of changing the data on a one time basis or permanently. Any changes the user (40) makes are stored in the table for the corresponding context layer (i.e. transaction layer changes are saved in the transaction layer table (142), etc.). As part of the processing in this block, an interactive GEL algorithm prompts the user (40) via the review data window (703) to check the hierarchy or group assignment of any new elements, factors and resources that have been identified. Any newly defined categories are stored in the relationship layer table (144) and the entity schema table (157) in the contextbase (50) before processing advances to a software block 208.

The software in block 208 prompts the user (40) via the requirement data window (710) to optionally identify requirements for the subject entity. Requirements can take a variety of forms but the two most common types of requirements are absolute and relative. For example, a requirement that the level of cash should never drop below $50,000 is an absolute requirement while a requirement that there should never be less than two months of cash on hand is a relative requirement. The user (40) also has the option of specifying requirements as a subject entity function later in this stage of processing. Examples of different requirements are shown in Table 17.

TABLE 17

| Entity | Requirement (reason) |
| --- | --- |
| Individual (1401) | Stop working at 67 |
|  | Keep blood pressure below 155/95 |
|  | Available funds > $X by Jan. 1, 2014 |
| Government | Foreign currency reserves > $X (IMF requirement) |
| Organization (1607) | 3 functional divisions on standby (defense) |
|  | Pension assets > liabilities (legal) |
| Circulatory System (2304) | Cholesterol level between 120 and 180 |
|  | Pressure between 110/75 and 150/100 |

The software in this block provides the ability to specify absolute requirements, relative requirements and standard "requirements" for any reporting format that is defined for use by the Complete Context™ Review System (i.e. Basel II, FASB earnings, etc.). After requirements are specified, they are stored in the requirement table (159) in the contextbase (50) by entity before processing advances to a software block 211.

The software in block 211 checks the unassigned data table (146) in the contextbase (50) to see if there is any data that has not been assigned to an entity and/or context layer. If there is no data without a complete assignment (entity and element, resource, factor or transaction context layer constitutes a complete assignment), then processing advances to a software block 214. Alternatively, if there are data without an assignment, then processing advances to a software block 212. The software in block 212 prompts the user (40) via the identification and classification data window (705) to identify the context layer and entity assignment for the data in the unassigned data table (146). After assignments have been specified for every data element, the resulting assignments are stored in the appropriate context layer tables in the contextbase (50) by entity before processing advances to a software block 214.

The software in block 214 checks the element layer table (141), the transaction layer table (142) and the resource layer table (143) and the environment layer table (149) in the contextbase (50) to see if data is missing for any required time period. If data is not missing for any required time period, then processing advances to a software block 218. Alternatively, if data for one or more of the required time periods identified in the system settings table (162) for one or more items is missing from one or more context layers, then processing advances to a software block 216. The software in block 216 prompts the user (40) via the review data window (703) to specify the procedure that will be used for generating values for the items that are missing data by time period.

Options the user (40) can choose at this point include: the average value for the item over the entire time period, the average value for the item over a specified time period, zero or the average of the preceding item and the following item values and direct user input for each missing value. If the user (40) does not provide input within a specified interval, then the default missing data procedure specified in the system settings table (162) is used. When the missing time periods have been filled and stored for all the items that were missing data, then system processing advances to a block 218.

The software in block 218 retrieves data from the element layer table (141), the transaction layer table (142) and the resource layer table (143) and the environment layer table (149). It uses this data to calculate pre-defined indicators for the data associated with each element, resource and environmental factor. The indicators calculated in this step are comprised of comparisons, regulatory measures and statistics. Comparisons and statistics are derived for: appearance, description, numeric, shape, shape/time and time characteristics. These comparisons and statistics are developed for different types of data as shown below in Table 18.

TABLE 18

| Characteristic/Data type | Appearance | Description | Numeric | Shape | Shape-Time | Time |
|---|---|---|---|---|---|---|
| audio | | X | X | | | X |
| coordinate | | X | X | X | X | X |
| image | X | | X | X | X | X |
| text | | X | X | | | X |
| transaction | | | X | | | X |
| video | X | | X | X | X | X |

X = comparisons and statistics are developed for these characteristic/data type combinations Numeric characteristics are pre-assigned to different domains. Numeric characteristics include amperage, area, density, depth, distance, hardness, height, hops, impedance, level, nodes, quantity, rate, resistance, speed, tensile strength, voltage, volume, weight and combinations thereof. Time characteristics include frequency measures, gap measures (i.e. time since last occurrence, average time between occurrences, etc.) and combinations thereof. The numeric and time characteristics are also combined to calculate additional indicators. Comparisons include: comparisons to baseline (can be binary, 1 if above, 0 if below), comparisons to external expectations, comparisons to forecasts, comparisons to goals, comparisons to historical trends, comparisons to known bad, comparisons to known good, life cycle comparisons, comparisons to normal, comparisons to peers, comparisons to regulations, comparison to requirements, comparisons to a standard, sequence comparisons, comparisons to a threshold (can be binary, 1 if above, 0 if below) and combinations thereof. Statistics include: averages (mean, median and mode), convexity, copulas, correlation, covariance, derivatives, slopes, trends and variability. Time lagged versions of each piece of data, each statistic, each comparison are also developed. The numbers derived from these calculations are collectively referred to as "indicators" (also known as item performance indicators and factor performance indicators). The software in block 218 also calculates pre-specified mathematical and/or logical combinations of variables called composite variables (also known as composite factors when associated with environmental factors). The indicators and the composite variables are tagged and stored in the appropriate context layer table—the element layer table (141), the resource layer table (143) or the environment layer table (149) before processing advances to a software block 220.

The software in block 220 uses attribute derivation algorithms such as the AQ program to create combinations of variables from the element layer table (141), the transaction layer table (142) and the resource layer table (143) and the environment layer table (149) that were not pre-specified for combination in the prior processing step. While the AQ program is used in an embodiment of the present invention, other attribute derivation algorithms, such as the LINUS algorithms, may be used to the same effect. The resulting composite variables are tagged and stored in the element layer table (141), the resource layer table (143) or the environment layer table (149) before processing advances to a software block 222.

The software in block 222 checks the bot date table (163) and deactivates pattern bots with creation dates before the current system date and retrieves information from the system settings table (162), the element layer table (141), the transaction layer table (142), the resource layer table (143) and the environment layer table (149). The software in block 222 then initializes pattern bots for each layer to identify patterns in each layer. Bots are independent components of the application software of the present invention that complete specific tasks. In the case of pattern bots, their tasks are to identify patterns in the data associated with each context layer. In one embodiment, pattern bots use Apriori algorithms identify patterns including frequent patterns, sequential patterns and multi-dimensional patterns. However, a number of other pattern identification algorithms including the sliding window algorithm; beam-search, frequent pattern growth, decision trees and the PASCAL algorithm can be used alone or in combination to the same effect. Every pattern bot contains the information shown in Table 19.

TABLE 19

1. Unique ID number (based on date, hour, minute, second of creation)
2. Creation date (date, hour, minute, second)
3. Storage location
4. Entity Type(s)
5. Entity
6. Context Layer
7. Algorithm After being initialized, the bots identify patterns for the data associated with elements, resources, factors and combinations thereof. Each pattern is given a unique identifier and the frequency and type of each pattern is determined. The numeric values associated with the patterns are indicators. The values are stored in the appropriate context layer table before processing advances to a software block 224.

The software in block 224 uses causal association algorithms including LCD, CC and CU to identify causal associations between indicators, composite variables, element data, factor data, resource data and events, actions, processes and measures. The identified associations are stored in the causal link table (148) for possible addition to the relationship layer table (144) before processing advances to a software block 226.

The software in block 226 prompts the user (40) via the review data window (703) to review the associations stored in the causal link table (148). Associations that have already been specified or approved by the user (40) will not be displayed. The user (40) has the option of accepting or rejecting each identified association. Any associations the user (40)

accepts are stored in the relationship layer table (144) before processing advances a software block 242.

The software in block 242 checks the measure layer table (145) in the contextbase (50) to determine if there are current models for all measures for every entity. If all measure models are current, then processing advances to a software block 301. Alternatively, if all measure models are not current, then the next measure for the next entity is selected and processing advances to a software block 244.

The software in block 244 checks the bot date table (163) and deactivates event risk bots with creation dates before the current system date. The software in the block then retrieves the information from the transaction layer table (142), the relationship layer table (144), the event risk table (156), the entity schema table (157) and the system settings table (162) as required to initialize event risk bots for the subject entity in accordance with the frequency specified by the user (40) in the system settings table (162). Bots are independent components of the application software that complete specific tasks. In the case of event risk bots, their primary tasks are to forecast the frequency and magnitude of events that are associated with negative measure performance in the relationship layer table (144). In addition to forecasting risks that are traditionally covered by insurance such as fires, floods, earthquakes and accidents, the system of the present invention also uses the data to forecast standard, "non-insured" event risks such as the risk of employee resignation and the risk of customer defection. The system of the present invention uses a tournament forecasting method for event risk frequency and duration. The mapping information from the relationship layer is used to identify the elements, factors, resources and/or actions that will be affected by each event. Other forecasting methods can be used to the same effect. Every event risk bot contains the information shown in Table 20.

TABLE 20

1. Unique ID number (based on date, hour, minute, second of creation)
2. Creation date (date, hour, minute, second)
3. Mapping information
4. Storage location
5. Hierarchy of Group
6. Entity
7. Event (fire, flood, earthquake, tornado, accident, defection, etc.)

After the event risk bots are initialized they activate in accordance with the frequency specified by the user (40) in the system settings table (162). After being activated the bots retrieve the required data and forecast the frequency and measure impact of the event risks. The resulting forecasts are stored in the event risk table (156) before processing advances to a software block 246.

The software in block 246 checks the bot date table (163) and deactivates extreme risk bots with creation dates before the current system date. The software in block 246 then retrieves the information from the transaction layer table (142), the relationship layer table (144), the event risk table (156), the entity schema table (157) and the system settings table (162) as required to initialize extreme risk bots in accordance with the frequency specified by the user (40) in the system settings table (162). Bots are independent components of the application software that complete specific tasks. In the case of extreme risk bots, their primary task is to forecast the probability of extreme events for events that are associated with negative measure performance in the relationship layer table (144). The extreme risks bots use the Blocks method and the peak over threshold method to forecast extreme risk magnitude and frequency. Other extreme risk algorithms can be used to the same effect. The mapping information is then used to identify the elements, factors, resources and/or actions that will be affected by each extreme risk. Every extreme risk bot activated in this block contains the information shown in Table 21.

TABLE 21

1. Unique ID number (based on date, hour, minute, second of creation)
2. Creation date (date, hour, minute, second)
3. Mapping information
4. Storage location
5. Hierarchy of Group
6. Entity
7. Method: blocks or peak over threshold
8. Event (fire, flood, earthquake, tornado, accident, defection, etc.)

After the extreme risk bots are initialized, they activate in accordance with the frequency specified by the user (40) in the system settings table (162). Once activated, they retrieve the required information, forecast extreme event risks and map the impacts to the different elements, factors, resources and/or actions. The extreme event risk information is stored in the event risk table (156) in the contextbase (50) before processing advances to a software block 248.

The software in block 248 checks the bot date table (163) and deactivates competitor risk bots with creation dates before the current system date. The software in block 248 then retrieves the information from the transaction layer table (142), the relationship layer table (144), the event risk table (156), the entity schema table (157) and the system settings table (162) as required to initialize competitor risk bots in accordance with the frequency specified by the user (40) in the system settings table (162). Bots are independent components of the application software that complete specific tasks. In the case of competitor risk bots, their primary task is to identify the probability of competitor actions and/or events that events that are associated with negative measure performance in the relationship layer table (144). The competitor risk bots use game theoretic real option models to forecast competitor risks. Other risk forecasting algorithms can be used to the same effect. The mapping information is then used to identify the elements, factors, resources and/or actions that will be affected by each customer risk. Every competitor risk bot activated in this block contains the information shown in Table 122

TABLE 22

1. Unique ID number (based on date, hour, minute, second of creation)
2. Creation date (date, hour, minute, second)
3. Mapping information
4. Storage location
5. Entity Type(s)
6. Entity
7. Competitor After the competitor risk bots are initialized, they retrieve the required information and forecast the frequency and magnitude of competitor risks. The bots save the competitor risk information in the event risk table (156) in the contextbase (50) and processing advances to a block 250.

The software in block 250 retrieves data from the event risk table (156) and the entity schema table (157) before using a measures data window (704) to display a table showing the distribution of risk impacts by element, factor, resource and action. After the review of the table is complete, the software in block 250 prompts the manager (41) via the measures data window (704) to specify one or more measures for the subject entity. Measures are quantitative indications of subject entity behavior or performance. The primary types of behavior are production, destruction and maintenance. As discussed previously, the manager (41) is given the option of using pre-defined measures or creating new measures using terms defined in the entity schema table (157). The measures can combine performance and risk measures or the performance and risk measures can be kept separate. If more than one measure is defined for the subject entity, then the manager (41) is prompted to assign a weighting or relative priority to the different measures that have been defined. As system processing advances, the assigned priorities can be compared to the priorities that entity actions indicate are most important. The priorities used to guide analysis can be the stated priorities, the inferred priorities or some combination thereof. The gap between stated priorities and actual priorities is a congruence indicator that can be used in analyzing performance.

After the specification of measures and priorities has been completed, the values of each of the newly defined measures are calculated using historical data and forecast data. If forecast data is not available, then the Complete Context™ Forecast application (603) is used to supply the missing values. These values are then stored in the measure layer table (145) along with the measure definitions and priorities. When data storage is complete, processing advances to a software block 252.

The software in block 252 checks the bot date table (163) and deactivates forecast update bots with creation dates before the current system date. The software in block 252 then retrieves the information from the system settings table (162) and environment layer table (149) as required to initialize forecast bots in accordance with the frequency specified by the user (40) in the system settings table (162). Bots are independent components of the application software of the present invention that complete specific tasks. In the case of forecast update bots, their task is to compare the forecasts for context factors and with the information available from futures exchanges (including idea markets) and update the existing forecasts as required. This function is generally only required when the system is not run continuously. Every forecast update bot activated in this block contains the information shown in Table 23.

TABLE 23

1. Unique ID number (based on date, hour, minute, second of creation)
2. Creation date (date, hour, minute, second)
3. Mapping information
4. Storage location
5. Entity Type(s)
6. Entity
7. Context factor
8. Measure
9. Forecast time period After the forecast update bots are initialized, they activate in accordance with the frequency specified by the user (40) in the system settings table (162). Once activated, they retrieve the required information and determine if any forecasts need to be updated to bring them in line with the market data. The bots save the updated forecasts in the environment layer table (149) by entity and processing advances to a software block 254.

The software in block 254 checks the bot date table (163) and deactivates scenario bots with creation dates before the current system date. The software in block 254 then retrieves the information from the system settings table (162), the element layer table (141), the transaction layer table (142), the resource layer table (143), the relationship layer table (144), the environment layer table (149), the event risk table (156) and the entity schema table (157) as required to initialize scenario bots in accordance with the frequency specified by the user (40) in the system settings table (162).

Bots are independent components of the application software of the present invention that complete specific tasks. In the case of scenario bots, their primary task is to identify likely scenarios for the evolution of the elements, factors, resources and event risks by entity. The scenario bots use the statistics calculated in block 218 together with the layer information retrieved from the contextbase (50) to develop forecasts for the evolution of the elements, factors, resources, events and actions under normal conditions, extreme conditions and a blended extreme-normal scenario. Every scenario bot activated in this block contains the information shown in Table 24.

TABLE 24

1. Unique ID number (based on date, hour, minute, second of creation)
2. Creation date (date, hour, minute, second)
3. Mapping information
4. Storage location
5. Type: normal, extreme or blended
6. Entity Type(s)
7. Entity
8. Measure After the scenario bots are initialized, they activate in accordance with the frequency specified by the user (40) in the system settings table (162). Once activated, they retrieve the required information and develop a variety of scenarios as described previously. After the scenario bots complete their calculations, they save the resulting scenarios in the scenario table (168) by entity in the contextbase (50) and processing advances to a block 301.

Contextbase Development

The flow diagrams in FIG. 7A, FIG. 7B, FIG. 7C, FIG. 7D, FIG. 7E, FIG. 7F, FIG. 7G and FIG. 7H detail the processing that is completed by the portion of the application software (300) that continually develops a function measure oriented contextbase (50) by creating and activating analysis bots that:

1. Supplement the relationship layer (144) information developed previously by identifying relationships between the elements, factors, resources, events, actions and one or more measures;
2. Complete the measure layer (145) by developing robust models of the elements, factors, resources, events and/or actions driving measure performance;
3. Develop robust models of the elements, factors, resources and events driving action and/or event occurrence rates and impact levels;
4. Analyze measures for the subject entity hierarchy as required to evaluate alignment and adjust measures as required to achieve alignment in an automated fashion; and
5. Determine the relationship between function measures and subject entity performance.

Each analysis bot generally normalizes the data being analyzed before processing begins. As discussed previously, processing in this embodiment includes an analysis of all measures and alternative architectures include a web and/or grid service architecture can be used. The system of the present invention can combine any number of measures as required to evaluate the performance of any entity in the seventeen hierarchies described previously.

Before discussing this stage of processing in more detail, it will be helpful to review the processing already completed. As discussed previously, we are interested developing knowledge regarding the behavior of a subject entity. We will develop this knowledge by developing a detailed understanding of the impact of elements, environmental factors, resources, reference position, events and actions on one or more subject entity function measures. Some of the elements and resources may have been grouped together to complete processes (a special class of element). The first stage of processing reviewed the data from some or all of the narrow systems (4) listed in Table 4, 5, 6 and 7 and the devices (3) listed in Table 8 and established a layered contextbase (50) that formalized the understanding of the identity and description of the elements, factors, resources, events and transactions that impact subject entity function measure performance. The layered contextbase (50) also ensures ready access to the required data for the second and third stages of computation in the entity centric computer system (100). In the second stage of processing we will use the contextbase (50) to develop an understanding of the relative impact of the different elements, factors, resources, events and transactions on subject entity measures.

Because processes rely on elements and resources to produce actions, the user (40) is given the choice between a process view and an element view for measure analysis to avoid double counting. If the user (40) chooses the element approach, then the process impact can be obtained by allocating element and resource impacts to the processes. Alternatively, if the user (40) chooses the process approach, then the process impacts can be divided by element and resource.

Processing in this portion of the application begins in software block 301. The software in block 301 checks the measure layer table (145) in the contextbase (50) to determine if there are current models for all measures for every entity. Measures that are integrated to combine the performance and risk measures into an overall measure are considered two measures for purposes of this evaluation. If all measure models are current, then processing advances to a software block 322. Alternatively, if all measure models are not current, then processing advances to a software block 303.

The software in block 303 retrieves the previously calculated values for the next measure from the measure layer table (145) before processing advances to a software block 304. The software in block 304 checks the bot date table (163) and deactivates temporal clustering bots with creation dates before the current system date. The software in block 304 then initializes bots in accordance with the frequency specified by the user (40) in the system settings table (162). The bots retrieve information from the measure layer table (145) for the entity being analyzed and defines regimes for the measure being analyzed before saving the resulting cluster information in the relationship layer table (144) in the contextbase (50). Bots are independent components of the application software of the present invention that complete specific tasks. In the case of temporal clustering bots, their primary task is to segment measure performance into distinct time regimes that share similar characteristics. The temporal clustering bot assigns a unique identification (id) number to each "regime" it identifies before tagging and storing the unique id numbers in the relationship layer table (144). Every time period with data are assigned to one of the regimes. The cluster id for each regime is associated with the measure and entity being analyzed. The time regimes are developed using a competitive regression algorithm that identifies an overall, global model before splitting the data and creating new models for the data in each partition. If the error from the two models is greater than the error from the global model, then there is only one regime in the data. Alternatively, if the two models produce lower error than the global model, then a third model is created. If the error from three models is lower than from two models then a fourth model is added. The processing continues until adding a new model does not improve accuracy. Other temporal clustering algorithms may be used to the same effect. Every temporal clustering bot contains the information shown in Table 25.

TABLE 25

1. Unique ID number (based on date, hour, minute, second of creation)
2. Creation date (date, hour, minute, second)
3. Mapping information
4. Storage location
5. Maximum number of clusters
6. Entity Type(s)
7. Entity
8. Measure When bots in block 304 have identified and stored regime assignments for all time periods with measure data for the current entity, processing advances to a software block 305.

The software in block 305 checks the bot date table (163) and deactivates variable clustering bots with creation dates before the current system date. The software in block 305 then initializes bots as required for each element, resource and factor for the current entity. The bots activate in accordance with the frequency specified by the user (40) in the system settings table (162), retrieve the information from the element layer table (141), the transaction layer table (142), the resource layer table (143), the environment layer table (149) and the entity schema table (157) as required and define segments for element, resource and factor data before tagging and saving the resulting cluster information in the relationship layer table (144).

Bots are independent components of the application software of the present invention that complete specific tasks. In the case of variable clustering bots, their primary task is to segment the element, resource and factor data—including performance indicators—into distinct clusters that share similar characteristics. The clustering bot assigns a unique id number to each "cluster" it identifies, tags and stores the unique id numbers in the relationship layer table (144). Every item variable for each element, resource and factor is assigned to one of the unique clusters. The element data, resource data and factor data are segmented into a number of clusters less than or equal to the maximum specified by the user (40) in the system settings table (162). The data are segmented using several clustering algorithms including: an unsupervised "Kohonen" neural network, decision tree, support vector method, K-nearest neighbor, expectation maximization (EM) and the segmental K-means algorithm. For algorithms that normally require the number of clusters to be specified, the bot will use the maximum number of clusters specified by the user (40). Every variable clustering bot contains the information shown in Table 26.

TABLE 26

| | |
|---|---|
| 1. | Unique ID number (based on date, hour, minute, second of creation) |
| 2. | Creation date (date, hour, minute, second) |
| 3. | Mapping information |
| 4. | Storage location |
| 5. | Element, factor or resource |
| 6. | Clustering algorithm type |
| 7. | Entity Type(s) |
| 8. | Entity |
| 9. | Measure |
| 10. | Maximum number of clusters |
| 11. | Variable 1 |
| ... to | |
| 11 + n. | Variable n |

When bots in block 305 have identified, tagged and stored cluster assignments for the data associated with every element, resource and factor in the relationship layer table (144), processing advances to a software block 307.

The software in block 307 checks the measure layer table (145) in the contextbase (50) to see if the current measure is an options based measure like contingent liabilities, real options or competitor risk. If the current measure is not an options based measure, then processing advances to a software block 309. Alternatively, if the current measure is an options based measure, then processing advances to a software block 308.

The software in block 308 checks the bot date table (163) and deactivates option bots with creation dates before the current system date. The software in block 308 then retrieves the information from the system settings table (162), the entity schema table (157) and the element layer table (141), the transaction layer table (142), the resource layer table (143), the relationship layer table (144), the environment layer table (149) and the scenarios table (168) as required to initialize option bots in accordance with the frequency specified by the user (40) in the system settings table (162).

Bots are independent components of the application software of the present invention that complete specific tasks. In the case of option bots, their primary task is to determine the impact of each element, resource and factor on the entity option measure under different scenarios. The option simulation bots run a normal scenario, an extreme scenario and a combined scenario with and without clusters. In one embodiment, Monte Carlo models are used to complete the probabilistic simulation, however other option models including binomial models, multinomial models and dynamic programming can be used to the same effect. The element, resource and factor impacts on option measures could be determined using the processed detailed below for the other types of measures, however, in the embodiment being described herein a separate procedure is used. Every option bot activated in this block contains the information shown in Table 27.

TABLE 27

1. Unique ID number (based on date, hour, minute, second of creation)
2. Creation date (date, hour, minute, second)
3. Mapping information
4. Storage location
5. Scenario: normal, extreme or combined
6. Option type: real option, contingent liability or competitor risk
7. Entity Type(s)
8. Entity
9. Measure TABLE 27-continued 10. Clustered data? (Yes or No)
11. Algorithm After the option bots are initialized, they activate in accordance with the frequency specified by the user (40) in the system settings table (162). Once activated, the bots retrieve the required information and simulate the measure over the time periods specified by the user (40) in the system settings table (162) as required to determine the impact of each element, resource and factor on the option. After the option bots complete their calculations, the impacts and sensitivities for the option (clustered data—yes or no) that produced the best result under each scenario are saved in the measure layer table (145) in the contextbase (50) and processing returns to software block 301.

If the current measure was not an option measure, then processing advanced to software block 309. The software in block 309 checks the bot date table (163) and deactivates all predictive model bots with creation dates before the current system date. The software in block 309 then retrieves the information from the system settings table (162), the entity schema table (157) and the element layer table (141), the transaction layer table (142), the resource layer table (143), the relationship layer table (144) and the environment layer table (149) as required to initialize predictive model bots for each measure layer.

Bots are independent components of the application software that complete specific tasks. In the case of predictive model bots, their primary task is to determine the relationship between the indicators and the one or more measures being evaluated. Predictive model bots are initialized for each cluster and regime of data in accordance with the cluster and regime assignments specified by the bots in blocks 304 and 305. A series of predictive model bots is initialized at this stage because it is impossible to know in advance which predictive model type will produce the "best" predictive model for the data from each entity. The series for each model includes: neural network; CART; GARCH, projection pursuit regression; stepwise regression, logistic regression, probit regression, factor analysis, growth modeling, linear regression; redundant regression network; boosted Naive Bayes Regression; support vector method, markov models, kriging, multivalent models, relevance vector method, MARS, rough-set analysis and generalized additive model (GAM). Other types predictive models can be used to the same effect. Every predictive model bot contains the information shown in Table 28.

TABLE 28

1. Unique ID number (based on date, hour, minute, second of creation)
2. Creation date (date, hour, minute, second)
3. Mapping information
4. Storage location
5. Entity Type(s)
6. Entity
7. Measure
8. Type: Cluster (ID), Regime (ID), Cluster (ID) & Regime (ID)
9. Predictive model type After predictive model bots are initialized, the bots activate in accordance with the frequency specified by the user (40) in the system settings table (162). Once activated, the bots retrieve the required data from the appropriate table in the contextbase (50) and randomly partition the element, resource or factor data into a training set and a test set. The software in block 309 uses "bootstrapping" where the different training data sets are created by re-sampling with replacement from the original training set so data records may occur more than once. Training with genetic algorithms can also be used. After the predictive model bots complete their training and testing, the best fit predictive model assessments of element, resource and factor impacts on measure performance are saved in the measure layer table (145) before processing advances to a block 310.

The software in block 310 determines if clustering improved the accuracy of the predictive models generated by the bots in software block 309 by entity. The software in block 310 uses a variable selection algorithm such as stepwise regression (other types of variable selection algorithms can be used) to combine the results from the predictive model bot analyses for each type of analysis—with and without clustering—to determine the best set of variables for each type of analysis. The type of analysis having the smallest amount of error as measured by applying the root mean squared error algorithm to the test data are given preference in determining the best set of variables for use in later analysis. Other error algorithms including entropy measures may also be used. There are four possible outcomes from this analysis as shown in Table 29.

TABLE 29

1. Best model has no clustering
2. Best model has temporal clustering, no variable clustering
3. Best model has variable clustering, no temporal clustering
4. Best model has temporal clustering and variable clustering If the software in block 310 determines that clustering improves the accuracy of the predictive models for an entity, then processing advances to a software block 314. Alternatively, if clustering does not improve the overall accuracy of the predictive models for an entity, then processing advances to a software block 312.

The software in block 312 uses a variable selection algorithm such as stepwise regression (other types of variable selection algorithms can be used) to combine the results from the predictive model bot analyses for each model to determine the best set of variables for each model. The models having the smallest amount of error, as measured by applying the root mean squared error algorithm to the test data, are given preference in determining the best set of variables. Other error algorithms including entropy measures may also be used. As a result of this processing, the best set of variables contain the: variables (aka element, resource and factor data), indicators and composite variables that correlate most strongly with changes in the measure being analyzed. The best set of variables will hereinafter be referred to as the "performance drivers".

Eliminating low correlation factors from the initial configuration of the vector creation algorithms increases the efficiency of the next stage of system processing. Other error algorithms including entropy measures may be substituted for the root mean squared error algorithm. After the best set of variables have been selected, tagged and stored in the relationship layer table (144) for each entity, the software in block 312 tests the independence of the performance drivers for each entity before processing advances to a block 313.

The software in block 313 checks the bot date table (163) and deactivates causal predictive model bots with creation dates before the current system date. The software in block 313 then retrieves the information from the system settings table (162), the entity schema table (157) and the element layer table (141), the transaction layer table (142), the resource layer table (143), the relationship layer table (144) and the environment layer table (149) as required to initialize causal predictive model bots for each element, resource and factor in accordance with the frequency specified by the user (40) in the system settings table (162). Sub-context elements, resources and factors may be used in the same manner.

Bots are independent components of the application software that complete specific tasks. In the case of causal predictive model bots, their primary task is to refine the performance driver selection to reflect only causal variables. A series of causal predictive model bots are initialized at this stage because it is impossible to know in advance which causal predictive model will produce the "best" vector for the best fit variables from each model. The series for each model includes six causal predictive model bot types: Tetrad, MML, LaGrange, Bayesian, Probabilistic Relational Model (if allowed) and path analysis. The Bayesian bots in this step also refine the estimates of element, resource and/or factor impact developed by the predictive model bots in a prior processing step by assigning a probability to the impact estimate. The software in block 313 generates this series of causal predictive model bots for each set of performance drivers stored in the relationship layer table (144) in the previous stage in processing. Every causal predictive model bot activated in this block contains the information shown in Table 30.

TABLE 30

1. Unique ID number (based on date, hour, minute, second of creation)
2. Creation date (date, hour, minute, second)
3. Mapping information
4. Storage location
5. Causal predictive model type
6. Entity Type(s)
7. Entity
8. Measure After the causal predictive model bots are initialized by the software in block 313, the bots activate in accordance with the frequency specified by the user (40) in the system settings table (162). Once activated, they retrieve the required information for each model and sub-divide the variables into two sets, one for training and one for testing. After the causal predictive model bots complete their processing for each model, the software in block 313 uses a model selection algorithm to identify the model that best fits the data. For the system of the present invention, a cross validation algorithm is used for model selection. The software in block 313 then saves the refined impact estimates in the measure layer table (145) and the best fit causal element, resource and/or factor indicators are identified in the relationship layer table (144) in the contextbase (50) before processing returns to software block 301.

If software in block 310 determines that clustering improves predictive model accuracy, then processing advances directly to block 314 as described previously. The software in block 314 uses a variable selection algorithm such as stepwise regression (other types of variable selection algorithms can be used) to combine the results from the predictive model bot analyses for each model, cluster and/or regime to determine the best set of variables for each model. The models having the smallest amount of error as measured by applying the root mean squared error algorithm to the test data are given preference in determining the best set of variables. Other error algorithms including entropy measures may also be used. As a result of this processing, the best set of variables contains: the element data and factor data that correlate most strongly with changes in the function measure. The best set of variables will hereinafter be referred to as the "performance drivers". Eliminating low correlation factors from the initial configuration increases the efficiency of the next stage of system processing. Other error algorithms including entropy measures may be substituted for the root mean squared error algorithm. After the best set of variables have been selected, they are tagged as performance drivers and stored in the relationship layer table (144), the software in block 314 tests the independence of the performance drivers before processing advances to a block 315.

The software in block 315 checks the bot date table (163) and deactivates causal predictive model bots with creation dates before the current system date. The software in block 315 then retrieves the information from the system settings table (162), the entity schema table (157) and the element layer table (141), the transaction layer table (142), the resource layer table (143), the relationship layer table (144) and the environment layer table (149) as required to initialize causal predictive model bots in accordance with the frequency specified by the user (40) in the system settings table (162). Bots are independent components of the application software of the present invention that complete specific tasks. In the case of causal predictive model bots, their primary task is to refine the element, resource and factor performance driver selection to reflect only causal variables. (Note: these variables are grouped together to represent a single element vector when they are dependent). In some cases it may be possible to skip the correlation step before selecting causal item variables, factor variables, indicators, and composite variables. A series of causal predictive model bots are initialized at this stage because it is impossible to know in advance which causal predictive model will produce the "best" vector for the best fit variables from each model. The series for each model includes: Tetrad, LaGrange, Bayesian, Probabilistic Relational Model and path analysis. The Bayesian bots in this step also refine the estimates of element or factor impact developed by the predictive model bots in a prior processing step by assigning a probability to the impact estimate. The software in block 315 generates this series of causal predictive model bots for each set of performance drivers stored in the entity schema table (157) in the previous stage in processing. Every causal predictive model bot activated in this block contains the information shown in Table 31.

TABLE 31

1. Unique ID number (based on date, hour, minute, second of creation)
2. Creation date (date, hour, minute, second)
3. Mapping information
4. Storage location
5. Type: Cluster (ID), Regime (ID), Cluster (ID) & Regime (ID)
5. Entity Type(s)
6. Entity
7. Measure
8. Causal predictive model type After the causal predictive model bots are initialized by the software in block 315, the bots activate in accordance with the frequency specified by the user (40) in the system settings table (162). Once activated, they retrieve the required information for each model and sub-divide the variables into two sets, one for training and one for testing. The same set of training data are used by each of the different types of bots for each model. After the causal predictive model bots complete their processing for each model, the software in block 315 uses a model selection algorithm to identify the model that best fits the data for each element, resource and factor being analyzed by model and/or regime by entity. For the system of the present invention, a cross validation algorithm is used for model selection. The software in block 315 saves the refined impact estimates in the measure layer table (145) and identifies the best fit causal element, resource and/or factor indicators in the relationship layer table (144) in the contextbase (50) before processing returns to software block 301.

When the software in block 301 determines that all measure models are current, then processing advances to a software block 322. The software in block 322 checks the measure layer table (145) and the event model table (158) in the contextbase (50) to determine if all event models are current. If all event models are current, then processing advances to a software block 332. Alternatively, if new event models need to be developed, then processing advances to a software block 325. The software in block 325 retrieves information from the system settings table (162), the entity schema table (157) and the element layer table (141), the transaction layer table (142), the resource layer table (143), the relationship layer table (144), the environment layer table (149) and the event model table (158) as required to complete summaries of event history and forecasts before processing advances to a software block 304 where the processing sequence described above (save for the option bot processing)—is used to identify drivers for event frequency. After all event frequency models have been developed they are stored in the event model table (158), processing advances to a software block 332.

The software in block 332 checks the measure layer table (145) and impact model table (166) in the contextbase (50) to determine if impact models are current for all event risks and transactions. If all impact models are current, then processing advances to a software block 341. Alternatively, if new impact models need to be developed, then processing advances to a software block 335. The software in block 335 retrieves information from the system settings table (162), the entity schema table (157) and the element layer table (141), the transaction layer table (142), the resource layer table (143), the relationship layer table (144), the environment layer table (149) and the impact model table (166) as required to complete summaries of impact history and forecasts before processing advances to a software block 304 where the processing sequence described above—save for the option bot processing—is used to identify drivers for event and action impact (or magnitude). After impact models have been developed for all event risks and transaction impacts they are stored in the impact model table (166) and processing advances to a software block 341.

If a spatial coordinate system is being used, then processing advances to a block 341 before processing begins. The software in block 341 checks the measure layer table (145) in the contextbase (50) to determine if there are current models for all measures for every entity level. If all measure models are current, then processing advances to a software block 350. Alternatively, if all measure models are not current, then processing advances to a software block 303. The software in block 303 retrieves the previously calculated values for the measure from the measure layer table (145) before processing advances to software block 304.

The software in block 304 checks the bot date table (163) and deactivates temporal clustering bots with creation dates before the current system date. The software in block 304 then initializes bots in accordance with the frequency specified by the user (40) in the system settings table (162). The bots retrieve information from the measure layer table (145) for the entity being analyzed and defines regimes for the measure being analyzed before saving the resulting cluster information in the relationship layer table (144) in the contextbase (50). Bots are independent components of the application software of the present invention that complete specific tasks. In the case of temporal clustering bots, their primary task is to segment measure performance into distinct time regimes that share similar characteristics. The temporal clustering bot assigns a unique identification (id) number to each "regime" it identifies before tagging and storing the unique id numbers in the relationship layer table (144). Every time period with data are assigned to one of the regimes. The cluster id for each regime is associated with the measure and entity being analyzed. The time regimes are developed using a competitive regression algorithm that identifies an overall, global model before splitting the data and creating new models for the data in each partition. If the error from the two models is greater than the error from the global model, then there is only one regime in the data. Alternatively, if the two models produce lower error than the global model, then a third model is created. If the error from three models is lower than from two models then a fourth model is added. The processing continues until adding a new model does not improve accuracy. Other temporal clustering algorithms may be used to the same effect. Every temporal clustering bot contains the information shown in Table 32.

TABLE 32

1. Unique ID number (based on date, hour, minute, second of creation)
2. Creation date (date, hour, minute, second)
3. Mapping information
4. Storage location
5. Maximum number of clusters
6. Entity Type(s)
7. Entity
8. Measure When bots in block 304 have identified and stored regime assignments for all time periods with measure data for the current entity, processing advances to a software block 305.

The software in block 305 checks the bot date table (163) and deactivates variable clustering bots with creation dates before the current system date. The software in block 305 then initializes bots as required for each context element, resource and factor for the current entity level. The bots activate in accordance with the frequency specified by the user (40) in the system settings table (162), retrieve the information from the element layer table (141), the transaction layer table (142), the resource layer table (143), the environment layer table (149) and the entity schema table (157) as required and define segments for context element, resource and factor data before tagging and saving the resulting cluster information in the relationship layer table (144). Bots are independent components of the application software of the present invention that complete specific tasks. In the case of variable clustering bots, their primary task is to segment the element, resource and factor data—including indicators—into distinct clusters that share similar characteristics. The clustering bot assigns a unique id number to each "cluster" it identifies, tags and stores the unique id numbers in the relationship layer table (144). Every variable for every context element, resource and factor is assigned to one of the unique clusters. The element data, resource data and factor data are segmented into a number of clusters less than or equal to the maximum specified by the user (40) in the system settings table (162). The data are segmented using several clustering algorithms including: an unsupervised "Kohonen" neural network, decision tree, support vector method, K-nearest neighbor, expectation maximization (EM) and the segmental K-means algorithm. For algorithms that normally require the number of clusters to be specified, the bot will use the maximum number of clusters specified by the user (40). Every variable clustering bot contains the information shown in Table 33.

TABLE 33

1. Unique ID number (based on date, hour, minute, second of creation)
2. Creation date (date, hour, minute, second)
3. Mapping information
4. Storage location
5. Context element, resource or factor
6. Clustering algorithm
7. Entity Type(s)
8. Entity
9. Measure
10. Maximum number of clusters
11. Variable 1
... to
11 + n. Variable n When bots in block 305 have identified, tagged and stored cluster assignments for the data associated with every element, resource and factor in the relationship layer table (144), processing advances to a software block 343.

The software in block 343 checks the bot date table (163) and deactivates spatial clustering bots with creation dates before the current system date. The software in block 343 then retrieves the information from the system settings table (162), the entity schema table (157) and the element layer table (141), the transaction layer table (142), the resource layer table (143), the relationship layer table (144), the environment layer table (149), the spatial reference layer (154) and the scenarios table (168) as required to initialize spatial clustering bots in accordance with the frequency specified by the user (40) in the system settings table (162). Bots are independent components of the application software that complete specific tasks. In the case of spatial clustering bots, their primary task is to segment the element, resource and factor data—including performance indicators—into distinct clusters that share similar characteristics. The clustering bot assigns a unique id number to each "cluster" it identifies, tags and stores the unique id numbers in the relationship layer table (144). Data for each context element, resource and factor is assigned to one of the unique clusters. The element, resource and factor data are segmented into a number of clusters less than or equal to the maximum specified by the user (40) in the system settings table (162). The system of the present invention uses several spatial clustering algorithms including: hierarchical clustering, cluster detection, k-ary clustering, variance to mean ratio, lacunarity analysis, pair correlation, join correlation, mark correlation, fractal dimension, wavelet, nearest neighbor, local index of spatial association (LISA), spatial analysis by distance indices (SADIE), mantel test and circumcircle. Every spatial clustering bot activated in this block contains the information shown in Table 34.

TABLE 34

1. Unique ID number (based on date, hour, minute, second of creation)
2. Creation date (date, hour, minute, second)
3. Mapping information
4. Storage location
5. Element, resource or factor
6. Clustering algorithm TABLE 34-continued 7. Entity Type(s)
8. Entity
9. Measure
10. Maximum number of clusters
11. Variable 1
... to
11 + n. Variable n When bots in block 343 have identified, tagged and stored cluster assignments for the data associated with every element, resource and factor in the relationship layer table (144), processing advances to a software block 307.

The software in block 307 checks the measure layer table (145) in the contextbase (50) to see if the current measure is an options based measure like contingent liabilities, real options or competitor risk. If the current measure is not an options based measure, then processing advances to a software block 309. Alternatively, if the current measure is an options based measure, then processing advances to a software block 308.

The software in block 308 checks the bot date table (163) and deactivates option bots with creation dates before the current system date. The software in block 308 then retrieves the information from the system settings table (162), the entity schema table (157) and the element layer table (141), the transaction layer table (142), the resource layer table (143), the relationship layer table (144), the environment layer table (149), the spatial reference layer (154) and the scenarios table (168) as required to initialize option bots in accordance with the frequency specified by the user (40) in the system settings table (162).

bots are independent components of the application software of the present invention that complete specific tasks. In the case of option bots, their primary task is to determine the impact of each element, resource and factor on the entity option measure under different scenarios. The option simulation bots run a normal scenario, an extreme scenario and a combined scenario with and without clusters. In one embodiment, Monte Carlo models are used to complete the probabilistic simulation, however other option models including binomial models, multinomial models and dynamic programming can be used to the same effect. The element, resource and factor impacts on option measures could be determined using the processed detailed below for the other types of measures, however, in this embodiment a separate procedure is used. The models are initialized with specifications used in the baseline calculations. Every option bot activated in this block contains the information shown in Table 35.

TABLE 35

1. Unique ID number (based on date, hour, minute, second of creation)
2. Creation date (date, hour, minute, second)
3. Mapping information
4. Storage location
5. Scenario: normal, extreme or combined
6. Option type: real option, contingent liability or competitor risk
7. Entity Type(s)
8. Entity
9. Measure
10. Clustered data? (Yes or No)
11. Algorithm After the option bots are initialized, they activate in accordance with the frequency specified by the user (40) in the system settings table (162). Once activated, the bots retrieve the required information and simulate the measure over the time periods specified by the user (40) in the system settings table (162) as required to determine the impact of each element, resource and factor on the option. After the option bots complete their calculations, the impacts and sensitivities for the option (clustered data—yes or no) that produced the best result under each scenario are saved in the measure layer table (145) in the contextbase (50) and processing returns to software block 341.

If the current measure was not an option measure, then processing advanced to software block 309. The software in block 309 checks the bot date table (163) and deactivates all predictive model bots with creation dates before the current system date. The software in block 309 then retrieves the information from the system settings table (162), the entity schema table (157) and the element layer table (141), the transaction layer table (142), the resource layer table (143), the relationship layer table (144), the environment layer table (149) and the spatial reference layer (154) as required to initialize predictive model bots for the measure being evaluated.

Bots are independent components of the application software that complete specific tasks. In the case of predictive model bots, their primary task is to determine the relationship between the indicators and the measure being evaluated. Predictive model bots are initialized for each cluster of data in accordance with the cluster and regime assignments specified by the bots in blocks 304, 305 and 343. A series of predictive model bots is initialized at this stage because it is impossible to know in advance which predictive model type will produce the "best" predictive model for the data from each entity. The series for each model includes: neural network; CART; GARCH, projection pursuit regression; stepwise regression, logistic regression, probit regression, factor analysis, growth modeling, linear regression; redundant regression network; boosted naive bayes regression; support vector method, markov models, rough-set analysis, kriging, simulated annealing, latent class models, gaussian mixture models, triangulated probability and kernel estimation. Each model includes spatial autocorrelation indicators as performance indicators. Other types predictive models can be used to the same effect. Every predictive model bot contains the information shown in Table 36.

TABLE 36

1. Unique ID number (based on date, hour, minute, second of creation)
2. Creation date (date, hour, minute, second)
3. Mapping information
4. Storage location
5. Entity Type(s)
6. Entity
7. Measure
8. Type: variable (y or n), spatial (y or n), spatial-temporal (y or n)
9. Predictive model type After predictive model bots are initialized, the bots activate in accordance with the frequency specified by the user (40) in the system settings table (162). Once activated, the bots retrieve the required data from the appropriate table in the contextbase (50) and randomly partition the element, resource and/or factor data into a training set and a test set. The software in block 309 uses "bootstrapping" where the different training data sets are created by re-sampling with replacement from the original training set so data records may occur more than once. Training with genetic algorithms can also be used. After the predictive model bots complete their training and testing, the best fit predictive model assessments of element, resource and factor impacts on measure performance are saved in the measure layer table (145) before processing advances to a block 345.

The software in block 345 determines if clustering improved the accuracy of the predictive models generated by the bots in software block 344. The software in block 345 uses a variable selection algorithm such as stepwise regression (other types of variable selection algorithms can be used) to combine the results from the predictive model bot analyses for each type of analysis—with and without clustering—to determine the best set of variables for each type of analysis. The type of analysis having the smallest amount of error as measured by applying the root mean squared error algorithm to the test data are given preference in determining the best set of variables for use in later analysis. Other error algorithms including entropy measures may also be used. There are eight possible outcomes from this analysis as shown in Table 37.

TABLE 37

| | |
|---|---|
| 1. | Best model has no clustering |
| 2. | Best model has temporal clustering, no variable clustering, no spatial clustering |
| 3. | Best model has variable clustering, no temporal clustering, no spatial clustering |
| 4. | Best model has temporal clustering, variable clustering, no spatial clustering |
| 5. | Best model has no temporal clustering, no variable clustering, spatial clustering |
| 6. | Best model has temporal clustering, no variable clustering, spatial clustering |
| 7. | Best model has variable clustering, no temporal clustering, spatial clustering |
| 8. | Best model has temporal clustering, variable clustering, spatial clustering |

If the software in block 345 determines that clustering improves the accuracy of the predictive models for an entity, then processing advances to a software block 348. Alternatively, if clustering does not improve the overall accuracy of the predictive models for an entity, then processing advances to a software block 346.

The software in block 346 uses a variable selection algorithm such as stepwise regression (other types of variable selection algorithms can be used) to combine the results from the predictive model bot analyses for each model to determine the best set of variables for each model. The models having the smallest amount of error, as measured by applying the root mean squared error algorithm to the test data, are given preference in determining the best set of variables. Other error algorithms including entropy measures may also be used. As a result of this processing, the best set of variables contain the: variables (aka element, resource and factor data), indicators, and composite variables that correlate most strongly with changes in the measure being analyzed. The best set of variables will hereinafter be referred to as the "performance drivers".

Eliminating low correlation factors from the initial configuration of the vector creation algorithms increases the efficiency of the next stage of system processing. Other error algorithms including entropy measures may be substituted for the root mean squared error algorithm. After the best set of variables have been selected, tagged and stored in the relationship layer table (144) for each entity level, the software in block 346 tests the independence of the performance drivers for each entity level before processing advances to a block 347.

The software in block 347 checks the bot date table (163) and deactivates causal predictive model bots with creation dates before the current system date. The software in block 347 then retrieves the information from the system settings table (162), the entity schema table (157) and the element layer table (141), the transaction layer table (142), the resource layer table (143), the relationship layer table (144) and the environment layer table (149) as required to initialize causal predictive model bots for each element, resource and factor in accordance with the frequency specified by the user (40) in the system settings table (162). Sub-context elements, resources and factors may be used in the same manner.

Bots are independent components of the application software that complete specific tasks. In the case of causal predictive model bots, their primary task is to refine the performance driver selection to reflect only causal variables. A series of causal predictive model bots are initialized at this stage because it is impossible to know in advance which causal predictive model will produce the "best" fit for variables from each model. The series for each model includes six causal predictive model bot types: kriging, latent class models, gaussian mixture models, kernel estimation and Markov-Bayes. The software in block 347 generates this series of causal predictive model bots for each set of performance drivers stored in the relationship layer table (144) in the previous stage in processing. Every causal predictive model bot activated in this block contains the information shown in Table 38.

TABLE 38

| | |
|---|---|
| 1. | Unique ID number (based on date, hour, minute, second of creation) |
| 2. | Creation date (date, hour, minute, second) |
| 3. | Mapping information |
| 4. | Storage location |
| 5. | Causal predictive model type |
| 6. | Entity Type(s) |
| 7. | Entity |
| 8. | Measure |

After the causal predictive model bots are initialized by the software in block 347, the bots activate in accordance with the frequency specified by the user (40) in the system settings table (162). Once activated, they retrieve the required information for each model and sub-divide the variables into two sets, one for training and one for testing. After the causal predictive model bots complete their processing for each model, the software in block 347 uses a model selection algorithm to identify the model that best fits the data. For the system of the present invention, a cross validation algorithm is used for model selection. The software in block 347 then saves the refined impact estimates in the measure layer table (145) and the best fit causal element, resource and/or factor indicators are identified in the relationship layer table (144) in the contextbase (50) before processing returns to software block 301.

If software in block 345 determines that clustering improves predictive model accuracy, then processing advances directly to block 348 as described previously. The software in block 348 uses a variable selection algorithm such as stepwise regression (other types of variable selection algorithms can be used) to combine the results from the predictive model bot analyses for each model, cluster and/or regime to determine the best set of variables for each model. The models having the smallest amount of error as measured by applying the root mean squared error algorithm to the test data are given preference in determining the best set of variables. Other error algorithms including entropy measures can also be used. As a result of this processing, the best set of variables contains: the element data, resource data and factor data that correlate most strongly with changes in the function measures. The best set of variables will hereinafter be referred to as the "performance drivers". Eliminating low correlation factors from the initial configuration of the vector creation algorithms increases the efficiency of the next stage of system processing. Other error algorithms including entropy measures may be substituted for the root mean squared error algorithm. After the best set of variables have been selected, they are tagged as performance drivers and stored in the relationship layer table (144), the software in block 348 tests the independence of the performance drivers before processing advances to a block 349.

The software in block 349 checks the bot date table (163) and deactivates causal predictive model bots with creation dates before the current system date. The software in block 349 then retrieves the information from the system settings table (162), the entity schema table (157) and the element layer table (141), the transaction layer table (142), the resource layer table (143), the relationship layer table (144) and the environment layer table (149) as required to initialize causal predictive model bots in accordance with the frequency specified by the user (40) in the system settings table (162). bots are independent components of the application software of the present invention that complete specific tasks. In the case of causal predictive model bots, their primary task is to refine the element, resource and factor performance driver selection to reflect only causal variables. (Note: these variables are grouped together to represent a single vector when they are dependent). In some cases it may be possible to skip the correlation step before selecting causal the item variables, factor variables, indicators and composite variables. A series of causal predictive model bots are initialized at this stage because it is impossible to know in advance which causal predictive model will produce the "best" fit variables for each measure. The series for each measure includes six causal predictive model bot types: kriging, latent class models, gaussian mixture models, kernel estimation and Markov-Bayes. The software in block 349 generates this series of causal predictive model bots for each set of performance drivers stored in the entity schema table (157) in the previous stage in processing. Every causal predictive model bot activated in this block contains the information shown in Table 39.

TABLE 39

1. Unique ID number (based on date, hour, minute, second of creation)
2. Creation date (date, hour, minute, second)
3. Mapping information
4. Storage location
5. Type: Cluster (ID), Regime (ID), Cluster (ID) & Regime (ID)
6. Entity Type(s)
7. Entity
8. Measure
9. Causal predictive model type After the causal predictive model bots are initialized by the software in block 349, the bots activate in accordance with the frequency specified by the user (40) in the system settings table (162). Once activated, they retrieve the required information for each model and sub-divide the variables into two sets, one for training and one for testing. The same set of training data are used by each of the different types of bots for each model. After the causal predictive model bots complete their processing for each model, the software in block 349 uses a model selection algorithm to identify the model that best fits the data for each process, element, resource and/or factor being analyzed by model and/or regime by entity. For the system of the present invention, a cross validation algorithm is used for model selection. The software in block 349 saves the refined impact estimates in the measure layer table (145) and identifies the best fit causal element, resource and/or factor indicators in the relationship layer table (144) in the contextbase (50) before processing returns to software block 341.

When the software in block 341 determines that all measure models are current processing advances to a software block 351. The software in block 351 checks the measure layer table (145) and the event model table (158) in the contextbase (50) to determine if all event models are current. If all event models are current, then processing advances to a software block 361. Alternatively, if new event models need to be developed, then processing advances to a software block 325. The software in block 325 retrieves information from the system settings table (162), the entity schema table (157) and the element layer table (141), the transaction layer table (142), the resource layer table (143), the relationship layer table (144), the environment layer table (149), the spatial reference table (154) and the event model table (158) as required to complete summaries of event history and forecasts before processing advances to a software block 304 where the processing sequence described above—save for the option bot processing—is used to identify drivers for event risk and transaction frequency. After all event frequency models have been developed they are stored in the event model table (158) and processing advances to software block 361.

The software in block 361 checks the measure layer table (145) and impact model table (166) in the contextbase (50) to determine if impact models are current for all event risks and actions. If all impact models are current, then processing advances to a software block 370. Alternatively, if new impact models need to be developed, then processing advances to a software block 335. The software in block 335 retrieves information from the system settings table (162), the entity schema table (157) and the element layer table (141), the transaction layer table (142), the resource layer table (143), the relationship layer table (144), the environment layer table (149)), the spatial reference table (154) and the impact model table (166) as required to complete summaries of impact history and forecasts before processing advances to a software block 304 where the processing sequence described above—save for the option bot processing—is used to identify drivers for event risk and transaction impact (or magnitude). After impact models have been developed for all event risks and action impacts they are stored in the impact model table (166) and processing advances to software block 370.

The software in block 370 determines if adding spatial data improves the accuracy of the predictive models. The software in block 370 uses a variable selection algorithm such as stepwise regression (other types of variable selection algorithms can be used) to combine the results from each type of prior analysis—with and without spatial data—to determine the best set of variables for each type of analysis. The type of analysis having the smallest amount of error as measured by applying the root mean squared error algorithm to the test data are used for subsequent later analysis. Other error algorithms including entropy measures may also be used. There are eight possible outcomes from this analysis as shown in Table 40.

TABLE 40

1. Best measure, event and impact models are spatial
2. Best measure and event models are spatial, best impact model is not spatial
3. Best measure and impact models are spatial, best event model is not spatial TABLE 40-continued

| | |
|---|---|
| 5. | Best measure models are spatial, best event and impact models are not spatial |
| 5. | Best measure models are not spatial, best event and impact models are spatial |
| 6. | Best measure and impact models are not spatial, best event model is spatial |
| 7. | Best measure and event models are not spatial, best impact model is spatial |
| 8. | Best measure, event and impact models are not spatial |

The best set of models identified by the software in block 370 are tagged for use in subsequent processing before processing advances to a software block 371.

The software in block 371 checks the measure layer table (145) in the contextbase (50) to determine if probabilistic relational models were used in measure impacts. If probabilistic relational models were used, then processing advances to a software block 377. Alternatively, if probabilistic relational models were not used, then processing advances to a software block 372.

The software in block 372 tests the performance drivers to see if there is interaction between elements, factors and/or resources by entity. The software in this block identifies interaction by evaluating a chosen model based on stochastic-driven pairs of value-driver subsets. If the accuracy of such a model is higher that the accuracy of statistically combined models trained on attribute subsets, then the attributes from subsets are considered to be interacting and then they form an interacting set. Other tests of driver interaction can be used to the same effect. The software in block 372 also tests the performance drivers to see if there are "missing" performance drivers that are influencing the results. If the software in block 372 does not detect any performance driver interaction or missing variables for each entity, then system processing advances to a block 376. Alternatively, if missing data or performance driver interactions across elements, factors and/or resources are detected by the software in block 372 for one or more measure processing advances to a software block 373.

The software in block 373 evaluates the interaction between performance drivers as required to classify the performance driver set. The performance driver set generally matches one of the six patterns of interaction: a multi-component loop, a feed forward loop, a single input driver, a multi input driver, auto-regulation and a chain. After classifying each performance driver set the software in block 373 prompts the user (40) via the structure revision window (706) to accept the classification and continue processing, establish probabilistic relational models as the primary causal model and/or adjust the specification(s) for the context elements and factors in some other way as required to minimize or eliminate interaction that was identified. For example, the user (40) can also choose to re-assign a performance driver to a new context element or factor to eliminate an identified interdependency. After the optional input from the user (40) is saved in the element layer table (141), the environment layer table (149) and the system settings table (162) processing advances to a software block 374. The software in block 374 checks the element layer table (141), the environment layer table (149) and system settings table (162) to see if there any changes in structure. If there have been changes in the structure, then processing returns to block 201 and the system processing described previously is repeated. Alternatively, if there are no changes in structure, then the information regarding the element interaction is saved in the relationship layer table (144) before processing advances to a block 376.

The software in block 376 checks the bot date table (163) and deactivates vector generation bots with creation dates before the current system date. The software in block 376 then initializes vector generation bots for each context element, sub-context element, element combination, factor combination, context factor and sub-context factor. The bots activate in accordance with the frequency specified by the user (40) in the system settings table (162) and retrieve information from the element layer table (141), the transaction layer table (142), the resource layer table (143), the relationship layer table (144) and the environment layer table (149). Bots are independent components of the application software that complete specific tasks. In the case of vector generation bots, their primary task is to produce vectors that summarize the relationship between the causal performance drivers and changes in the measure being examined. The vector generation bots use induction algorithms to generate the vectors. Other vector generation algorithms can be used to the same effect. Every vector generation bot contains the information shown in Table 41.

TABLE 41

| | |
|---|---|
| 1. | Unique ID number (based on date, hour, minute, second of creation) |
| 2. | Creation date (date, hour, minute, second) |
| 3. | Mapping information |
| 4. | Storage location |
| 5. | Hierarchy of Group |
| 6. | Entity |
| 7. | Measure |
| 8. | Element, sub-element, factor, sub-factor, resource, sub-resource or combination |
| 9. | Factor 1 |
| ...to | |
| 9 + n. | Factor n |

When bots in block 376 have created and stored vectors for all time periods with data for all the elements, sub-elements, factors, sub-factors, resources, sub-resources and combinations that have vectors in the entity schema table (157) by entity, processing advances to a software block 377.

The software in block 377 checks the bot date table (163) and deactivates life bots with creation dates before the current system date. The software in block 377 then retrieves the information from the system settings table (162), the element layer table (141), the transaction layer table (142), the resource layer table (143), the relationship layer table (144) and the environment layer table (149) as required to initialize life bots for each element and factor. Bots are independent components of the application software that complete specific tasks. In the case of life bots, their primary task is to determine the expected life of each element, resource and factor. There are three methods for evaluating the expected life:

1. Elements, resources and factors that are defined by a population of members or items (such as: channel partners, customers, employees and vendors) will have their lives estimated by forecasting the lives of members of the population and then integrating the results into an overall population density matrix. The forecast of member lives will be determined by the "best" fit solution from competing life estimation methods including the Iowa type survivor curves, Weibull distribution survivor curves, growth models, Gompertz-Makeham survivor curves, Bayesian population matrix estimation and polynomial equations using the tournament method for selecting from competing forecasts;

2. Elements, resources and factors (such as patents, long term supply agreements, certain laws and insurance contracts) that have legally defined lives will have their lives calculated using the time period between the current date and the expiration date of their defined life; and 3. Finally, elements, resources and factors that do not have defined lives will have their lives estimated to equal the forecast time period.

Every element life bot contains the information shown in Table 42.

TABLE 42

1. Unique ID number (based on date, hour, minute, second of creation)
2. Creation date (date, hour, minute, second)
3. Mapping information
4. Storage location
5. Hierarchy of Group
6. Entity
7. Measure
8. Element, sub-element, factor, sub-factor, resource, sub-resource or combination
9. Life estimation method (item analysis, defined or forecast period)

After the life bots are initialized, they are activated in accordance with the frequency specified by the user (40) in the system settings table (162). After being activated, the bots retrieve information for each element and sub-context element from the contextbase (50) as required to complete the estimate of element life. The resulting values are then tagged and stored in the element layer table (141), the resource layer table (143) or the environment layer table (149) in the contextbase (50) before processing advances to a block 379.

The software in block 379 checks the bot date table (163) and deactivates dynamic relationship bots with creation dates before the current system date. The software in block 379 then retrieves the information from the system settings table (162), the element layer table (141), the transaction layer table (142), the resource layer table (143), the relationship layer table (144), the environment layer table (149) and the event risk table (156) as required to initialize dynamic relationship bots for the measure bots are independent components of the application software that complete specific tasks. In the case of dynamic relationship bots, their primary task is to identify the best fit dynamic model of the interrelationship between the different elements, factors, resources and events that are driving measure performance. The best fit model is selected from a group of potential linear models and non-linear models including swarm models, complexity models, simple regression models, power law models and fractal models. Every dynamic relationship bot contains the information shown in Table 43.

TABLE 43

1. Unique ID number (based on date, hour, minute, second of creation)
2. Creation date (date, hour, minute, second)
3. Mapping information
4. Storage location
5. Hierarchy of Group
6. Entity
7. Measure
8. Algorithm The bots in block 379 identify the best fit model of the dynamic interrelationship between the elements, factors, resources and risks for the reviewed measure and store information regarding the best fit model in the relationship layer table (144) before processing advances to a software block 380.

The software in block 380 checks the bot date table (163) and deactivates partition bots with creation dates before the current system date. The software in the block then retrieves the information from the system settings table (162), the element layer table (141), the transaction layer table (142), the resource layer table (143), the relationship layer table (144), the measure layer table (145), the environment layer table (149), the event risk table (156) and the scenario table (168) to initialize partition bots in accordance with the frequency specified by the user (40) in the system settings table (162). bots are independent components of the application software of the present invention that complete specific tasks. In the case of partition bots, their primary task is to use the historical and forecast data to segment the performance measure contribution of each element, factor, resource, combination and performance driver into a base value and a variability or risk component. The system of the present invention uses wavelet algorithms to segment the performance contribution into two components although other segmentation algorithms such as GARCH could be used to the same effect. Every partition bot contains the information shown in Table 44.

TABLE 44

1. Unique ID number (based on date, hour, minute, second of creation)
2. Creation date (date, hour, minute, second)
3. Mapping information
4. Storage location
5. Hierarchy of Group
6. Entity
7. Measure
8. Element, factor, resource or combination
9. Segmentation algorithm After the partition bots are initialized, the bots activate in accordance with the frequency specified by the user (40) in the system settings table (162). After being activated the bots retrieve data from the contextbase (50) and then segment the performance contribution of each element, factor, resource or combination into two segments. The resulting values by period for each entity are then stored in the measure layer table (145), before processing advances to a software block 382.

The software in block 382 retrieves the information from the event table (158) and the impact table (166) and combines the information from both tables as required to update the event risk estimate for the entity. The resulting values by period for each entity are then stored in the event risk table (156), before processing advances to a software block 389.

The software in block 389 checks the bot date table (163) and deactivates simulation bots with creation dates before the current system date. The software in block 389 then retrieves the information from the relationship layer table (144), the measure layer table (145), the event risk table (156), the entity schema table (157), the system settings table (162) and the scenario table (168) as required to initialize simulation bots in accordance with the frequency specified by the user (40) in the system settings table (162).

Bots are independent components of the application software that complete specific tasks. In the case of simulation bots, their primary task is to run three different types of simulations of entity measure performance. The simulation bots run probabilistic simulations of measure performance using: the normal scenario, the extreme scenario and the blended scenario. They also run an unconstrained genetic algorithm simulation that evolves to the most negative value possible over the specified time period. In one embodiment, Monte Carlo models are used to complete the probabilistic simulation, however other probabilistic simulation models such as Quasi Monte Carlo, genetic algorithm and Markov Chain Monte Carlo can be used to the same effect. The models are initialized using the statistics and relationships derived from the calculations completed in the prior stages of processing to relate measure performance to the performance driver, element, factor, resource and event risk scenarios. Every simulation bot activated in this block contains the information shown in Table 46.

TABLE 46

1. Unique ID number (based on date, hour, minute, second of creation)
2. Creation date (date, hour, minute, second)
3. Mapping information
4. Storage location
5. Type: normal, extreme, blended or genetic algorithm
6. Measure
7. Hierarchy of Group
8. Entity After the simulation bots are initialized, they activate in accordance with the frequency specified by the user (40) in the system settings table (162). Once activated, they retrieve the required information and simulate measure performance by entity over the time periods specified by the user (40) in the system settings table (162). In doing so, the bots will forecast the range of performance and risk that can be expected for the specified measure by entity within the confidence interval defined by the user (40) in the system settings table (162) for each scenario. The bots also create a summary of the overall risks facing the entity for the current measure. After the simulation bots complete their calculations, the resulting forecasts are saved in the scenario table (168) by entity and the risk summary is saved in the report table (153) in the contextbase (50) before processing advances to a software block 390.

The software in block 390 checks the measure layer table (145) and the system settings table (162) in the contextbase (50) to see if probabilistic relational models were used. If probabilistic relational models were used, then processing advances to a software block 398. Alternatively, if the current calculations did not rely on probabilistic relational models, then processing advances to a software block 391.

The software in block 391 checks the bot date table (163) and deactivates measure bots with creation dates before the current system date. The software in block 391 then retrieves the information from the system settings table (162), the measure layer table (145), the entity schema table (157) as required to initialize bots for each context element, context factor, context resource, combination or performance driver for the measure being analyzed. Bots are independent components of the application software of the present invention that complete specific tasks. In the case of measure bots, their task is to determine the net contribution of the network of elements, factors, resources, events, combinations and performance drivers to the measure being analyzed. The relative contribution of each element, factor, resource, combination and performance driver is determined by using a series of predictive models to find the best fit relationship between the context element vectors, context factor vectors, combination vectors and performance drivers and the measure. The system of the present invention uses different types of predictive models to identify the best fit relationship: neural network; CART; projection pursuit regression; generalized additive model (GAM); GARCH; MMDR; MARS, redundant regression network; boosted Naïve Bayes Regression; relevance vector, hierarchical Bayes, the support vector method; markov; linear regression; and stepwise regression. The model having the smallest amount of error as measured by applying the root mean squared error algorithm to the test data is the best fit model. Other error algorithms and/or uncertainty measures including entropy measures may also be used. The "relative contribution algorithm" used for completing the analysis varies with the model that was selected as the "best-fit". For example, if the "best-fit" model is a neural net model, then the portion of the measure attributable to each input vector is determined by the formula shown in Table 47.

TABLE 47

$$\left(\sum_{k=1}^{k=m}\sum_{j=1}^{j=n} I_{jk} \times O_k \Big/ \sum_{j=1}^{j=n} I_{jk}\right) \Big/ \sum_{k=1}^{k=m}\sum_{j=1}^{j=n} I_{jk} \times O_k$$

Where
$I_{jk}$ = Absolute value of the input weight from input node j to hidden node k
$O_k$ = Absolute value of output weight from hidden node k
M = number of hidden nodes
N = number of input nodes After completing the best fit calculations, the bots review the lives of the context elements that impact measure performance. If one or more of the elements has an expected life that is shorter than the forecast time period stored in the system settings, then a separate model will be developed to reflect the removal of the impact from the element(s) that are expiring. The resulting values for relative context element and context factor contributions to measure performance are and saved in the entity schema table (157) by entity and entity. If the calculations are related to a commercial business then the value of each contribution will be saved. The overall model of measure performance is saved in the measure layer table (145) by entity and entity. Every measure bot contains the information shown in Table 48.

TABLE 48

1. Unique ID number (based on date, hour, minute, second of creation)
2. Creation date (date, hour, minute, second)
3. Mapping information
4. Storage location
5. Hierarchy of Group
6. Entity
7. Measure
8. Element, factor, resource combination or performance driver After the measure bots are initialized by the software in block 366 they activate in accordance with the frequency specified by the user (40) in the system settings table (162). After being activated, the bots retrieve information and complete the analysis of the measure performance. As described previously, the resulting relative contribution percentages are saved in the entity schema table (157) by entity. The overall model of measure performance is saved in the measure layer table (145) by entity before processing advances to a software block 392.

Before continuing the discussion the remaining calculations in this section it is appropriate to briefly review the processing that has been completed in this portion of system (100) processing. At this point, the element layer table (141), transaction layer table (142), resource layer table (143) and environment layer table (149) contain information that defines the administrative status of the entity by element and factor. As detailed above, the relationship layer table (144)

now contains information that identifies the inter-relationship between the different elements, resources, risks and factors that drive measure performance. The measure layer table (145) now contains information that identifies the elements, resources and factors that support measure performance by entity. The measure layer table (145) also contains a summary of the event risks, element risks, resource risks and factor risks that threaten measure performance. The event risks include standard event risks, competitor risks, contingent liabilities and extreme risks while the element, factor and resource risks are primarily variability risks. In short, the contextbase (50) now contains a complete picture of entity function measure performance. In the steps that follow, the contextbase (50) will be updated to support the analysis of entity measure relevance, the alignment of measures for the relevant hierarchy will be evaluated, the efficient frontier for entity measure performance will be defined and the relevant entity ontology will be formalized and stored. The next step in this processing is completed in software block 392.

The software in block 392 checks the measure layer table (145) in the contextbase (50) to determine if all entity measures are current. If all measures are not current, then processing returns to software block 302 and the processing described above for this portion (300) of the application software is repeated. Alternatively, if all measure models are current, then processing advances to a software block 394.

The software in block 394 retrieves the previously stored values for measure performance from the measure layer table (145) before processing advances to a software block 395. The software in block 395 checks the bot date table (163) and deactivates measure relevance bots with creation dates before the current system date. The software in block 395 then retrieves the information from the system settings table (162) and the measure layer table (145) as required to initialize a bot for each entity being analyzed bots are independent components of the application software of the present invention that complete specific tasks. In the case of measure relevance bots, their tasks are to determine the relevance of each of the different measures to entity performance and determine the priority that appears to be placed on each of the different measures is there is more than one. The relevance and ranking of each measure is determined by using a series of predictive models to find the best fit relationship between the measures and entity performance. The system of the present invention uses several different types of predictive models to identify the best fit relationship: neural network; CART; projection pursuit regression; generalized additive model (GAM); GARCH; MMDR; redundant regression network; markov; boosted naive Bayes Regression; the support vector method; linear regression; and stepwise regression. The model having the smallest amount of error as measured by applying the root mean squared error algorithm to the test data is the best fit model. Other error algorithms including entropy measures may also be used. Bayes models are used to define the probability associated with each relevance measure and the Viterbi algorithm is used to identify the most likely contribution of all elements, factors, resources and risks by entity. The relative contributions are saved in the measure layer table (145) by entity. Every measure relevance bot contains the information shown in Table 49.

TABLE 49

1. Unique ID number (based on date, hour, minute, second of creation)
2. Creation date (date, hour, minute, second)
3. Mapping information
4. Storage location TABLE 49-continued 5. Hierarchy of Group
6. Entity
7. Measure After the measure relevance bots are initialized by the software in block 375 they activate in accordance with the frequency specified by the user (40) in the system settings table (162). After being activated, the bots retrieve information and complete the analysis of the measure performance. As described previously, the relative measure contributions to measure performance and the associated probability are saved in the measure layer table (145) by entity before processing advances to a software block 396.

The software in block 396 retrieves information from the measure table (145) and then checks the measures for the entity hierarchy to determine if the different levels are in alignment. As discussed previously, lower level measures that are out of alignment can be identified by the presence of measures from the same level with more impact on entity measure performance. For example, employee training could be shown to be a strong performance driver for the entity. If the human resources department (that is responsible for both training and performance evaluations) was using only a timely performance evaluation measure, then the measures would be out of alignment. If measures are out of alignment, then the software in block 396 prompts the manager (41) via the measure edit data window (708) to change the measures by entity as required to bring them into alignment. Alternatively, if measures by entity are in alignment, then processing advances to a software block 397.

The software in block 397 checks the bot date table (163) and deactivates frontier bots with creation dates before the current system date. The software in block 377 then retrieves information from the event risk table (156), the system settings table (162) and the scenarios table (168) as required to initialize frontier bots for each scenario. Bots are independent components of the application software of the present invention that complete specific tasks. In the case of frontier bots, their primary task is to define the efficient frontier for entity performance measures under each scenario. The top leg of the efficient frontier for each scenario is defined by successively adding the features, options and performance drivers that improve performance while increasing risk to the optimal mix in resource efficiency order. The bottom leg of the efficient frontier for each scenario is defined by successively adding the features, options and performance drivers that decrease performance while decreasing risk to the optimal mix in resource efficiency order. Every frontier bot contains the information shown in Table 50.

TABLE 50

Figure 11:
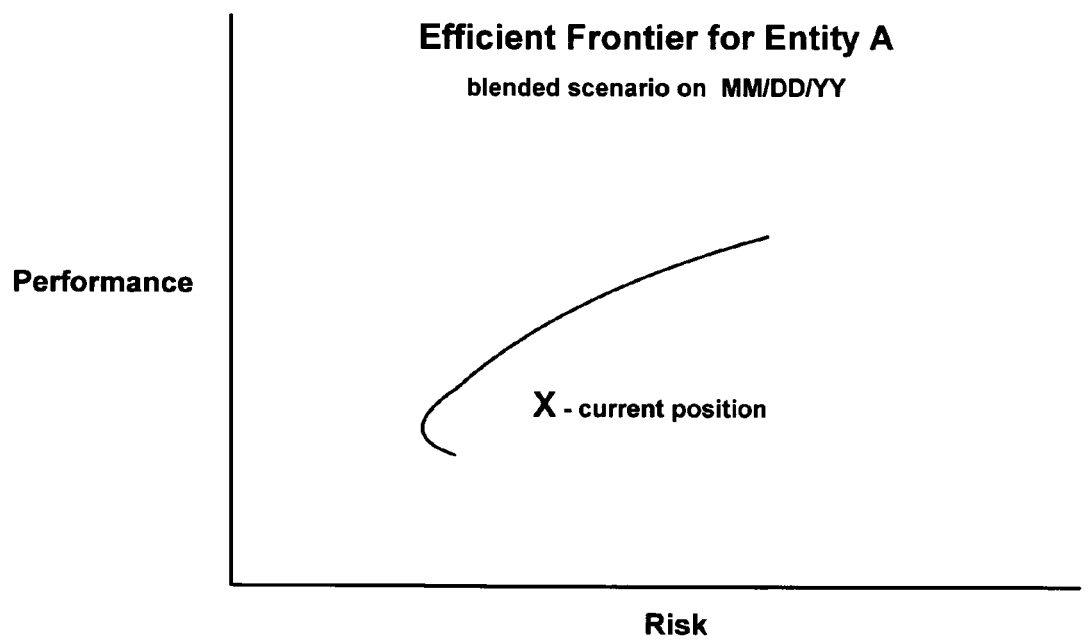
FIG. 11 is a sample report showing the efficient frontier for Entity XYZ and the current position of XYZ relative to the efficient frontier.
Figure 12:
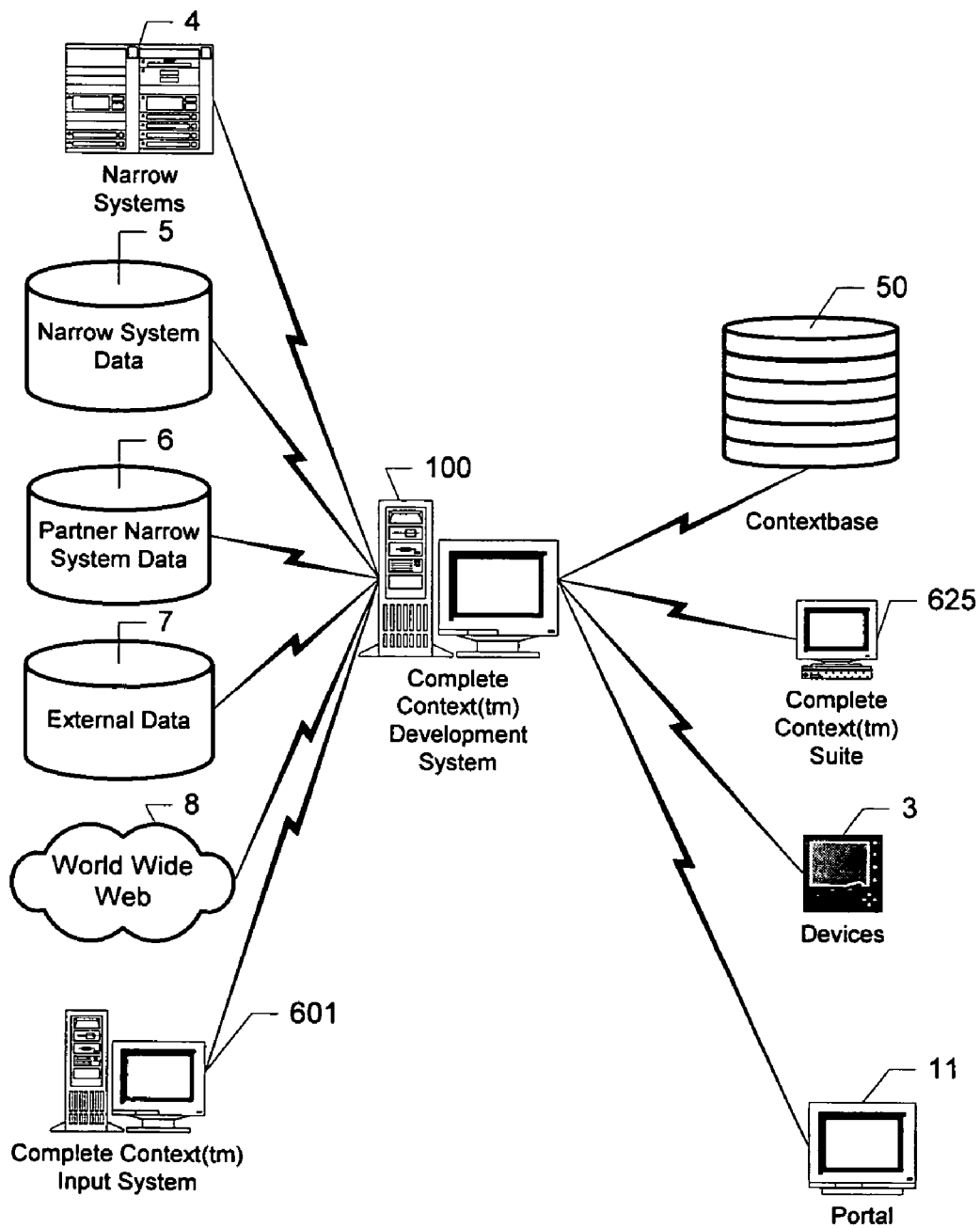
FIG. 12 is a diagram showing one embodiment of the entity centric computer system (100) and the Complete Context™ Suite (625)
Figure 13:
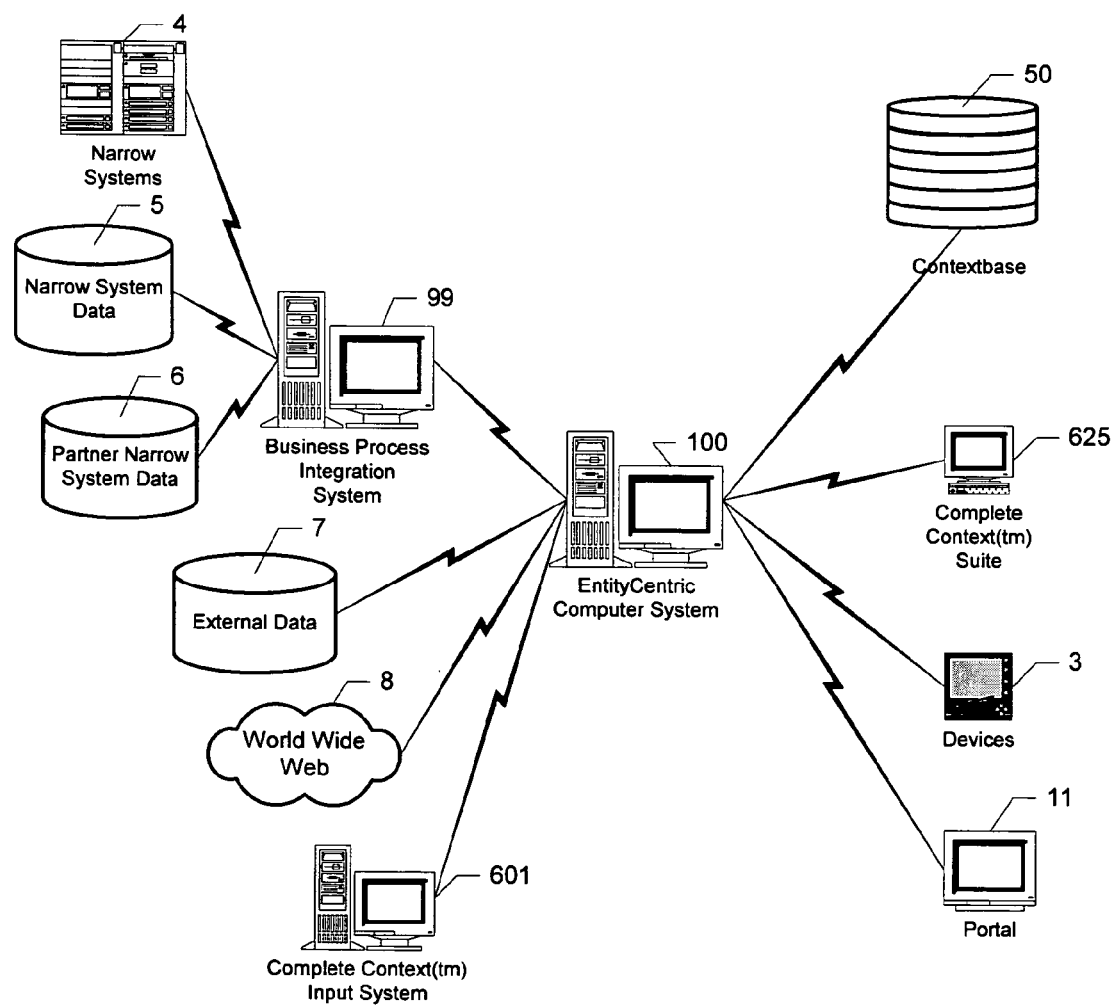
FIG. 13 is a diagram showing how the entity centric computer system (100) can be integrated with a business process integration platform (99) such as an application server.
Figure 14:
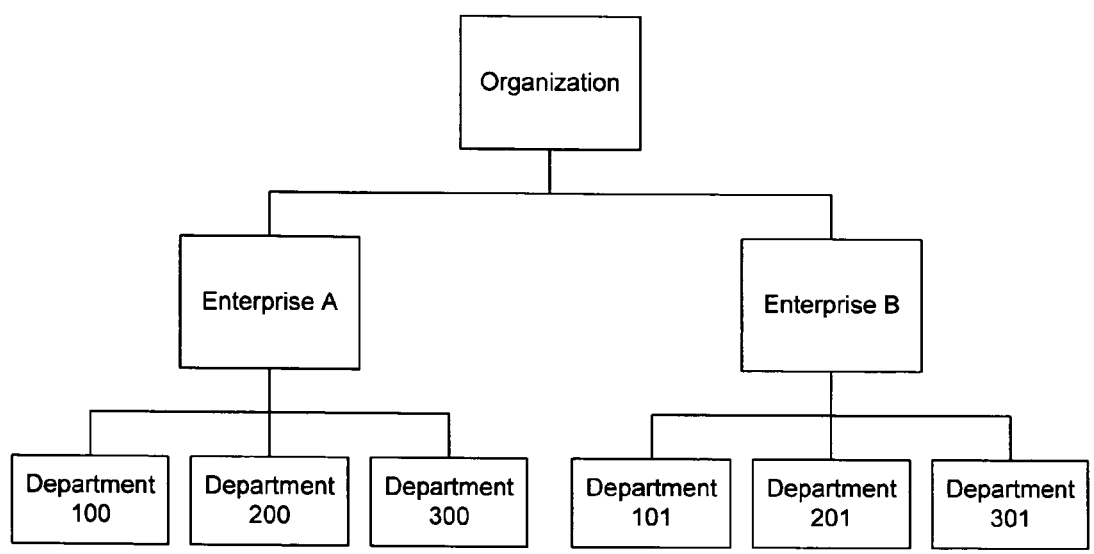
FIG. 14 is a block diagram showing a relationship between different members of a hierarchy.

1. Unique ID number (based on date, hour, minute, second of creation)
2. Creation date (date, hour, minute, second)
3. Mapping information
4. Storage location
5. Entity
6. Scenario: normal, extreme and blended After the software in block 397 initializes the frontier bots, they activate in accordance with the frequency specified by the user (40) in the system settings table (162). After completing their calculations, the results of all 3 sets of calculations (normal, extreme and most likely) are saved in the report table (153) in sufficient detail to generate a chart like the one shown in FIG. 11 before processing advances to a software block 398.

The software in block 398 takes the previously stored entity schema from the entity schema table (157) and combines it with the relationship information in the relationship layer table (144) and the measure layer table (145) to develop the entity ontology. The ontology is then stored in the ontology table (152) using the OWL language. Use of the rdf (resource description framework) based OWL language will enable the communication and synchronization of the entities ontology with other entities and will facilitate the extraction and use of information from the semantic web. After the relevant entity ontology is saved in the contextbase(50), processing advances to a software block 402.

Context Frame Definition

The flow diagrams in FIG. 8A and FIG. 8B detail the processing that is completed by the portion of the application software (400) that identifies valid context space (and principles), generates context frames and optionally displays and prints management reports detailing the measure performance of an entity. Processing in this portion of the application starts in software block 402.

The software in block 402 calculates expected uncertainty by multiplying the user (40) and subject matter expert (42) estimates of narrow system (4) uncertainty by the relative importance of the data from the narrow system for each measure. The expected uncertainty for each measure is expected to be lower than the actual uncertainty (measured using $R^2$ as discussed previously) because total uncertainty is a function of data uncertainty plus parameter uncertainty (i.e. are the specified elements, resources and factors the correct ones) and model uncertainty (does the model accurately reflect the relationship between the data and the measure). After saving the uncertainty information in the uncertainty table (150) processing advances to a software block 403.

The software in block 403 retrieves information from the system settings table (162), the element layer table (141), the transaction layer table (142), the resource layer table (143), the relationship layer table (144), the measure layer table (145), the environment layer table (149), the registration layer table (154), the event risk table (156) and the entity schema table (157) as required to define context frames for every entity specified by the user (40) in the system settings table. The resulting frame definitions are given a unique identification number that identifies the time, data and entity before being stored in the context frame table (160). After storage is complete, processing advances to a software block 410.

The software in block 410 retrieves information from the relationship layer table (144), the measure layer table (145) and the context frame table (160) as required to define the valid context space for the current relationships and measures stored in the contextbase (50). The current measures and relationships are compared to previously stored context frames to determine the range of contexts in which they are valid with the confidence interval specified by the user (40) in the system settings table (162). The resulting list of valid frame definitions stored in the context space table (151). The software in this block also completes a stepwise elimination of each user specified constraint. This analysis helps determine the sensitivity of the results and may indicate that it would be desirable to use some resources to relax one or more of the established constrains. The results of this analysis is stored in the context space table (151) before processing advances to a software block 410.

Figure 2A:
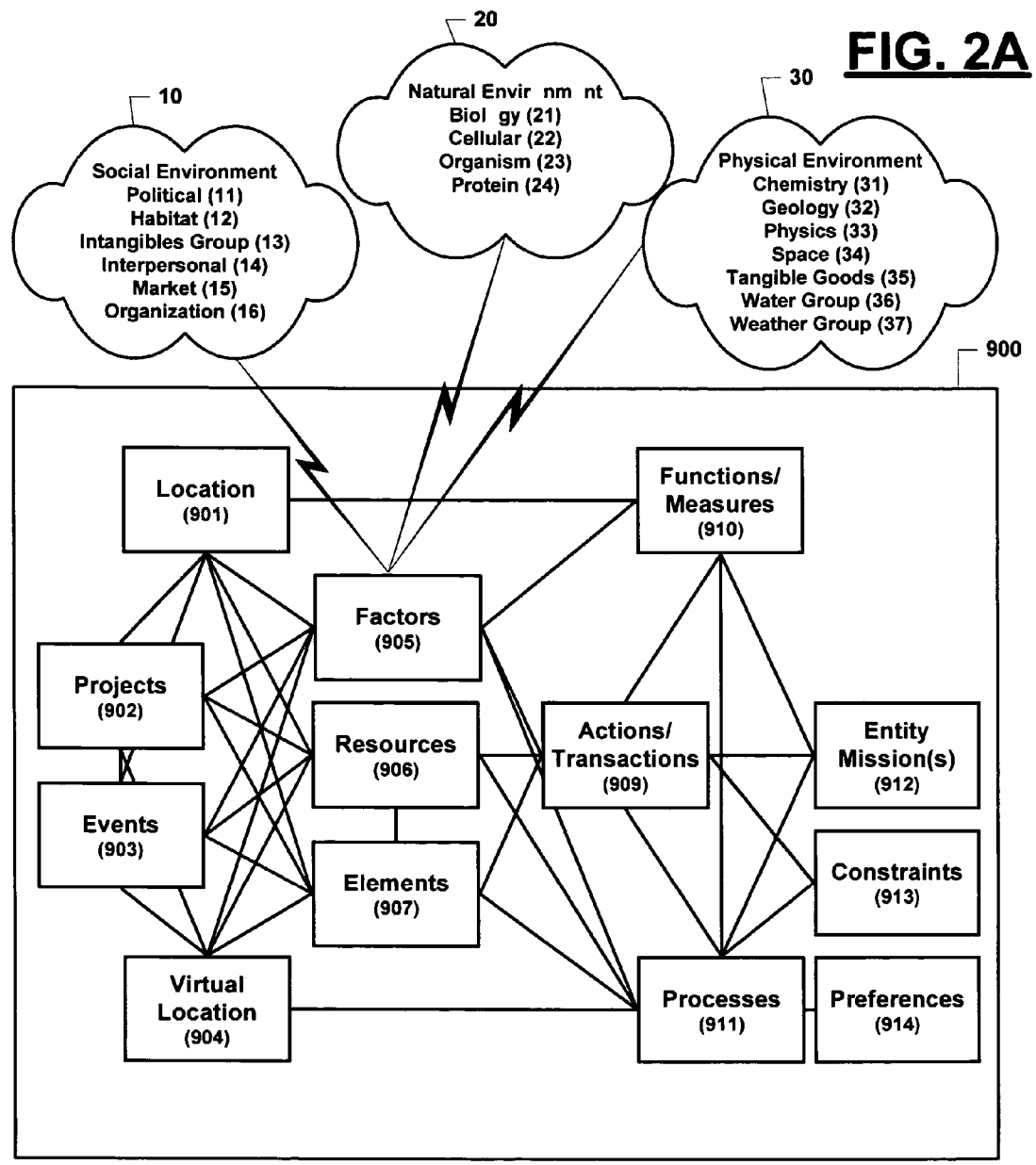
FIG. 2A and FIG. 2B are block diagrams showing a relationship of elements, events, factors, processes and subject entity measures.
Figure 2B:
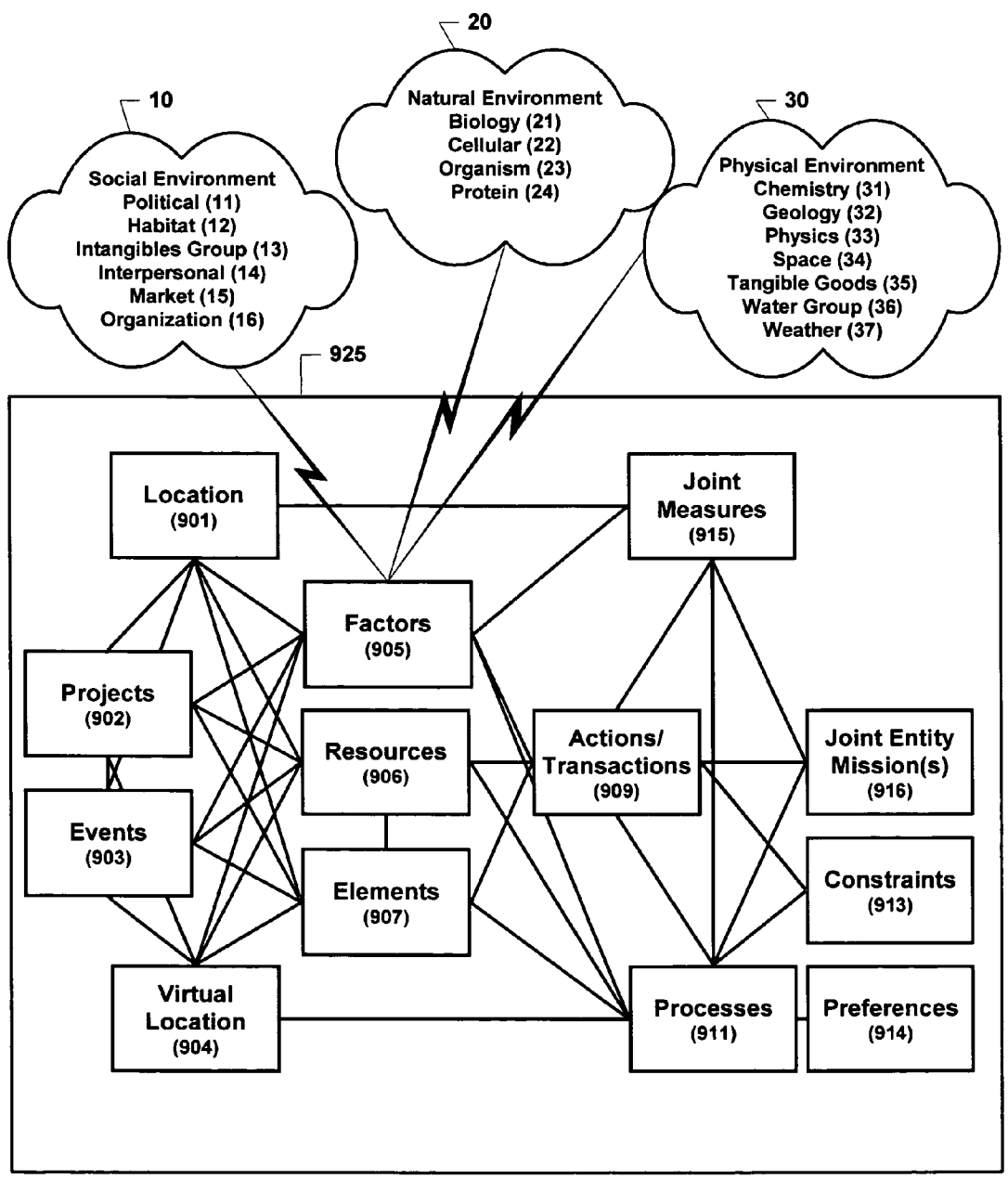
Figure 3:
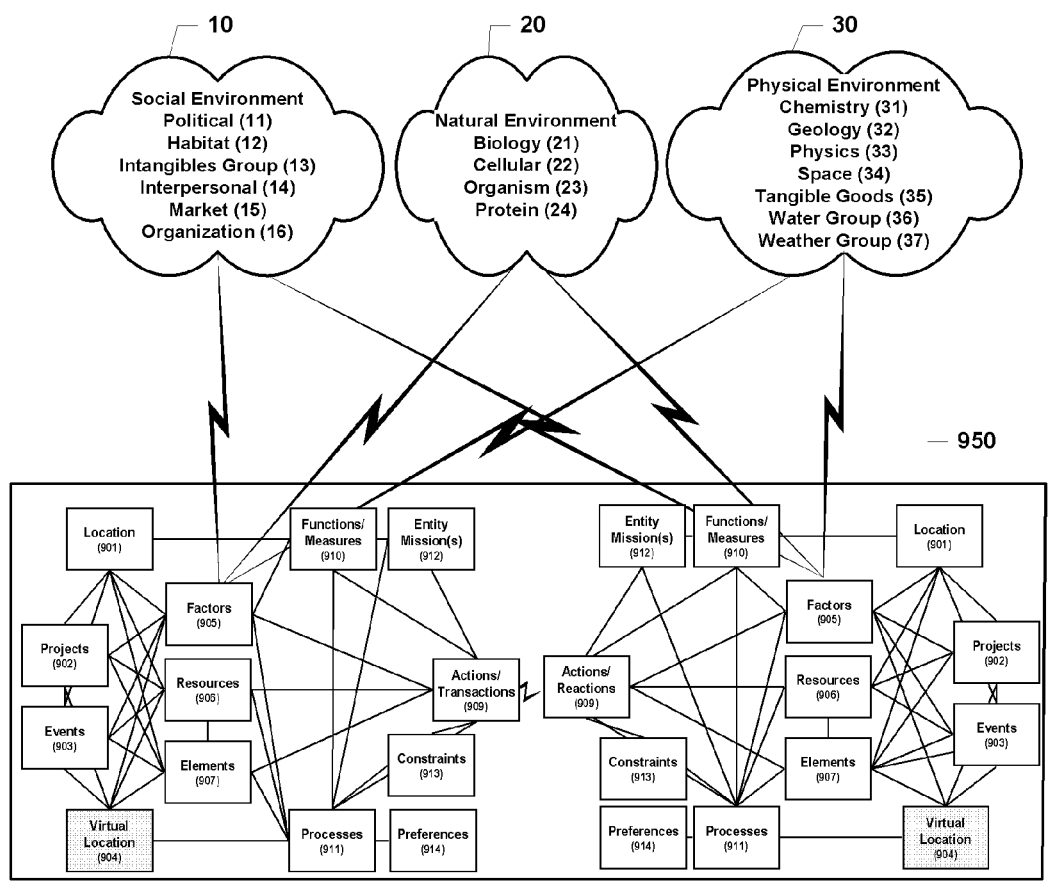
FIG. 3 is a block diagram showing one type of multi-entity system.

The software in block 413 displays an influence diagram in a format similar to that shown in FIG. 2A and prompts the user (40) via the frame definition data window (709) to define additional context frames or sub context frames and to define the access rights for each of the defined frames by establishing permission rights for elements in the element layer table (141) and guests—note this includes employees, members and partners. The user (40) is prompted to establish these relationships for all established context frames and sub-context frames. The information regarding access permission by element is stored in the id to frame table (165) in the contextbase (50). If the user defines new frames, then the user (40) will be prompted to provide the access information for the new frame when it is established. If the user defines new frames, then the information required to define the frame—a combination of measures and the related context layers, is retrieved from the element layer table (141), the transaction layer table (142), the resource layer table (143), the relationship layer table (144), the measure layer table (145), the environment layer table (149), the registration layer table (154), the event risk table (156) and/or the entity schema table (157). The new context frame specification is stored in the context frame table (160). The sub context frames and context frames developed by the software in block 402 will identify and include information regarding all elements, resources, factors, actions, events, relationships and measures that are impacted by a change in the specified context frame. In block 413, the user (40) has the option of limiting the elements, resources, factors and events included in the frame to include only those elements that have a certain level of function measure impact. For example, if a change in supply chain operation had a very weak causal impact on brand strength, then brand information could be excluded from a supply chain sub context frame created by the user (40). The software in block 413 can also define context frames and sub context frames for event and impact analysis using the same procedure described for developing measure context frames. The newly defined context frames and sub context frames for events, impacts and measures are stored in the context frame table (160) before processing passes to a software block 414.

The software in block 414 checks the system settings table (162) in the contextbase (50) to determine if a natural language interface (714) is going to be used. If a natural language interface is going to be used, then processing advances to a software block (420). Alternatively, if a natural language interface is not going to be used, then processing advances to a software block 415.

The software in block 415 supports the activities of the system interface window (711). The system interface window (711) is where the Complete Context™ Suite (625), narrow systems (4) and devices (3) synchronize and replicate the context frames and/or sub-context frames they use in processing, completing transactions and supporting a user (40), manager (41) or collaborator (43). Access to the different frames is controlled by the information stored in the id to frame table (165) in the prior step. As shown in FIG. 10, devices (3), narrow systems (4) and the Complete Context™ Suite (625) interface with software block 720 that manages the sessions. The id information provided by the Complete Context™ applications (625), devices (3) and/or narrow systems (4) to the software in block 720 determines which context frames will be synchronized and/or replicated. Processing in the interface passes from block 720 to block 722 where the software in the block supports translation between other languages and ontologies as required to complete transactions and analyses in automated fashion. The applications in the Complete Context™ Suite (625) all have the ability to support and integrate with other ontologies as required. After translations are completed, processing passes to software block 724 which will identify this session as an output session. Processing in the interface then passes to a software block 728.

The software in block 728 completes three primary functions. First, it interacts with each device (3) and narrow system (4) as required identify the context quotient for that device or system. The context quotient is a score that is given to each device (3) and narrow system (4) that identifies the relative ability of the device (3) or narrow system (4) to flexibly process information from the seven different types of context layers. The scores range from four to two hundred with two hundred being the highest score. The applications in the Complete Context™ Suite (625) all have context quotients of two hundred (200). Twenty points are given for each type context layer the device (3) or narrow system (4) is able to process. For example, a supply chain optimization system with the ability to optimize supplier costs (measure layer) given an inventory status (resource layer) and order status (transaction layer) would be given sixty points—twenty points for each of the three layers it is able to process. If the supply chain optimization system was able to change its optimal solution based on new information regarding the relationship between the supply chain and other context elements like the customer base, brand and channel partners, then another twenty points would be given for its ability to process relationship layer information. Another seven points are awarded for the ability to respond to changes in the mix and/or the relative importance of different attributes within each context layer. For example, it is not uncommon for devices (3) and narrow systems (4) to include the ability to respond to one or two factors from the social environment in their programming. However, as new elements, factors and resources become important, these systems often fail to recognize the change and consequently decline in usefulness. The exact points awarded for each "ability" are not particularly important, what is important is that the context quotient score reflects the ability of each device (3) and narrow system (4) to process each of the seven types of context layers in the current environment and in the future when the relative importance of different attributes within each layer are expected to change. The results of the evaluation of the context quotient for devices (3) and narrow systems (4) seeking data from the system of the present invention are saved in the context quotient table (162) in the contextbase (50).

The second function of the software in block 728 is to provide context frame information to each device (3) or narrow system (4) with a layer mix and a format that can be used by that device (3) or narrow system (4). The results of the context quotient analysis are used to determine which context layers will be included in the context frame sent to each device (3) and/or narrow system (4) for processing. After defining a context frame for the device (3) and/or narrow system (4) in a manner similar to that described previously for complete context frames, a packet containing the required information is transmitted to a device (3) or narrow system (4) via a network (45) or grid. Alternatively, an RSS feed or a network operating system, operating system and/or middleware layer(s) containing the required information could be propagated. Existing layers in operating systems and middleware could also be used to communicate the required information. At the same time, the devices (3) and/or narrow systems (4) can transmit changes in the context frame they are utilizing via the same interface to ensure synchronization between the central system and the remote devices (3) and systems (4). These changes are passed to software block 724 where they complete the data input processing described previously.

The third function of the software in block 728 is to deliver full context frames and sub-context frames along with the related valid context space and uncertainty information to the applications Complete Context™ Suite (625) upon request. Processing continues to a software block 431.

If the natural language interface (714) is going to be used, then processing advances to a software block 420 instead of software block 415. The software in block 420 completes the same processing described above for block 415 as required to identify the context quotient, develop the appropriate context frames and synchronize context information with the narrow systems (4), devices (3) and/or applications in the Complete Context™ Suite (625). The software in block 420 also combines the ontology developed in prior steps in processing with well known language processing methods to provide a true natural language interface to the system of the present invention (100).

Figure 17:
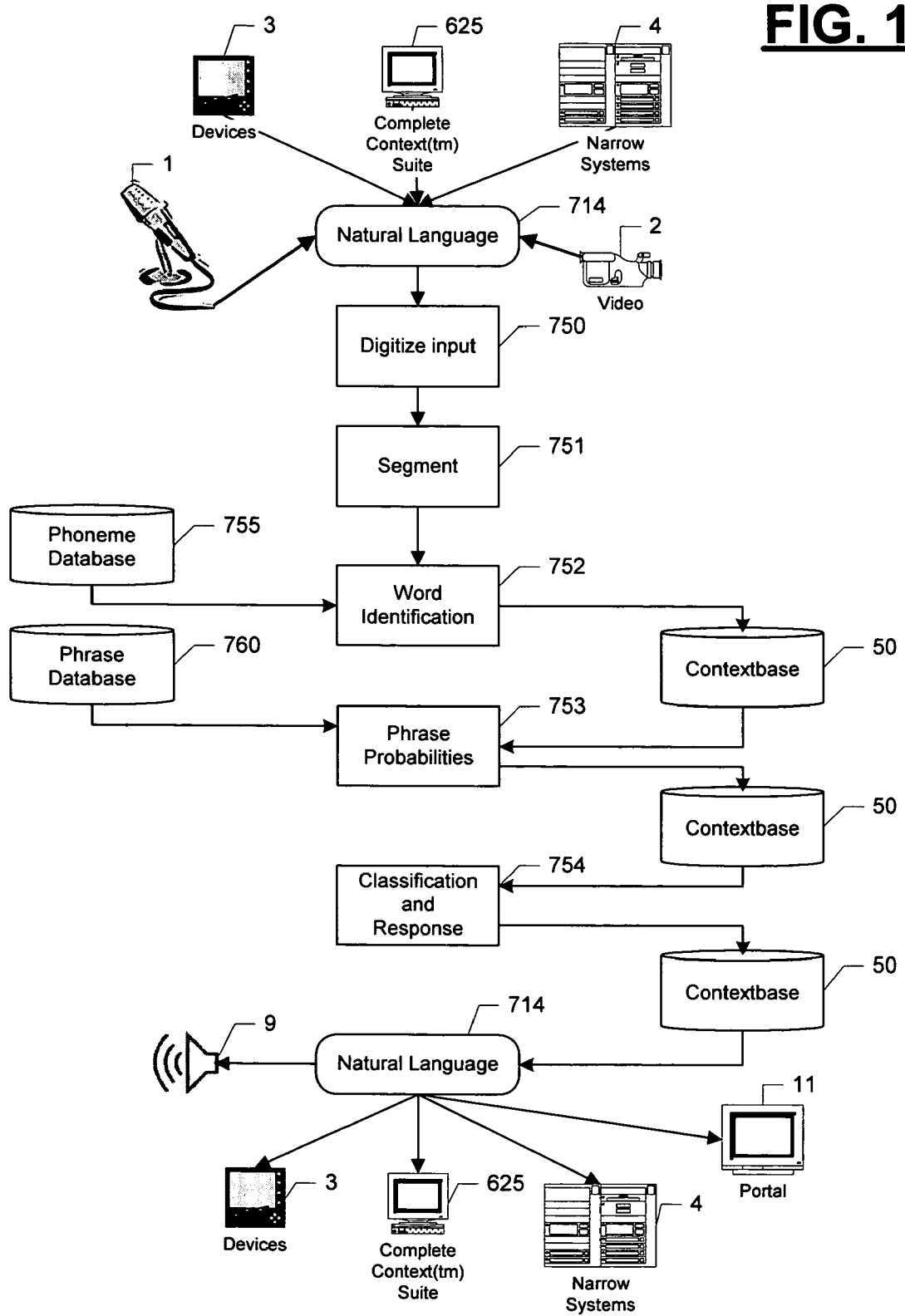
FIG. 17 is a diagram showing how the system (100) develops and supports a natural language interface (714)

As shown in FIG. 17, the processing to support the development of a true natural language interface starts with the receipt of audio input to the natural language interface (714) from audio sources (1), video sources (2), devices (3), narrow systems (4), a portal (11) and/or applications in the Complete Context™ Suite (625). From there, the audio input passes to a software block 750 where the input is digitized in a manner that is well know. After being digitized, the input passes to a software block 751 where it is segmented in phonemes in a manner that is well known. The phonemes are then passed to a software block 752 where in a manner that is well known, they are compared to previously stored phonemes in the phoneme database (755) to identify the most probable set of words contained in the input. The most probable set of words are saved in the natural language table (169) in the contextbase (50) before processing advances to a software block 753. The software in block 753 compares the word set to previously stored phrases in the phrase database (760) and the ontology from the ontology table (152) to classify the word set as one or more phrases. After the classification is completed and saved in the natural language table (169), the software in block 754 uses the classified input and ontology to guide the completion of any actions that may be required by other parts of the system (100), generate a response to the translated input and transmit response to the natural language interface (714) that is then forwarded to a device (3), a narrow system (4), an audio output device (9), a portal (11) or an application in the Complete Context™ Suite (625). This process continues until all natural language input has been processed and the context information has been synchronized with the appropriate device, systems and/or applications. When this processing is complete, processing advances to a software block 431.

The software in block 431 checks the system settings table (162) in the contextbase (50) to determine if applications or bots are going to be created. If applications or bots are not going to be created, then processing advances to a software block 433. Alternatively, if applications or bots are going to be created, then processing advances to a software block 432.

The software in block 432 prompts the user (40) via the development data window (711) to define the type of program that is going to be developed. It is worth noting that more than one user (40) can participate in program development—a feature that is particularly useful in developing programs to support shared context and multi domain knowledge development. The entity centric computer system (100) supports four distinct types of development projects:

1. the development of extensions to Complete Context™ Suite (625) as required to provide the user (40) with the exact information required for a given context frame;
2. the development of Complete Context™ bots (650) to complete one or more actions, initiate one or more actions, complete one or more events, respond to requests for actions, respond to actions, respond to events, obtain information and combinations thereof. The software developed using this option can be used for software bots or agents, robots and nanobots;
3. programming devices (3) with rules of behavior for different contexts that are consistent with the context frame being provided—i.e. when in church (reference layer position) do not ring unless it is the boss (element) calling; and
4. the development of new applications.

The second screen displayed by the software in block 432 will depend on which type of development project the user (40) is completing.

If the first option is selected, then the user (40) is given the option of using pre-defined patterns and/or patterns extracted from existing narrow systems (4) to modify one or more of the applications in the Complete Context™ Suite (625). The user (40) can also program the application extensions using C++, C#, Prolog or Java with or without the use of patterns.

If the second option is selected, then the user (40) is shown a display of the previously developed entity schema (157) for use in defining an assignment and context frame for a Complete Context™ Bot. (650). After the assignment specification is stored in the bot assignment table (167) the software in block 432 defines a probabilistic simulation of bot performance under the three previously defined scenarios. The results of the simulations are displayed to the user (40) via the development data window (712). The software in block 432 then gives the user (40) the option of modifying the bot assignment or approving the bot assignment. If the user (40) decides to change the bot assignment, then the change in assignment is saved in the bot assignment table (167) and the process described for this software block is repeated. Alternatively, if the user (40) does not change the bot assignment, then the software in block 432 completes two primary functions. First, it combines the bot assignment with results of the simulations to develop the set of program instructions that will maximize bot performance under the forecast scenarios. The bot programming includes the entity ontology and is saved in the bot program table (168). Any number of languages can be used to program the bots including C++, Java and Prolog. Prolog is used because it readily supports the situation calculus analyses used by the bot (650) to evaluate their situation and select the appropriate course of action. The Complete Context Bot (650) has the ability to interact with bots and entities that use other ontologies in an automated fashion.

If the third option is selected, then the previously developed information about the context quotient for the device (3) is used to select the pre-programmed options (i.e. ring, don't ring, silent ring, etc.) that will be presented to the user (40) for implementation. The user (40) will also be given the ability to construct new rules for the device (3) using the parameters contained within the device-specific context frame.

If the fourth option is selected, then the user (40) is given a pre-defined context frame interface shell along with the option of using pre-defined patterns and/or patterns extracted from existing narrow systems (4) to develop a new application. The user (40) can also program the new application completely using C++, C#, Prolog or Java.

When programming is complete using one of the four options, processing advances to a software block 433. The software in block 433 prompts the user (40) via the report display and selection data window (713) to review and select reports for printing. The format of the reports is either graphical, numeric or both depending on the type of report the user (40) specified in the system settings table (162). If the user (40) selects any reports for printing, then the information regarding the selected reports is saved in the report table (152). After the user (40) has finished selecting reports, the selected reports are displayed to the user (40) via the report display and selection data window (713). After the user (40) indicates that the review of the reports has been completed, processing advances to a software block 434. The processing can also pass to block 434 if the maximum amount of time to wait for no response specified by the user (40) in the system settings table is exceeded before the user (40) responds.

Figure 15:
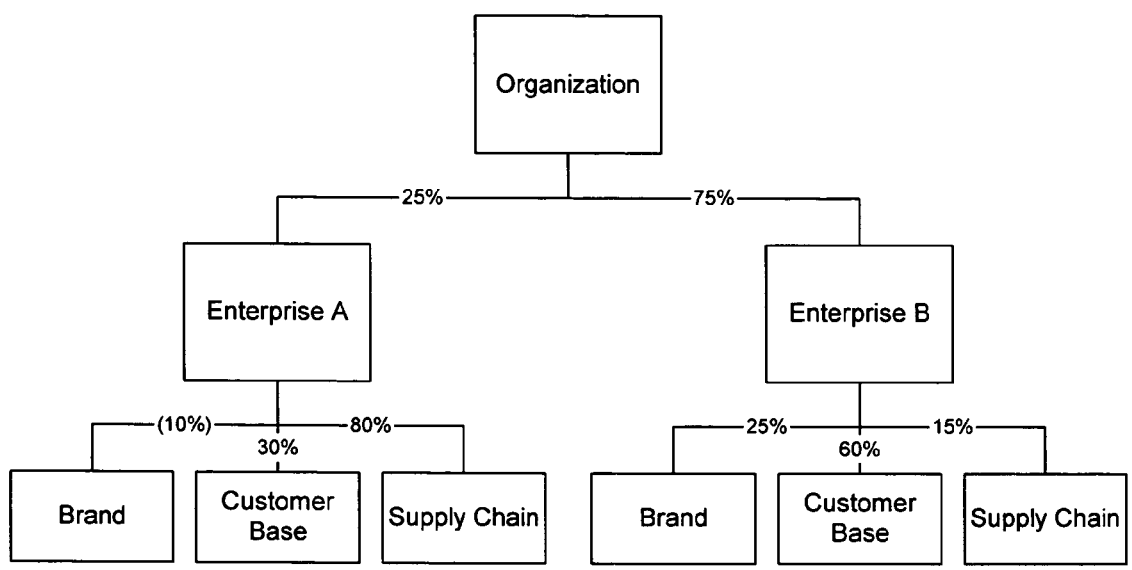
FIG. 15 is a diagram showing the format of a standard management report.
Figure 16:
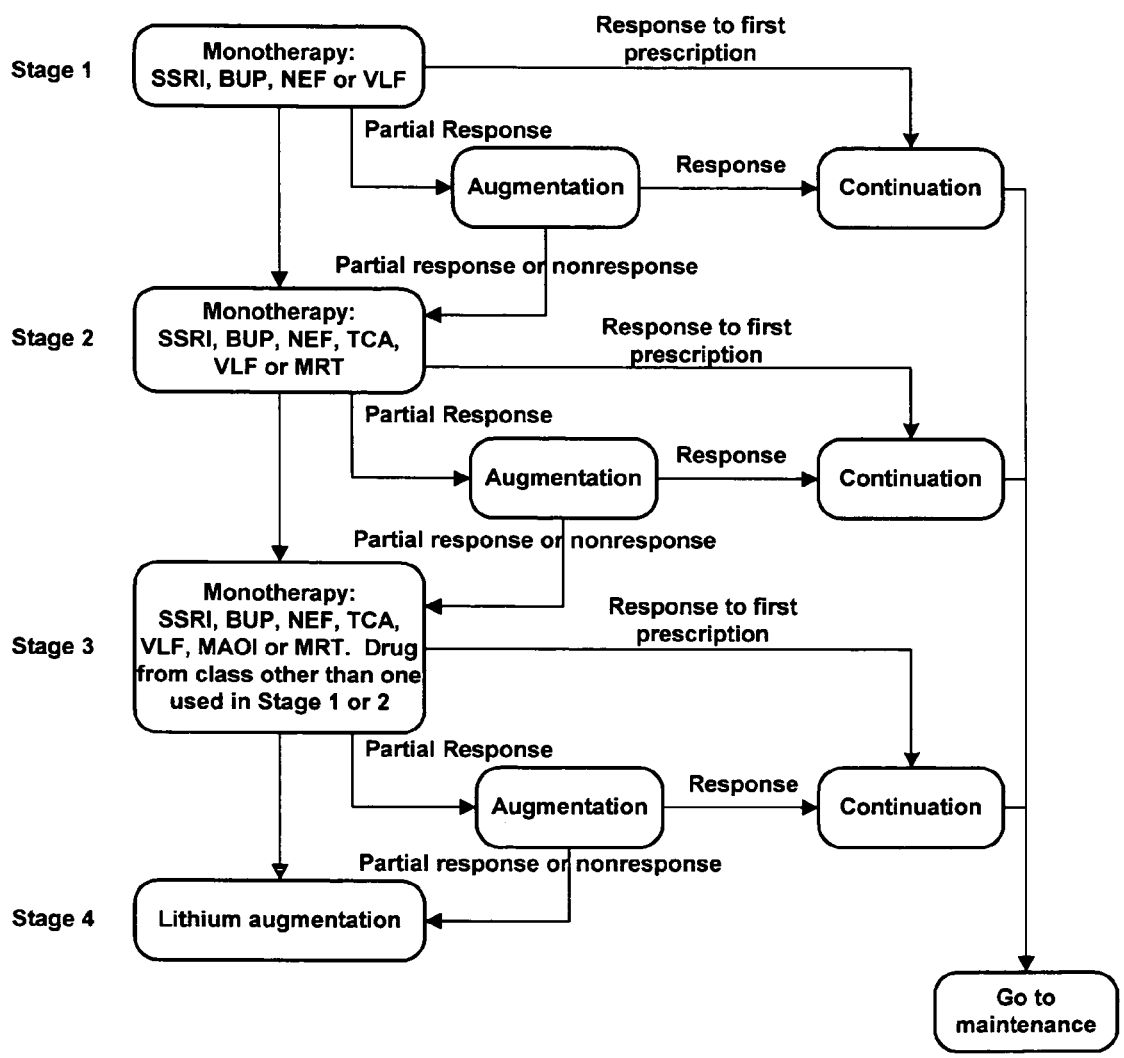
FIG. 16 is a diagram showing a portion of a process map for treating a mental health patient.

The software in, block 434 checks the report table (152) to determine if any reports have been designated for printing. If reports have been designated for printing, then processing advances to a block 435. It should be noted that in addition to standard reports like a performance risk matrix and the graphical depictions of the efficient frontier shown (FIG. 11), the system of the present invention can generate reports that rank the elements, factors, resources and/or risks in order of their importance to measure performance and/or measure risk by entity, by measure and/or for the entity as a whole. A format for a report of this type is shown in FIG. 15. The system can also produce reports that compare results to plan for actions, impacts and measure performance if expected performance levels have been specified and saved in appropriate context layer. The software in block 435 sends the designated reports to the printer (118). After the reports have been sent to the printer (118), processing advances to a software block 437. Alternatively, if no reports were designated for printing, then processing advances directly from block 434 to block 437.

The software in block 437 checks the system settings table (162) to determine if the system is operating in a continuous run mode. If the system is operating in a continuous run mode, then processing returns to block 205 and the processing described previously is repeated in accordance with the frequency specified by the user (40) in the system settings table (162). Alternatively, if the system is not running in continuous mode, then the processing advances to a block 438 where the system stops.

Thus, the reader will see that the system and method described above transforms data, information and knowledge from disparate devices (3) and narrow systems (4) into a entity centric computer system (100). The level of detail, breadth and speed of the analysis gives users of the system (100) the ability to create knowledge and apply it to solving real world problems in an fashion that is uncomplicated and powerful. This system (100) can be used for integrating and managing the disparate activities of an organization where knowledge development efforts in one or more domains are being managed.

While the above description contains many specificities, these should not be construed as limitations on the scope of the invention, but rather as an exemplification of one embodiment thereof. Accordingly, the scope of the invention should be determined not by the embodiment illustrated, but by the appended claims and their legal equivalents.

The invention claimed is:

1. An entity context apparatus, comprising:
a plurality of entity related systems and databases,
means for preparing data from said systems and databases for use in processing,
means for developing a complete entity context using at least a portion of said data,
means for data and information storage, and
means for complete entity context distribution
where a complete entity context identifies each of the one or more aspects of a context that have a tangible effect on a behavior of an entity,
where an entity that comprises a multi entity organization or an entity from the organization domain has two or more entity function measures and any combination of one or more financial measures for all or part of said subject entity comprise a single function measure, and
where a complete entity context includes different aspects of context selected from the group consisting element context, resource context, factor context, reference context, measure context, relationship context, transaction context, lexical context, temporal context and combinations thereof.

2. The apparatus of claim 1 that further comprises means for applying all or part of a complete entity context to support useful activities selected from the group consisting of completing one or more entity related actions in an optimal manner, identifying a valid context space for entity analyses, underwriting one or more entity related securities, displaying a plurality of entity related information, forecasting an entity behavior, forecasting an entity sustainability and combinations thereof.

3. The apparatus of claim 1 where an entity is selected from a group of domains consisting of political, habitat, intangibles, interpersonal, market, organization, biology, cellular, organism, protein, chemistry, geology, physics, space, tangible goods, water, weather and combinations thereof.

4. The apparatus of claim 1 where an entity is a separate entity, a combination of two or more entities or a multi-entity system.

5. The apparatus of claim 1 where an entity is a member of one or more groups selected from the group consisting of voter, precinct, caucus, city, county, state/province, regional, national, multi-national, global, household, neighborhood, community, city, region, brand, expectations, ideas, ideology, knowledge, law, money, right, relationship, service, individual, nuclear family, extended family, clan, ethnic group, organization, multi-organization, industry, market, economy, team, group, department, division, company, organization species, genus, family, order, class, phylum, kingdom, macromolecular complexes, protein, ma, dna, x-ylation, organelles, cells, structures, organs, organic systems, organism, monomer, dimer, large oligomer, aggregate, particle, molecules, compounds, chemicals, catalysts, minerals, sediment, rock, landform, plate, continent, planet, quark, particle zoo, protons, neutrons, electrons, atoms, molecules, dark matter, asteroids, comets, planets, stars, solar system, galaxy, universe, compounds, minerals, components, subassemblies, assemblies, subsystems, goods, systems pond, lake, bay, sea, ocean, creek, stream, river, current, atmosphere, clouds, lightning, precipitation, storm, wind and combinations thereof.

6. The apparatus of claim 1 where preparing data for use in processing further comprises:
developing a common entity specific configuration for organizing data selected from the group consisting of schema, ontology and combinations thereof, and
converting data to a common entity specific schema and storing said data in accordance with said schema, converting data to a common entity specific ontology and storing said data in accordance with said ontology or a combination thereof.

7. The apparatus of claim 1 where data are aggregated from the group of consisting of organization systems, personal systems, bio medical systems, scientific systems, devices and combinations thereof.

8. The apparatus of claim 1 that is supported by computer hardware from the group consisting of a computer, a cluster, a plurality of computers connected via a network, one or more virtual computers, one or more blade servers, a plurality of computers connected via a grid, a device and combinations thereof.

9. The apparatus of claim 1 that further comprises support for context development, context storage and context distribution for a collection of entities or a population of entities.

10. A program storage device readable by a computer, tangibly embodying a program of instructions executable by at least one computer to perform the steps in an entity context method, comprising:
aggregating data from a plurality of entity related systems,
developing a complete entity context using at least a portion of said data where a complete entity context includes one or more different aspects of context selected from the group consisting element context, resource context, factor context, reference context, measure context, relationship context, transaction context, lexical context and combinations thereof and where a complete entity context identifies each of the one or more aspects of a context that have a tangible influence on a behavior of an entity, where an enterprise entity has two or more entity function measures, and
using a complete entity context to support useful activities selected from the group consisting of completing one or more entity related actions in an optimal manner, identifying a valid context space for entity analyses, underwriting one or more entity related securities, displaying a plurality of performance information for one or more entity function measures, forecasting an entity behavior, forecasting an entity sustainability and combinations thereof
where an entity that comprises a multi entity organization or an entity from the organization domain has two or more function measures and any combination of one or more financial measures for all or part of said subject entity comprise a single function measure, and
where developing a complete entity context further comprises quantifying an impact of one or more other types of entities on each of one or more aspects of said complete context.

11. The program storage device of claim 10 where each of one or more aspects of context are developed in an automated fashion by learning from the data.

12. The program storage device of claim 10, wherein each of one or entity function measures further comprise a measure selected from the group consisting of a temporal measure, a transaction measure, a financial measure, a physical measure, a satisfaction measure and combinations thereof.

13. The program storage device of claim 10 where an entity is a separate entity, a collaboration between two or more entities or a multi-entity system.

14. The program storage device of claim 10 where an entity is a member of one or more groups selected from the group consisting of voter, precinct, caucus, city, county, state/province, regional, national, multi-national, global, household, neighborhood, community, city, region, brand, expectations, ideas, ideology, knowledge, law, money, right, relationship, service, individual, nuclear family, extended family, clan, ethnic group, organization, multi-organization, industry, market, economy, team, group, department, division, company, organization species, genus, family, order, class, phylum, kingdom, macromolecular complexes, protein, ma, dna, x-ylation, organelles, cells, structures, organs, organic systems, organism, monomer, dimer, large oligomer, aggregate, particle, molecules, compounds, chemicals, catalysts, minerals, sediment, rock, landform, plate, continent, planet, quark, particle zoo, protons, neutrons, electrons, atoms, molecules, dark matter, asteroids, comets, planets, stars, solar system, galaxy, universe, compounds, minerals, components, subassemblies, assemblies, subsystems, goods, systems pond, lake, bay, sea, ocean, creek, stream, river, current, atmosphere, clouds, lightning, precipitation, storm, wind and combinations thereof.

15. The program storage device of claim 10 where a complete entity context is developed by a series of models selected from the group consisting of; regression, generalized additive; support vector method, entropy minimization, generalized autoregressive conditional heteroskedasticity, wavelets, Markov, Viterbi, relevance vector method, Ornstein—Uhlenbeck, Bayesian, kriging, multivalent, multivariate adaptive regression splines, swarm, probabilistic—relational, power law, fractal, data envelopment analysis, path analysis and combinations thereof.

16. The program storage device of claim 10 where a complete entity context includes attributes from the group consisting of the definition of one or more entity functions, the relative importance of the one or more entity functions, one or more entity function measures, the identity and description of current, past and future entity actions, the identity and description of elements that support the completion of entity actions, the identity and description of resources consumed during the completion of entity actions, the identity and description of environmental factors that affect the completion of entity actions, the interrelationship between elements, factors and resources, the relationship between elements, factors, resources, entity actions and entity function measure performance and combinations thereof.

17. The program storage device of claim 10 where a complete entity context is developed in an automated fashion by learning from the data.

18. The program storage device of claim 10 where the method further comprises identifying a valid context space for each entity context.

19. A computer implemented search method comprising:
aggregating data from a plurality of entity related systems,
develop one or more entity contexts for an individual entity and for a group of individual entities using at least a portion of said data,
identifying a combination of data and information that is relevant to one or more layers of context for an entity selected from the group consisting of the individual entity, the group entity and combinations thereof using said entity contexts, and
displaying the results in order of relevance
where an entity context further comprises a relationship context layer and a plurality of context layers selected from the group consisting an element context layer, a resource context layer, a factor context layer, a reference context layer, a measure context layer, a transaction context layer, a lexical context layer and combinations thereof, and
where an entity context identifies one or more aspects of a context that have a tangible effect on a behavior of an entity.

20. The method of claim 19 that further comprises:
completing a transaction in an automated fashion where a price for said transaction is a function of an entity context.

21. The method of claim 19 wherein a measure context layer provides information that supports an identification of data and information relevance that is a function of its value to an entity.

22. The method of claim 19 wherein each entity context layer of a plurality of context layers is developed in automated fashion by learning from the data.

23. The method of claim 19 that has a context quotient of 200.

24. A program storage device readable by a computer, tangibly embodying a program of instructions executable by at least one computer to perform the steps in a context distribution method, comprising:
aggregate data from a plurality of entity related systems,
develop one or more entity contexts using at least a portion of said data where an entity context includes a reference context and one or more different aspects of context selected from the group consisting element context, resource context, factor context, measure context, relationship context, transaction context, lexical context and combinations thereof, and
distribute one or more of the entity contexts in an automated fashion
where an entity context identifies one or more aspects of a context that have a tangible influence on a behavior of an entity,
where an entity context further comprises a quantified impact of one or more other types of entities on one or more aspects of said entity context, and
where the computer readable medium further comprises a plurality of intelligent agents.

25. The program storage device of claim 24 that supports distribution methods selected from the group consisting of device synchronization, device synchronization and replication, packet distribution, natural language interface and combinations thereof.

26. The program storage device of claim 24 that distributes one or more aspects of context in one or more separate layers where said layers further comprise operating system layers, middleware layers or web service capabilities.

27. A computer implemented context search method, comprising
Aggregating data related to an entity in accordance with a common schema,
Analyzing at least a portion of said data as required to identify an entity context and one or more priorities for said entity given said context,
Identifying data, information and knowledge that is relevant to said entity context, and
Presenting at least one of relevant data, relevant information or relevant knowledge after sorting said data, information or knowledge on the basis of entity context relevancy and priorities
where an entity context identifies one or more aspects of a context that have a tangible impact on a behavior of an entity, and
where data related to an entity are obtained from a world wide web and the group consisting of a plurality of entity related narrow system databases, one or more external databases, an Intranet, a direct input and combinations thereof.

28. The method of claim 27, wherein an entity context further comprises an element context and one or more aspects of context selected from the group consisting of resource context, factor context, reference context, measure context, relationship context, transaction context, lexical context, temporal context and combinations thereof
where a reference context further comprises information that defines a relationship of one or more aspects of context selected from the group consisting element context, resource context, factor context, measure context, relationship context, transaction context and combinations thereof to one or more coordinate systems over time.

29. The method of claim 27, wherein one or more priorities are defined by one or more mission measures.

30. The method of claim 29, wherein one or more mission measures further comprise any quantifiable measure.

31. The method of claim 29, wherein one or more mission measures further comprise measures selected from the group consisting of a temporal measure, a transaction measure, a financial measure, a physical measure, a satisfaction measure and combinations thereof.

32. The method of claim 27, wherein an entity context is developed by learning from the data.

33. A program storage device readable by a computer, tangibly embodying a program of instructions executable by at least one computer to perform the steps in a context search method, comprising:
Aggregating data related to an entity in accordance with a common schema,
Analyzing at least a portion of said data as required to identify an entity context and one or more priorities for said entity given said context,
Identifying data, information and knowledge that is relevant to said entity context, and
Presenting at least one of relevant data, relevant information or relevant knowledge after sorting said data, information or knowledge on the basis of entity context relevancy and priorities
where an entity context identifies one or more aspects of a context that have a tangible effect on a behavior of an entity,
where identifying an entity context further comprises quantifying an impact of one or more other types of entities on each of one or more aspects of said context; and
where an entity context further comprises a measure context and one or more aspects of context selected from the group consisting of resource context, factor context, element context, reference context, relationship context, transaction context, lexical context, temporal context and combinations thereof.

34. The program storage device of claim 33, wherein one or more priorities are defined by one or more mission measures.

35. The program storage device of claim 34, wherein one or more mission measures further comprise any quantifiable measure selected from the group consisting of a transaction measure, a financial measure, a physical measure, a satisfaction measure and combinations thereof.

36. The program storage device of claim 33, wherein data related to an entity are obtained from the group consisting of a plurality of entity related narrow system databases, one or more external databases, a world wide web, a direct input and combinations thereof.

37. The program storage device of claim 33, wherein one or more priorities for an entity are identified in an automated manner by learning from the data.

38. The program storage device of claim 33, wherein an entity is selected from a group of domains consisting of political, habitat, intangibles, interpersonal, market, organization, biology, cellular, organism, protein, chemistry, geology, physics, space, tangible goods, water, weather and combinations thereof.

39. A context search system comprising:
networked computers each with a processor having circuitry to execute instructions; a storage device available to each processor with sequences of instructions stored therein, which when executed cause the processors to:
(a) aggregate data related to an entity in format suitable for processing,
(b) analyze at least a portion of said data as required to identify an entity context and one or more priorities for said entity given said context,
(c) identify data, information and knowledge that is relevant to said entity context, and
(d) presenting at least one of relevant data, relevant information or relevant knowledge after it is sorted on the basis of entity context relevancy and priorities
where an entity context identifies each of the one or more aspects of a context that have a tangible impact on a behavior of an entity,
where one or more priorities for the entity are identified by said entity, and
where an entity context further comprises a factor context and one or more aspects of context selected from the group consisting of measure context, resource context, reference context, element context, relationship context, transaction context, lexical context, temporal context and combinations thereof where a measure context further identifies and quantifies an impact of actions, events, elements, factors and resources on each of a plurality of entity function measures by time period.

40. The system of claim 39, wherein one or more priorities are defined by one or more entity function measures where said function measures further comprise a temporal measure and one or more measures selected from the group consisting of a transaction measure, a financial measure, a physical measure, a satisfaction measure and combinations thereof.

41. The system of claim 39, wherein identifying data, information or knowledge that is relevant to an entity context further comprises the development of one or more indices for a measure context and for aspects of context selected from the group consisting of element context, factor context, reference context, relationship context, transaction context, lexical context, temporal context, resource context and combinations thereof.

42. The program storage device of claim 33, wherein data related to an entity are obtained from the group consisting of a one or more entity related narrow system databases, one or more external databases, a world wide web, a direct input and combinations thereof.

43. A computer implemented entity knowledge method, comprising
Preparing a plurality of entity related data for use in processing,
Analyzing at least a portion of said data as required to develop an entity knowledge, and
Using said knowledge to complete useful activities selected from the group consisting of identifying the data, information and knowledge that is most relevant to the entity, identifying entity preferences, loading the data and information that is most relevant to the entity into a cache, optimize information technology support of entity performance, providing a true natural language interface for entity related software and combinations thereof where an entity knowledge further comprises a model of entity behavior that supports the identification of an optimal set of actions for a given context.

* * * * *